US012594781B2

(12) United States Patent
Sato et al.

(10) Patent No.: US 12,594,781 B2
(45) Date of Patent: Apr. 7, 2026

(54) PRINTED MATERIAL, METHOD FOR PRODUCING PRINTED MATERIAL AND PRINTING MEDIUM FOR LASER PRINTING

(71) Applicant: OJI HOLDINGS CORPORATION, Tokyo (JP)

(72) Inventors: So Sato, Tokyo (JP); Yusei Kawanami, Tokyo (JP); Satoshi Takahashi, Tokyo (JP); Go Banzashi, Tokyo (JP)

(73) Assignee: OJI HOLDINGS CORPORATION, Tokyo (JP)

( * ) Notice: Subject to any disclaimer, the term of this patent is extended or adjusted under 35 U.S.C. 154(b) by 282 days.

(21) Appl. No.: 17/926,934

(22) PCT Filed: May 21, 2021

(86) PCT No.: PCT/JP2021/019477
§ 371 (c)(1),
(2) Date: Nov. 21, 2022

(87) PCT Pub. No.: WO2021/235556
PCT Pub. Date: Nov. 25, 2021

(65) Prior Publication Data
US 2023/0211624 A1 Jul. 6, 2023

(30) Foreign Application Priority Data

May 22, 2020 (JP) ................................. 2020-089439
May 22, 2020 (JP) ................................. 2020-089444
(Continued)

(51) Int. Cl.
*B41M 5/26* (2006.01)
*B32B 27/10* (2006.01)
(Continued)

(52) U.S. Cl.
CPC .............. *B41M 5/267* (2013.01); *B32B 27/10* (2013.01); *B32B 27/20* (2013.01); *B32B 27/32* (2013.01);
(Continued)

(58) Field of Classification Search
CPC .......... B41M 5/26; B41M 5/267; B41M 5/46; B41M 2205/40; D21H 15/02; D21H 19/385; D21H 19/44
See application file for complete search history.

(56) References Cited

U.S. PATENT DOCUMENTS 6,306,493 B1 10/2001 Brownfield
2002/0122931 A1 9/2002 Brownfield et al.
(Continued)

FOREIGN PATENT DOCUMENTS

AU 2021274324 B2 11/2021
CA 2086023 A1 7/1993
(Continued)

OTHER PUBLICATIONS

International Search Report for PCT/JP2021/019477 dated Jul. 27, 2021.
(Continued)

*Primary Examiner* — Gerard Higgins
(74) *Attorney, Agent, or Firm* — Sughrue Mion, PLLC

(57) ABSTRACT

An object of the present invention is to provide a print product which has a printed region where printing with ultraviolet laser is applied and which is excellent in viewability, a method for producing a print product by irradiation with ultraviolet laser, and a printing medium for laser printing, for use in the print product and the method for producing a print product. The print product of the present invention has a printed region comprising discolored titanium oxide in at least one portion of a sheet medium selected (Continued)

from the group consisting of paper or a film having a printable region comprising titanium oxide; titanium oxide is filled in the sheet medium; a titanium oxide content in the printable region in the sheet medium is 1.0% by mass or more, pulp constituting the paper has a length-weighted average fiber length and an average fiber width in specified ranges, and the paper has a basis weight of 20 g/m² or more, when the sheet medium is the paper; a titanium oxide content in the printable region in the sheet medium is 0.3% by mass or more, the film has a thickness of 15 μm or more, and a resin constituting the film comprises a specified resin, when the sheet medium is the film; and a ratio between a Raman intensity assigned to titanium oxide in the printed region and a Raman intensity assigned to titanium oxide in a non-printed region is 0.70 or less.

19 Claims, 3 Drawing Sheets

(30) Foreign Application Priority Data

| | | |
|---|---|---|
| May 22, 2020 | (JP) ................................ | 2020-089447 |
| Dec. 22, 2020 | (JP) ................................ | 2020-212464 |
| Dec. 22, 2020 | (JP) ................................ | 2020-212467 |
| Dec. 22, 2020 | (JP) ................................ | 2020-212470 |

(51) Int. Cl.

| | |
|---|---|
| *B32B 27/20* | (2006.01) |
| *B32B 27/32* | (2006.01) |
| *B32B 27/36* | (2006.01) |
| *D21H 15/02* | (2006.01) |
| *D21H 17/67* | (2006.01) |
| *D21H 19/38* | (2006.01) |
| *D21H 19/44* | (2006.01) |
| *B31B 50/88* | (2017.01) |
| *G09F 3/00* | (2006.01) |
| *G09F 3/02* | (2006.01) |

(52) U.S. Cl.

CPC ............. *B32B 27/36* (2013.01); *D21H 15/02* (2013.01); *D21H 17/675* (2013.01); *D21H 19/385* (2013.01); *D21H 19/44* (2013.01); *B31B 50/88* (2017.08); *B32B 2264/1022* (2020.08); *B32B 2307/718* (2013.01); *B32B 2307/7376* (2023.05); *B32B 2439/00* (2013.01); *B41M 2205/40* (2013.01); *G09F 2003/0272* (2013.01); *G09F 3/0297* (2013.01)

(56) References Cited

U.S. PATENT DOCUMENTS

| | | | |
|---|---|---|---|
| 2006/0074165 A1 | 4/2006 | Gelissen et al. | |
| 2006/0090868 A1 | 5/2006 | Brownfield et al. | |
| 2007/0299219 A1 | 12/2007 | Higashioji et al. | |
| 2008/0076065 A1 | 3/2008 | Bennett et al. | |
| 2009/0311515 A1* | 12/2009 | Gunzel .................. | G03C 1/775 |
| | | | 428/326 |

| | | | |
|---|---|---|---|
| 2011/0065576 A1* | 3/2011 | Campbell .............. | B41M 5/267 |
| | | | 523/205 |
| 2011/0143067 A1 | 6/2011 | Hötler et al. | |
| 2012/0141752 A1 | 6/2012 | Wu et al. | |
| 2013/0095259 A1 | 4/2013 | Fukue et al. | |
| 2021/0024760 A1 | 1/2021 | Igarashi et al. | |

FOREIGN PATENT DOCUMENTS

| | | |
|---|---|---|
| CN | 101056920 A | 10/2007 |
| CN | 102985263 A | 3/2013 |
| JP | 03-288617 A | 12/1991 |
| JP | 05-247319 A | 9/1993 |
| JP | 7-92611 A | 4/1995 |
| JP | 08-67068 A | 3/1996 |
| JP | 9-123607 A | 5/1997 |
| JP | 10-237319 A | 9/1998 |
| JP | 11-20316 A | 1/1999 |
| JP | 11-100796 A | 4/1999 |
| JP | 2001-071645 A | 3/2001 |
| JP | 2001-512535 A | 8/2001 |
| JP | 2002-309104 A | 10/2002 |
| JP | 2005-320381 A | 11/2005 |
| JP | 2006-76271 A | 3/2006 |
| JP | 2006-508842 A | 3/2006 |
| JP | 2006-307198 A | 11/2006 |
| JP | 2008-080805 A | 4/2008 |
| JP | 2009-530507 A | 8/2009 |
| JP | 2011-245708 A | 12/2011 |
| JP | 2011-530631 A | 12/2011 |
| JP | 2012-520905 A | 9/2012 |
| JP | 2013-503065 A | 1/2013 |
| JP | 2019-1945 A | 1/2019 |
| JP | 2019-214392 A | 12/2019 |
| JP | 2020-1261 A | 1/2020 |
| JP | 2020-75943 A | 5/2020 |
| WO | 2019/087694 A1 | 5/2019 |
| WO | 2019/187578 A1 | 10/2019 |

OTHER PUBLICATIONS

Written Opinion for PCT/JP2021/019477 dated Jul. 27, 2021.
Hosokawa, "Research on marking technology for chemicals using ultraviolet laser", Toho University Academic Repository, Aug. 2013 (70 pages total).
Written Opposition dated Dec. 9, 2022 from the Japanese Patent Office in JP Patent No. 7070786 B2 (Opposition No. 2022-701107).
English Translation of JP 2020-075943 A (Abstract and original document previously filed on Nov. 21, 2022).
English Translation of WO 2019-187578 A1 (Abstract and original document previously filed on Nov. 21, 2022).
English Translation of JP 2019-001945 A (Abstract and original document previously filed on Nov. 21, 2022).
English Translation of JP 2020-001261 A (Abstract and original document previously filed on Nov. 21, 2022).
English Translation of JP 2013-503065 A (Abstract and original document previously filed on Nov. 21, 2022).
English Translation of JP 2001-512535 A (Abstract and original document previously filed on Nov. 21, 2022).
English Translation of JP 11-100796 A (Abstract and original document previously filed on Nov. 21, 2022).
Office Action issued Mar. 10, 2025 in Malaysian Patent Application No. PI2022006471.

\* cited by examiner

PRINTED MATERIAL, METHOD FOR PRODUCING PRINTED MATERIAL AND PRINTING MEDIUM FOR LASER PRINTING

This Application is a National Stage of International Application No. PCT/JP2021/019477 filed May 21, 2021, claiming priority based on Japanese Patent Application No. 2020-089439 filed May 22, 2020, and Japanese Patent Application No. 2020-089444 filed May 22, 2020 and Japanese Patent Application No. 2020-089447 filed May 22, 2020, and Japanese Patent Application No. 2020-212464 filed Dec. 22, 2020, and Japanese Patent Application No. 2020-212467 filed Dec. 22, 2020, and Japanese Patent Application No. 2020-212470 filed Dec. 22, 2020.

TECHNICAL FIELD

The present invention relates to a print product, a method for producing a print product, and a printing medium for laser printing.

BACKGROUND ART

Conventionally, labelling or ink-jet printing has been performed in order to display dates such as a production date and a ship date, and variable information such as a bar code on a package of a container or the like in which a storage object is stored.

A method of printing-out by laser light irradiation has also been proposed and, for example, PTL 1 has disclosed a stacked article for laser printing, produced by coating an aluminum-deposited surface of aluminum-deposited paper with white ink, black ink and overprint varnish (OP varnish), in order to provide a stacked article for laser printing-out, and a print-out article, in which clear printing-out is easily performed by laser light irradiation at a high speed and a portion where printing-out is applied is excellent in various resistances.

CITATION LIST

Patent Literature

PTL 1: JP H9-123607 A

SUMMARY OF INVENTION

Technical Problem

A method involving directly placing ink on a package surface with a thermal printer or an ink-jet printer is currently frequently used as a printing procedure on a surface of a package, a label, a pressure-sensitive adhesive tape, or the like. However, consumables such as an ink ribbon for thermal printers and an ink for ink-jet printers are expensive, and a problem is that the running cost for printing much varying information is increased. If the exchange of such consumables is neglected, printing leakage may also be caused. While direct printing of varying information on a package according to offset printing with an UV-curable ink is also performed, any print scratch, character deficiency and/or the like may be caused due to grime on a package surface, variation in thickness of a package, and/or the like.

The method described in PTL 1, although can allow for an increase in speed, is a technique involving removing an upper layer easily absorbing laser light, by irradiation with $CO_2$ laser light, to thereby expose a lower layer, and forming a viewable character and/or the like from the difference in color between the upper layer and the lower layer, and therefore the material of the upper layer is limited to one easily absorbing laser light and, on the contrary, the material of the lower layer is limited to one hardly absorbing laser light and also capable of acquiring the color contrast with the upper layer. In other words, the material of the upper layer is a carbon black-based material (black) easily absorbing laser light and the material of the lower layer is a titanium oxide-based material (white), and a character or the like formed by irradiation with laser light is a white character on a black base and is inferior in viewability. Moreover, a problem is that the ink in the upper layer is formed into powdery dust in removal of the upper layer, leading to contamination of the working environment.

An object of the present invention is to provide a print product which has a printed region comprising discolored titanium oxide and which is excellent in viewability, a method for producing a print product by irradiation with ultraviolet laser, and a printing medium for laser printing, for use in the print product and the method for producing a print product.

Solution to Problem

The present inventors have firstly found that a print product excellent in viewability is obtained by using a specified sheet medium where the titanium oxide content in a printable region is a specified value or more, and allowing the ratio of Raman intensities assigned to titanium oxide in a printed region and a non-printed region to be a specified value or less, thereby leading to completion of the present invention. The present invention firstly relates to the following <1> to <15>.

The present inventors have secondly found that a print product excellent in viewability is obtained by using a recording medium which comprises a coating layer comprising titanium oxide in a specified range, the coating layer serving as a printable region, on a specified paper substrate, and allowing the ratio of Raman intensities assigned to titanium oxide in a printed region and a non-printed region to be a specified value or less, thereby leading to completion of the present invention. The present invention secondary relates to the following <16> to <32>.

The present inventors have thirdly found that a print product excellent in viewability is obtained by allowing the titanium oxide content in a printable region to be a specified value or more, allowing the titanium oxide content in a laminate layer to be a specified range, further allowing the thickness of the laminate layer to be in a specified range and also allowing the ratio of Raman intensities assigned to titanium oxide in a printed region and a non-printed region to be a specified value or less, thereby leading to completion of the present invention. The present invention relates to the following <33> to <43>.

<1> A print product, wherein the print product has a printed region comprising discolored titanium oxide in at least one portion of a sheet medium selected from the group consisting of paper or a film having a printable region comprising titanium oxide, titanium oxide is filled in the sheet medium, a titanium oxide content in the printable region in the sheet medium is 1.0% by mass or more, pulp constituting the paper has a length-weighted average fiber length of 0.5 mm or more and 3.0 mm or less, the pulp constituting the paper has an average fiber width of 14.0 μm or more and 35.0 μm or less, and the paper has a basis weight of 20 g/m² or more, when the sheet medium is the paper, a titanium oxide content in the printable region in the sheet medium is 0.3% by mass or more, the film has a thickness of 15 μm or more, and a resin constituting the film comprises at least one selected from the group consisting of polyethylene, polypropylene, an ethylene-propylene copolymer, polyethylene terephthalate, poly-lactic acid, and polybutylene succinate, when the sheet medium is the film, and a ratio between a Raman intensity assigned to titanium oxide in the printed region and a Raman intensity assigned to titanium oxide in a non-printed region is 0.70 or less.

<2> The print product according to <1>, wherein the sheet medium is the film, and the titanium oxide content in the printable region in the sheet medium is 0.5% by mass or more and 7.5% by mass or less.

<3> The print product according to <1> or <2>, wherein the titanium oxide is at least one selected from the group consisting of rutile-type titanium oxide and anatase-type titanium oxide.

<4> The print product according to any one of <1> to <3>, wherein the print product is selected from the group consisting of a package, a label, and a pressure-sensitive adhesive tape.

<5> The print product according to any one of <1> to <4>, further comprising a transparent resin layer on the printable region.

<6> The print product according to <5>, wherein a resin constituting the transparent resin layer is at least one selected from the group consisting of polyethylene, poly-propylene, polyethylene terephthalate, polyvinyl alcohol, and starch.

<7> The print product according to <5> or <6>, wherein the transparent resin layer is obtained by attaching a trans-parent resin film onto the sheet medium with an adhesive layer being interposed, or by laminating a transparent resin film onto the sheet medium.

<8> The print product according to any one of <5> to <7>, wherein the transparent resin layer has a thickness of 5 μm or more and 100 μm or less.

<9> A method for producing a print product, comprising a step of performing printing by irradiation of a sheet medium selected from the group consisting of paper or a film with ultraviolet laser and thus discoloration of an irradiated region, wherein titanium oxide is filled in the sheet medium, a titanium oxide content in a printable region in the sheet medium is 1.0% by mass or more, pulp constituting the paper has a length-weighted average fiber length of 0.5 mm or more and 3.0 mm or less, the pulp constituting the paper has an average fiber width of 14.0 μm or more and 35.0 μm or less, and the paper has a basis weight of 20 g/m² or more, when the sheet medium is the paper, and a titanium oxide content in a printable region in the sheet medium is 0.3% by mass or more, the film has a thickness of 15 μm or more, and a resin constituting the film comprises at least one selected from the group consisting of polyethylene, polypropylene, an ethylene-propylene copolymer, polyethylene terephthalate, poly-lactic acid, and polybutylene succinate, when the sheet medium is the film.

<10> The method for producing a print product according to <9>, wherein the ultraviolet laser for irradiation has an output of 0.8 W or more.

<11> The method for producing a print product according to <9> or <10>, wherein the printing step is a step of performing irradiation with ultraviolet laser so that a ratio between a Raman intensity assigned to titanium oxide in a printed region and a Raman intensity assigned to titanium oxide in a non-printed region is 0.70 or less.

<12> The method for producing a print product according to any one of <9> to <11>, further comprising a transparent resin layer on the printable region.

<13> The method for producing a print product according to any one of <9> to <12>, wherein the sheet medium is selected from the group consisting of a package, a label, and a pressure-sensitive adhesive tape.

<14> The method for producing a print product according to any one of <9> to <13>, wherein the printing step is performed in an in-line manner.

<15> A printing medium for laser printing, comprising a sheet medium selected from the group consisting of paper or a film having a printable region onto which printing with ultraviolet laser is applicable, wherein a titanium oxide content in the printable region in the sheet medium is 1.0% by mass or more, pulp consti-tuting the paper has a length-weighted average fiber length of 0.5 mm or more and 3.0 mm or less, the pulp constituting the paper has an average fiber width of 14.0 μm or more and 35.0 μm or less, and the paper has a basis weight of 20 g/m² or more, when the sheet medium is the paper, and a titanium oxide content in the printable region in the sheet medium is 0.3% by mass or more, the film has a thickness of 15 μm or more, and a resin constituting the film comprises at least one selected from the group consisting of polyethylene, polypropylene, an ethylene-propylene copolymer, polyethylene terephthalate, poly-lactic acid, and polybutylene succinate, when the sheet medium is the film.

<16> A print product, wherein the print product has a printed region comprising discol-ored titanium oxide in at least one portion of a record-ing medium having a printable region comprising tita-nium oxide, the printable region of the recording medium has a coating layer comprising titanium oxide on a paper substrate, pulp constituting the paper substrate has a length-weighted average fiber length of 0.6 mm or more and 3.5 mm or less, a titanium oxide content in the coating layer is 0.6 g/m² or more and 30 g/m² or less, A/B is 0.01 or more and 2.00 or less under the assumption that the titanium oxide content in the coating layer is A g/m² and a thickness of the coating layer is B μm, and a ratio between a Raman intensity assigned to titanium oxide in the printed region and a Raman intensity assigned to titanium oxide in a non-printed region is 0.70 or less.

<17> The print product according to <16>, wherein the coating layer has a thickness of 0.4 μm or more and 30.0 μm or less.

<18> The print product according to <16> or <17>, wherein the coating layer comprises a thermoplastic resin in addition to titanium oxide.

<19> The print product according to <18>, wherein the thermoplastic resin is selected from the group consisting of a starch derivative, casein, shellac, polyvinyl alcohol, a polyvinyl alcohol derivative, an acrylic resin, and a maleic acid-based resin.

<20> The print product according to any one of <16> to <19>, wherein the titanium oxide is at least one selected from the group consisting of rutile-type titanium oxide and anatase-type titanium oxide.

<21> The print product according to any one of <16> to <20>, wherein a number-based proportion of a fine fiber having a fiber length of 0.2 mm or less in the pulp constituting the paper substrate is 6% or more and 16% or less.

<22> The print product according to any one of <16> to <21>, wherein the recording medium is selected from the group consisting of a package, a label, and a pressure-sensitive adhesive tape.

<23> The print product according to any one of <16> to <22>, wherein the recording medium further comprises a transparent resin layer on the coating layer.

<24> The print product according to <23>, wherein a resin constituting the transparent resin layer is at least one selected from the group consisting of polyethylene, polypropylene, polyethylene terephthalate, polyvinyl alcohol, and starch.

<25> The print product according to <23> or <24>, wherein the transparent resin layer is obtained by attaching a transparent resin film onto the sheet medium with an adhesive layer being interposed, or by laminating a transparent resin film onto the sheet medium.

<26> The print product according to any one of <23> to <25>, wherein the transparent resin layer has a thickness of 5 $\mu$m or more and 100 $\mu$m or less.

<27> A method for producing a print product, comprising a step of performing printing by irradiation of a recording medium with ultraviolet light and thus discoloration of an irradiated region, wherein a printable region of the recording medium has a coating layer comprising titanium oxide on a paper substrate, pulp constituting the paper substrate has a length-weighted average fiber length of 0.6 mm or more and 3.5 mm or less, a titanium oxide content in the coating layer is 0.6 g/m$^2$ or more and 30 g/m$^2$ or less, and A/B is 0.01 or more and 2.00 or less under the assumption that the titanium oxide content in the coating layer is A g/m$^2$ and a thickness of the coating layer is B $\mu$m.

<28> The method for producing a print product according to <27>, wherein the ultraviolet laser for irradiation has an output of 0.8 W or more.

<29> The method for producing a print product according to <27> or <28>, wherein the printing step is a step of performing irradiation with ultraviolet laser so that a ratio between a Raman intensity assigned to titanium oxide in a printed region and a Raman intensity assigned to titanium oxide in a non-printed region is 0.70 or less.

<30> The method for producing a print product according to any one of <27> to <29>, wherein the recording medium is selected from the group consisting of a package, a label, and a pressure-sensitive adhesive tape.

<31> The method for producing a print product according to any one of <27> to <30>, wherein the printing step is performed in an in-line manner.

<32> A printing medium for laser printing, wherein the printing medium has a printable region onto which printing with ultraviolet laser is applicable, the printable region of the printing medium has a coating layer comprising titanium oxide on a paper substrate, pulp constituting the paper substrate has a length-weighted average fiber length of 0.6 mm or more and 3.5 mm or less, a titanium oxide content in the coating layer is 0.6 g/m$^2$ or more and 30 g/m$^2$ or less, and A/B is 0.01 or more and 2.00 or less under the assumption that the titanium oxide content in the coating layer is A g/m$^2$ and a thickness of the coating layer is B $\mu$m.

<33> A print product, wherein the print product has a printed region comprising discolored titanium oxide in at least one portion of a sheet medium having a printable region comprising titanium oxide, the printable region of the sheet medium has a laminate layer comprising titanium oxide on a paper substrate, a titanium oxide content in the laminate layer is 0.1 g/m$^2$ or more, the titanium oxide content in the laminate layer is 1% by mass or more and 45% by mass or less, the laminate layer has a thickness of 10 $\mu$m or more and 200 $\mu$m or less, and a ratio between a Raman intensity assigned to titanium oxide in the printed region and a Raman intensity assigned to titanium oxide in a non-printed region is 0.70 or less.

<34> The print product according to <33>, wherein the laminate layer comprises a thermoplastic resin film comprising titanium oxide.

<35> The print product according to <34>, wherein the thermoplastic resin is selected from the group consisting of polyethylene, polypropylene, polyethylene terephthalate, polylactic acid, and polybutylene succinate.

<36> The print product according to any one of <33> to <35>, wherein the titanium oxide is at least one selected from the group consisting of rutile-type titanium oxide and anatase-type titanium oxide.

<37> The print product according to any one of <33> to <36>, wherein the print product is selected from the group consisting of a package, a label, and a pressure-sensitive adhesive tape.

<38> A method for producing a print product, comprising a step of performing printing by irradiation of a printable region of a sheet medium with ultraviolet laser and thus discoloration of an irradiated region, wherein the printable region of the sheet medium has a laminate layer comprising titanium oxide on a paper substrate, a titanium oxide content in the laminate layer is 0.1 g/m$^2$ or more, the titanium oxide content in the laminate layer is 1% by mass or more and 45% by mass or less, and the laminate layer has a thickness of 10 $\mu$m or more and 200 $\mu$m or less.

<39> The method for producing a print product according to <38>, wherein the ultraviolet laser for irradiation has an output of 0.8 W or more.

<40> The method for producing a print product according to <38> or <39>, wherein the printing step is a step of performing irradiation with ultraviolet laser so that a ratio between a Raman intensity assigned to titanium oxide in a printed region and a Raman intensity assigned to titanium oxide in a non-printed region is 0.70 or less.

<41> The method for producing a print product according to any one of <38> to <40>, wherein the print product is selected from the group consisting of a package, a label, and a pressure-sensitive adhesive tape.

<42> The method for producing a print product according to any one of <38> to <41>, wherein the printing step is performed in an in-line manner.

<43> A printing medium for laser printing, comprising a sheet medium having a printable region onto which printing with ultraviolet laser is applicable, wherein the printable region of the sheet medium has a laminate layer comprising titanium oxide on a paper substrate, a titanium oxide content in the laminate layer is 0.1 $g/m^2$ or more, the titanium oxide content in the laminate layer is 1% by mass or more and 45% by mass or less, and the laminate layer has a thickness of 10 μm or more and 200 μm or less.

Advantageous Effects of Invention

The present invention can provide a print product which has a printed region comprising discolored titanium oxide and which is excellent in viewability, a method for producing a print product by irradiation with ultraviolet laser, and a printing medium for laser printing, for use in the print product and the method for producing a print product.

DESCRIPTION OF EMBODIMENTS

[First Print Product]

Figure 1:
FIG. 1 illustrates a bar code printed out in Examples.

The first print product of the present invention (hereinafter, also simply referred to as "first print product") has a printed region comprising discolored titanium oxide in at least one portion of a sheet medium selected from the group consisting of paper or a film having a printable region comprising titanium oxide; titanium oxide is filled in the sheet medium; a titanium oxide content in the printable region in the sheet medium is 1.0% by mass or more, pulp constituting the paper has a length-weighted average fiber length of 0.5 mm or more and 3.0 mm or less, the pulp constituting the paper has an average fiber width of 14.0 μm or more and 35.0 μm or less, and the paper has a basis weight of 20 $g/m^2$ or more, when the sheet medium is the paper; a titanium oxide content in the printable region in the sheet medium is 0.3% by mass or more, the film has a thickness of 15 μm or more, and a resin constituting the film comprises at least one selected from the group consisting of polyethylene, polypropylene, an ethylene-propylene copolymer, polyethylene terephthalate, polylactic acid, and polybutylene succinate, when the sheet medium is the film; and a ratio between a Raman intensity assigned to titanium oxide in the printed region and a Raman intensity assigned to titanium oxide in a non-printed region is 0.70 or less.

The present invention can provide a print product which has a printed region comprising discolored titanium oxide and which is excellent in viewability. The print product of the present invention is excellent in clearness of print (print-out) and also excellent in solvent resistance. The phrase "excellent in print-out clearness (clearness of print-out)" also refers to the phrase "excellent in viewability."

The detailed reason why the above effects are obtained, although is not clear, is partially considered as follows. In the present invention, at least a printing medium is used which comprises a sheet medium selected from the group consisting of paper or a film in which titanium oxide is filled and which has a printable region where the titanium oxide content is a specified amount or more. It is considered that a print product excellent in viewability is obtained by allowing the printed region to comprise discolored titanium oxide and setting the ratio between the Raman intensity assigned to titanium oxide in the printed region and the Raman intensity assigned to titanium oxide in the non-printed region to 0.70 or less. It is considered that such discoloration of titanium oxide is the change from white to black due to the change in ionic valence of titanium oxide comprised in the sheet medium, from tetravalent to trivalent, and thus the occurrence of any oxygen defect, and therefore viewing can be made. The change in the ionic valence can be detected as the change in Raman intensity, and the ratio between the Raman intensity assigned to titanium oxide in the printed region and the Raman intensity assigned to titanium oxide in the non-printed region is set to a specified value or less to thereby provide a printed region high in viewability. It is considered that the ionic valence of titanium oxide is changed during irradiation with light energy corresponding to the band gap of titanium oxide. The band gap of titanium oxide, while is varied depending on the crystal system, is generally about 3.0 to 3.2 eV, and the wavelength of the corresponding light is 420 nm or less. Therefore, it is difficult to apply printing due to the change in ionic valence of titanium oxide as in the present invention, even by use of laser light at a wavelength of more than 420 nm (for example, 532 nm, 1064 nm, or 10600 nm).

It is considered that solvent resistance is also excellent because of color development by titanium oxide comprised in the sheet medium.

Such discoloration of titanium oxide is preferably performed by irradiation with ultraviolet laser. Here, smoking may occur due to irradiation with ultraviolet laser. It is considered that a phenomenon occurs where, when titanium oxide is heated by irradiation with ultraviolet laser, the surrounding moisture is instantaneously vaporized to result in desorption of discolored titanium oxide and a paper powder from the sheet medium, and it is considered that smoke is generated according to such desorption. The problem of smoking is caused when the sheet medium comprises moisture, and thus smoking tends to occur when the sheet medium is a paper sheet medium.

In the present embodiment, the printable region means a region (portion) onto which printing can be applied by discoloration of titanium oxide comprised in the sheet medium, preferably discoloration of titanium oxide in a portion irradiated with ultraviolet laser, from white to black, by irradiation with ultraviolet laser, and the printed region means a section of the printable region, in which titanium oxide is actually discolored, preferably such a section in which titanium oxide is discolored by irradiation with ultraviolet laser and which is viewable, namely, a portion irradiated with ultraviolet laser. The non-printed region means a region (portion) of the printable region, in which no titanium oxide is discolored, for example, a region (portion) not irradiated with ultraviolet laser.

Hereinafter, the first print product of the present invention will be described in more detail.

[Sheet Medium]

A printing medium serving as a printing subject comprises at least a sheet medium, and the sheet medium is selected from the group consisting of paper or a film having a printable region comprising titanium oxide, and has a printed region comprising discolored titanium oxide in at least one portion of the sheet medium. In the present invention, the printing medium may be a sheet medium itself comprising titanium oxide, or a transparent resin layer may be provided on the sheet medium. In other words, the "printing medium" means both a mode of the sheet medium by itself and a mode of the sheet medium with a transparent resin layer provided thereon.

When the sheet medium is the paper, the titanium oxide content in the printable region is 1.0% by mass or more, preferably 8.0% by mass or more, more preferably 15% by mass or more, further preferably 25% by mass or more, still more preferably 35% by mass or more from the viewpoint of providing a sufficient print-out density, and is preferably 50% by mass or less, more preferably 45% by mass or less from the viewpoint of leveling-off of the print-out density and suppression of an increase in cost due to an excessive amount of titanium oxide comprised.

When the sheet medium is the film, the titanium oxide content in the printable region is 0.3% by mass or more, preferably 0.5% by mass or more, preferably 2.0% by mass or more, more preferably 4.0% by mass or more from the viewpoint of providing a sufficient print-out density, and is preferably 50% by mass or less, more preferably 45% by mass or less, further preferably 35% by mass or less, still more preferably 25% by mass or less, still more preferably 15% by mass or less, still more preferably 10% by mass or less, still more preferably 7.5% by mass or less from the viewpoint of leveling-off of the print-out density and suppression of an increase in cost due to an excessive amount of titanium oxide comprised and from the viewpoint of suppression of a reduction in strength of the film.

The sheet medium may comprise titanium oxide at least in the printable region thereof, and a region where the titanium oxide content is less than the lower limit may be present in a region where no printing is applied. The sheet medium preferably comprises titanium oxide at a value equal to or more than the lower limit in the entire region thereof from the viewpoint of simplicity of production.

<Titanium Oxide>

Titanium oxide is filled (included) in the sheet medium, and is more preferably obtained by addition of titanium oxide to a sheet medium raw material and then papermaking or sheet formation.

The titanium oxide comprised in the sheet medium is represented by compositional formula $TiO_2$, and is also called titanium dioxide or titania.

The titanium oxide may have any crystal structure or may be amorphous, and is preferably at least one selected from the group consisting of rutile-type titanium oxide, anatase-type titanium oxide, brookite-type titanium oxide, and amorphous titanium oxide, more preferably at least one selected from the group consisting of rutile-type titanium oxide and anatase-type titanium oxide, and further preferably rutile-type titanium oxide from the viewpoints of availability and stability.

The crystal shape of the titanium oxide can be determined by a known method, and can be specifically determined by, for example, analysis of a Raman spectrum or XRD pattern. For example, when the crystal shape is identified from a Raman spectrum, in general, peaks at $447\pm3$ $cm^{-1}$ and 609

$cm^{-1}$ are observed in the case of a rutile-type and peaks at $395\pm3$ $cm^{-1}$, $516\pm3$ $cm^{-1}$, and $637\pm3$ $cm^{-1}$ are observed in the case of an anatase-type.

The titanium oxide may be used singly or in combinations of two or more kinds thereof.

The shape of the titanium oxide is not particularly limited, and may be any of, for example, irregular, spherical, rod, and acicular shapes.

When the titanium oxide is irregular or spherical, the particle size of the titanium oxide is not particularly limited, and is preferably 0.01 μm or more, more preferably 0.10 μm or more, further preferably 0.15 μm or more, and preferably 20.0 μm or less, more preferably 10.0 μm or less, further preferably 5.0 μm or less from the viewpoint of ease of retention in paper in a papermaking step and from the viewpoint of providing a sheet excellent in surface smoothness.

The particle size of the titanium oxide filled in the paper and film is calculated from a SEM image of ash obtained by burning of the sheet medium or the print product in a muffle furnace, the image being obtained with a scanning-type electron microscope (SEM, S5200 or the like manufactured by Hitachi High-Tech Corporation).

An ash sample to be tested with a scanning-type electron microscope can be produced by obtaining a 0.01% by mass slurry due to dispersion in ethanol by an ultrasonic homogenizer (LUH150 or the like manufactured by Yamato Scientific Co., Ltd.) having an output of 50 W over 5 minutes, and then casting 0.1 mL of the slurry on an aluminum dish and drying it at 60° C. Adjacent particles clearly distinguishable from each other are visually selected, and the longer size of one particle is defined as the particle size. When a primary particle and a secondary particle in an aggregated state are here clearly distinguishable from each other even if present in a mixed manner, such each particle is counted as one particle and the average size in 100 of such particles randomly selected is defined as the particle size. The magnification in SEM image observation may be appropriately selected depending on the particle size of the titanium oxide, and is preferably about 20000 times. When any particle other than the titanium oxide is comprised, a particle comprising a titanium element is subjected to measurement with an energy dispersive X-ray analyzer (EMAX or the like manufactured by Horiba Ltd.) attached to SEM.

The average particle size of a titanium oxide particle for use as a raw material can be determined as a median size measured with a laser diffraction/scattering type particle size distribution meter (LA-300 or the like manufactured by Horiba Ltd.). Measurement conditions are preferably the following conditions. The average particle size determined with the laser diffraction/scattering type particle size distribution meter may differ from the particle size calculated based on a scanning-type electron microscope photograph, by about ±50%.

Dispersion medium: ion-exchange water,
Refractive index of particle measured: 2.75-0.01 i,
Refractive index of solvent: 1.333,
Irradiation with built-in ultrasound (30 W): 3 minutes,
Rate of circulation: 3

When the titanium oxide is acicular, the longer size of the titanium oxide is not particularly limited, and is preferably 0.1 μm or more, more preferably 0.5 μm or more, further preferably 1.5 μm or more, and preferably 50.0 μm or less, more preferably 30.0 μm or less, further preferably 15.0 μm or less from the viewpoint of ease of retention in paper in a papermaking step and from the viewpoint of providing a sheet excellent in surface smoothness. The shorter size is preferably 0.01 μm or more, more preferably 0.03 μm or more, further preferably 0.05 μm or more, and preferably 3.0 μm or less, more preferably 1.5 μm or less, further preferably 1.0 μm or less. When the titanium oxide is acicular, the aspect ratio (longer size/shorter size) is preferably 5 or more, more preferably 10 or more, further preferably 15 or more, and preferably 300 or less, more preferably 100 or less, further preferably 30 or less.

The longer size and the shorter size of the titanium oxide filled in the paper and film can be measured from a SEM image of ash obtained by burning of the sheet medium or the print product in a muffle furnace and treated in the same manner as described above, the image being obtained with a scanning-type electron microscope (SEM, S5200 or the like manufactured by Hitachi High-Tech Corporation). A powder to be tested with the scanning-type electron microscope is obtained by the same method as described above.

The longer size and the shorter size of the titanium oxide for use as a raw material can also be measured from a SEM image obtained with the scanning-type electron microscope.

<Paper>

When the sheet medium is the paper, the sheet medium is also referred to as "paper sheet medium."

Examples of raw material pulp constituting the paper sheet medium include wood pulp, non-wood pulp, and deinking pulp. Examples of the wood pulp include, but not particularly limited, chemical pulp such as leaf bleached kraft pulp (LBKP), leaf unbleached kraft pulp (LUKP), needle bleached kraft pulp (NBKP), needle unbleached kraft pulp (NUKP), sulfite pulp (SP), dissolving pulp (DP), soda pulp (AP), and oxygen bleached kraft pulp (OKP), semi-chemical pulp such as semi-chemical pulp (SCP) and chemi-ground wood pulp (CGP), and mechanical pulp such as ground pulp (GP), thermomechanical pulp (TMP) and chemi-thermomechanical pulp (CTMP). Examples of the non-wood pulp include, but not particularly limited, cotton type pulp such as cotton linter and cotton lint, and non-wood type pulp such as hemp, wheat straw, bamboo and bagasse. Examples of the deinking pulp include, but not particularly limited, deinking pulp with waste paper as a raw material. The raw material pulp may be used singly or as a mixture of two or more of the above. The raw material pulp may be used as a mixture thereof with an organic synthetic fiber such as a polyamide fiber or a polyester fiber, a recycled fiber such as a polynosic fiber, or an inorganic fiber such as a glass fiber, a ceramic fiber, or a carbon fiber.

The raw material pulp is preferably any of wood pulp and deinking pulp from the viewpoint of availability. The raw material pulp is particularly wood pulp, preferably chemical pulp, more preferably kraft pulp, further preferably at least one selected from the group consisting of leaf kraft pulp of eucalyptus, acacia, and the like, and needle kraft pulp of pine, cryptomeria, and the like, still more preferably at least one selected from the group consisting of leaf bleached kraft pulp (LBKP) and needle bleached kraft pulp (NBKP), from the viewpoint of fiber distribution uniformity. In particular, one where the rate of LBKP is higher is more preferable, and, for example, the mixing ratio between LBKP and NBKP, LBKP/NBKP, is further preferably 75/25 to 100/0 (% by mass).

The length-weighted average fiber length of the pulp constituting the paper sheet medium is 0.5 mm or more, preferably 0.6 mm or more, and 3.0 mm or less, preferably 2.8 mm or less, more preferably 2.5 mm or less, further preferably 2.0 mm or less, still more preferably 1.5 mm or less, still more preferably 1.0 mm or less.

The length-weighted average fiber length of the pulp constituting the paper sheet medium is preferably 3.0 mm or less because the pulp is densely entangled each other to result in a reduction of void in the paper sheet medium and thus titanium oxide scattering can be suppressed in irradiation with ultraviolet laser and smoking is suppressed to thereby provide a print product excellent in viewability. The length-weighted average fiber length is preferably 0.5 mm or more because not only strength of the paper sheet medium is enhanced, but also any fiber is hardly lost from the paper sheet medium in irradiation with ultraviolet laser, and generation of a paper powder is suppressed and the amount of smoking is suppressed to result in excellent print-out clearness.

The length-weighted average fiber length of the pulp constituting the paper sheet medium is measured by a method described in Examples.

The average fiber width of the pulp constituting the paper sheet medium is 14.0 μm or more, preferably 15.0 μm or more, further preferably 15.5 μm or more, still more preferably 16.0 μm or more, and 35.0 μm or less, preferably 33.0 μm or less, more preferably 31.0 μm or less, further preferably 28.0 μm or less, still more preferably 24.0 μm or less, still more preferably 21.0 μm or less.

The average fiber width of the pulp constituting the paper sheet medium is preferably 35.0 μm or less because the pulp is densely entangled each other to result in a reduction of void in the paper sheet medium and thus titanium oxide scattering can be suppressed in irradiation with ultraviolet laser and smoking is suppressed to thereby provide a print product excellent in viewability. The average fiber width is preferably 14.0 μm or more because not only strength of the paper sheet medium is enhanced, but also any fiber is hardly lost from the paper sheet medium in irradiation with ultraviolet laser, and generation of a paper powder is suppressed and the amount of smoking is suppressed to result in excellent print-out clearness.

The average fiber width of the pulp constituting the paper sheet medium can be measured by a method described in Examples.

The number-based proportion of a fine fiber having a fiber length of 0.2 mm or less in the pulp constituting the paper sheet medium is preferably 6.2% or more, more preferably 6.5% or more, further preferably 6.8% or more, and preferably 30% or less, more preferably 24% or less, further preferably 16% or less.

The number-based proportion of such a fine fiber is preferably 6.2% or more because such a fine fiber is placed in a sheet so as to infill a void between fibers and thus titanium oxide scattering in irradiation with ultraviolet laser is suppressed to result in suppression of smoking in irradiation with ultraviolet laser and an enhancement in viewability. The number-based proportion of such a fine fiber is preferably 30% or less because smoking resulting from fine fiber scattering in irradiation with ultraviolet laser due to the increase of a fine fiber is suppressed.

The number-based proportion of a fine fiber having a fiber length of 0.2 mm or less in the pulp of the fiber constituting the paper sheet medium is determined by subjecting the paper sheet medium to defibration according to a method described in Examples and measuring the fiber length of the resulting pulp slurry with a fiber length measurement instrument (for example, Model FS-5 provided with UHD base unit, manufactured by Valmet K.K.). A fiber having a fiber length of 0.2 mm or less and a fiber width of 75 μm or less is defined as a fine fiber, and the number-based proportion of such a fine fiber relative to the pulp subjected to measurement is calculated.

The wood pulp for use in the paper sheet medium preferably has a freeness of 150 to 500 mL, in terms of Canadian standard freeness (CSF). When the freeness of the wood pulp is in the range, uniformity in filling of the titanium oxide is excellent. The CSF here means the Canadian standard freeness according to JIS P 8121-2:2012.

The paper sheet medium is obtained by papermaking with a pulp slurry to which a titanium oxide particle and, if necessary, a filling agent are added.

A loading material other than the titanium oxide may be, if necessary, appropriately added to the paper sheet medium. Examples of the loading material other than the titanium oxide can include kaolin, talc, heavy calcium carbonate, light calcium carbonate, calcium sulfite, gypsum, fired kaolin, white carbon, amorphous silica, delaminated kaolin, diatomaceous earth, magnesium carbonate, aluminum hydroxide, calcium hydroxide, magnesium hydroxide, and zinc hydroxide.

Not only the pulp, the titanium oxide, and the loading material, but also known filling agent(s) for papermaking, such as a sizing agent, a dry paper strengthening agent, a wet paper strengthening agent (for example, polyamide polyamine epichlorohydrin), a yield improver (for example, aluminum sulfate), a freeness improver, a pH adjuster, a softener, an antistatic agent, a defoamer, and/or a dye/pigment can be, if necessary, added into the paper sheet medium.

Examples of the sizing agent include rosin-based, alkyl ketene dimer-based, alkenyl succinic anhydride-based, styrene-acrylic, higher fatty acid-based, and petroleum resin-based sizing agents.

The basis weight of the paper sheet medium is 20 g/m$^2$ or more, preferably 40 g/m$^2$ or more, more preferably 50 g/m$^2$ or more, further preferably 60 g/m$^2$ or more, and preferably 600 g/m$^2$ or less, more preferably 400 g/m$^2$ or less, further preferably 200 g/m$^2$ or less, still more preferably 100 g/m$^2$ or less, from the viewpoint of viewability.

When the basis weight of the paper sheet medium is 20 g/m$^2$ or more, the paper sheet medium is high in opacity and a print product high in viewability is obtained. The upper limit of the basis weight of the paper sheet medium may be appropriately selected depending on the strength required according to the intended use or the like.

The basis weight is measured according to the method prescribed in JIS P 8124:2011.

The thickness of the paper sheet medium is not particularly limited, and is preferably 10 μm or more, more preferably 25 μm or more, further preferably 40 μm or more from the viewpoint that stiffness is imparted to the sheet medium to result in an enhancement in handleability, and is preferably 700 μm or less, more preferably 500 μm or less, further preferably 400 μm or less from the viewpoint that economic performance and handleability are enhanced. The thickness of the paper sheet medium can be measured according to the method described in JIS P 8118:2014.

The brightness of the paper sheet medium or the printing medium comprising the paper sheet medium may be appropriately selected depending on the intended use, is not particularly limited, and is preferably 9% or more, more preferably 50% or more, further preferably 80% or more from the viewpoints of ease of achievement of the contrast between a printed region and a non-printed region and of an enhancement in viewability, and is preferably 95% or less, more preferably 92% or less from the viewpoint of ease of production. The brightness of the paper sheet medium can be measured with a spectral brightness colorimeter (manufactured by Suga Test Instruments Co., Ltd.) according to the method described in JIS P 8148:2018.

A known wet paper machine, for example, a paper machine such as a long net paper machine, a gap former-type paper machine, a cylindrical paper machine, or a short net-type paper machine can be appropriately selected and used in papermaking of the paper sheet medium. Next, a paper layer formed by the paper machine is conveyed on a felt and dried by a dryer. A multi-stage cylinder dryer may also be used as a pre-dryer before drying by a dryer.

The paper sheet medium obtained as described above may be subjected to a surface treatment with a calender to thereby achieve uniformization of the thickness and profile and achieve an enhancement in printability. Such a calender treatment can be made by use of a known calender treatment machine appropriately selected.

<Film>

When the sheet medium is the film, the sheet medium is also referred to as "film medium."

The resin constituting the film medium is not particularly limited as long as it can allow the titanium oxide to be included and processed into a film form, and may be appropriately selected from the group consisting of known thermoplastic resins, and specific examples thereof include polyester-based resins such as polyethylene terephthalate, polybutylene terephthalate, and polyethylene naphthalate, polyvinyl chloride, polyvinylidene chloride, polybutene, polybutadiene, an ethylene-vinyl acetate copolymer, polyolefin-based resins such as polyethylene, polypropylene, an ethylene-propylene copolymer, and polymethylpentene; polycarbonate; polyurethane; polyamide; polyacrylonitrile; and poly(meth)acrylate.

In particular, the resin constituting the film medium preferably comprises polyolefin such as polyethylene, polypropylene, or an ethylene-propylene copolymer, or polyester such as polyethylene terephthalate, polybutylene terephthalate, polylactic acid, or polybutylene succinate, more preferably comprises at least one selected from the group consisting of polyethylene, polypropylene, an ethylene-propylene copolymer, polyethylene terephthalate, polylactic acid, and polybutylene succinate, and is further preferably at least one selected from the group consisting of polyethylene, polypropylene, an ethylene-propylene copolymer, polyethylene terephthalate, polylactic acid, and polybutylene succinate from the viewpoints of being able to be used for a general purpose, of being high in transmittance of ultraviolet light, and of allowing for discoloration of the titanium oxide also inside the film medium. The resin constituting the film medium is still further preferably polyolefin, still further preferably at least one selected from the group consisting of polyethylene and polypropylene.

These resins may be used singly or in combinations of two or more kinds thereof.

The film medium may be produced by a conventionally known production method appropriately selected, and such a method may be appropriately selected from the group consisting of a melt extrusion method, a melt casting method, a calender method, and the like.

The film may be produced by mixing the titanium oxide with the resin so that the titanium oxide content in the printed region of the film medium falls within the above range.

The film medium here used may be synthetic paper where the titanium oxide content falls within the range in the present invention.

The thickness of the film medium is 15 μm or more, preferably 20 μm or more, more preferably 40 μm or more, further preferably 50 μm or more, still more preferably 55 μm or more, and preferably 700 μm or less, more preferably 500 μm or less, further preferably 350 μm or less, still more preferably 250 μm or less from the viewpoint that a print product excellent in strength is obtained.

The thickness of the film medium preferably falls within the range because, while degradation of the resin is observed in the vicinity of the surface of the film in the case of irradiation of the film medium with ultraviolet laser, the thickness of the film medium is sufficient to thereby suppress a reduction in strength of the print product.

[Raman Intensity]

The printed region in the first print product of the present invention means a region (portion) comprising discolored titanium oxide in a printable region, and is preferably a region (portion) where printing with ultraviolet laser is applied. The non-printed region means a region (portion) where no printing is applied in a printable region.

The ratio between the Raman intensity assigned to titanium oxide in the printed region and the Raman intensity assigned to titanium oxide in the non-printed region (Raman intensity in printed region/Raman intensity in non-printed region) is 0.70 or less. The Raman intensity ratio falls within the range to thereby allow a print product excellent in viewability to be obtained.

The Raman intensity ratio (Raman intensity in printed region/Raman intensity in non-printed region) is as follows. When the titanium oxide used is rutile-type titanium oxide, the Raman intensity assigned to the titanium oxide is contrasted with the Raman intensity at the maximum value in the wavenumber range of $447\pm3$ cm$^{-1}$. When the titanium oxide used is anatase-type titanium oxide, the Raman intensity assigned to the titanium oxide is contrasted with the Raman intensity at the maximum value in the wavenumber range of $516\pm3$ cm$^{-1}$.

When rutile-type titanium oxide and anatase-type titanium oxide co-exist, the Raman intensity assigned to the rutile-type titanium oxide is contrasted.

It is preferable in the print product of the present invention that the non-printed region be white and the printed region be black.

The non-printed region preferably has a color value of 10 in the Munsell color system, namely, is white. On the other hand, the printed region preferably has a color value of any of 0 to 8, more preferably 0 to 6, further preferably 0 to 4 in the Munsell color system.

It is preferable for providing the above color in the Munsell color system to appropriately adjust the titanium oxide content in the sheet medium, other properties of the sheet medium (in the case of the paper sheet medium, the length-weighted average fiber length and the average fiber width of the pulp constituting the paper sheet medium, and the basis weight of the paper sheet medium; and in the case of the film medium, the type of the resin, the thickness of the film medium, and the like), and conditions of irradiation with ultraviolet laser (for example, average output, repeat frequency, and wavelength).

The first print product of the present invention is suitably used in, for example, a package, a label, or pressure-sensitive adhesive tape.

Examples of the package include liner base paper (in particular, liner base paper on the outermost surface) of a cardboard, a packaging box, a milk pack, a liquid container for beverages (preferably a liquid paper container for beverages), such as a paper cup, a food tray, and a skin pack, examples of the label include label base paper, a pressure-sensitive label, and a pressure-sensitive sheet, and examples of the pressure-sensitive adhesive tape include a pressure-sensitive adhesive tape and a kraft tape.

Figure 5:
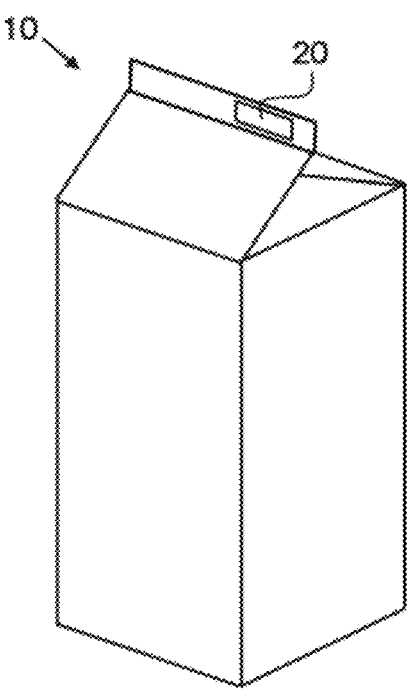
FIG. 5 is a schematic perspective view of one example of a liquid container having a printed region.

As illustrated in FIG. 5, a liquid container 10 as one example of the package has, for example, a printed region 20 on a surface. The printed region 20 is irradiated with ultraviolet laser and thus characters such as a date are here printed out.

[Transparent Resin Layer]

The print product of the present invention also preferably further comprises a transparent resin layer on a printable region of the sheet medium.

In other words, a printing medium is preferably used where a transparent resin layer is further provided in advance on a sheet medium whose printable region comprises titanium oxide in a predetermined amount or more.

It has been found that the above configuration provides a clearer print image high in print-out density. The detailed reason for this, although is not clear, is partially presumed as follows.

It is considered that a phenomenon occurs where, when titanium oxide is heated by irradiation with ultraviolet laser, the surrounding moisture is instantaneously vaporized to result in desorption of discolored titanium oxide from the sheet medium. It is considered that the transparent resin layer is provided in advance on the sheet medium to result in suppression of desorption of discolored titanium oxide described above and an increase in print-out density.

Since the effect due to the transparent resin layer provided is high when the sheet medium contains moisture, the transparent resin layer is particularly preferably comprised when the sheet medium is the paper sheet medium.

The total light transmittance of the transparent resin layer is 80% or more, preferably 85% or more, more preferably 90% or more, further preferably 91% or more, and 100% or less. The upper limit is not particularly limited.

The total light transmittance is measured according to JIS K 7361-1:1997.

The resin constituting the transparent resin layer is not particularly limited as long as it has a total light transmittance of 80% or more and it can be provided on the sheet substrate, and is preferably at least one selected from the group consisting of polyethylene, polypropylene, polyethylene terephthalate, polyvinyl alcohol, and starch, more preferably at least one selected from the group consisting of polyethylene, polypropylene, polyethylene terephthalate, and polyvinyl alcohol, further preferably polyethylene and/or polypropylene, particularly preferably polyethylene, from the viewpoints of transparency and of ease of providing of the transparent resin layer, when the transparent resin layer and the sheet medium are attached with an adhesive layer being interposed or are stacked by lamination.

When the transparent resin layer is provided by coating, an acrylic resin, a styrene-maleic acid resin, a water-soluble polyurethane resin, a water-soluble polyester resin, and the like are exemplified.

The acrylic resin is, for example, a resin obtained by copolymerizing a (meth)acrylic acid with other monomer such as an alkyl ester of the (meth)acrylic acid, styrene, an unsaturated carboxylic acid other than the (meth)acrylic acid, ethylene, or propylene, and is specifically, for example, an ethylene-(meth)acrylic acid copolymer or a styrene-acrylic acid-maleic acid resin, preferably an ethylene-(meth) acrylic acid copolymer.

The transparent resin layer and the sheet medium may be stacked by any method, and preferably the transparent resin layer and the sheet medium are attached with an adhesive layer being interposed, are laminated, or a transparent coating material is applied in the form of a liquid coating material, without any particular limitation, from the viewpoint of ease of production.

When the transparent resin layer is locally provided, attachment is preferably made with an adhesive from the viewpoint of ease of production. When the transparent resin layer is widely provided, lamination is preferably adopted.

The adhesive layer is not particularly limited, and may be appropriately selected from the group consisting of known adhesive layers and then used. Specifically, a pressure-sensitive adhesive layer of JP 2012-57112 A is exemplified.

The thickness of the transparent resin layer is not particularly limited, and is preferably 5 μm or more, more preferably 10 μm, further preferably 15 μm or more, and preferably 100 μm or less, more preferably 75 μm or less, further preferably 50 μm or less from the viewpoint of achievement of clear printing-out and from the viewpoint of handleability of the print product and the printing medium.

[Method for Producing First Print Product]

A method for producing a first print product of the present invention comprises a step of performing printing by irradiation of a sheet medium itself selected from the group consisting of paper or a film, or a printing medium where such a sheet medium further comprises a transparent resin layer, with ultraviolet laser and thus discoloration of an irradiated region, wherein titanium oxide is filled in the sheet medium, and the titanium oxide content in the sheet medium is predetermined amount or more.

The sheet medium and printing medium for use in the method for producing a first print product of the present invention are, for example, the same sheet medium and printing medium as in the first print product, and preferable ranges thereof are also the same as in the first print product. In the method for producing a first print product of the present invention, at least the titanium oxide content in the region irradiated with ultraviolet laser may be a predetermined amount or more, the titanium oxide content in the non-irradiated region is not particularly limited, and the titanium oxide content in the non-irradiated region is also preferably the above-mentioned predetermined amount or more because titanium oxide is filled in the sheet medium.

Such irradiation with ultraviolet laser is preferably made so that the ratio between the Raman intensity assigned to titanium oxide in the printed region and the Raman intensity assigned to titanium oxide in the non-printed region is 0.70 or less.

The Raman intensities in the printed region and the non-printed region are as described above with respect to the print product.

[Conditions of Irradiation with Ultraviolet Laser]

The wavelength of ultraviolet laser is preferably 370 nm or less, more preferably 365 nm or less, further preferably 360 nm or less, and preferably 260 nm or more, more preferably 340 nm or more, further preferably 350 nm or more from the viewpoint of an enhancement in viewability of the printed region.

The average output of ultraviolet laser is preferably 0.3 W or more, more preferably 0.8 W or more, further preferably 1.2 W or more, still more preferably 1.8 W or more from the viewpoint of an enhancement in viewability of the printed region, and is preferably 30 W or less, more preferably 25 W or less, further preferably 20 W or less, still more preferably 15 W or less, still more preferably 10 W or less, still more preferably 6 W or less from the viewpoint of economic performance.

The repeat frequency of ultraviolet laser is preferably 10 kHz or more, more preferably 20 kHz or more, further preferably 30 kHz or more, and preferably 100 kHz or less, more preferably 80 kHz or less, further preferably 60 kHz or less from the viewpoint of an enhancement in viewability of the printed region.

The spot size of ultraviolet laser is preferably 10 μm or more, more preferably 20 μm or more, further preferably 30 μm or more, and preferably 300 μm or less, more preferably 240 μm or less, further preferably 180 μm or less, further preferably 120 μm or less from the viewpoint of achievement of a clear image and from the viewpoint of ease of printing.

The scanning speed of ultraviolet laser is preferably 500 mm/sec or more, more preferably 1000 mm/sec or more, further preferably 2000 mm/sec or more, and preferably 7000 mm/sec or less, more preferably 6000 mm/sec or less, further preferably 5000 mm/sec or less from the viewpoints of high-speed printing and of viewability of the printed region.

The line pitch of ultraviolet laser is preferably 10 μm or more, more preferably 20 μm or more, further preferably 30 μm or more, and preferably 300 μm or less, more preferably 250 μm or less, further preferably 200 μm or less from the viewpoint of achievement of a clear image and from the viewpoint of availability of an apparatus.

[Aspects of Method for Producing First Print Product]

The method for producing a first print product of the present invention can be performed in various aspects.

Hereinafter, various aspects where the method for producing a first print product of the present invention can be applied are exemplified, but the method for producing a first print product of the present invention is not limited to the following aspects. The information to be printed is not particularly limited, and is preferably variable information.

The method for producing a first print product of the present invention is preferably performed in an in-line manner.

(1) Direct Printing onto Package

A first embodiment of the method for producing a first print product of the present invention relates to a method for printing information onto a package comprising titanium oxide, and the method comprises a step of performing direct printing onto the package being moved on a packaging line or being intermittently stopped, with ultraviolet laser.

In the method for producing a print product of the first embodiment, the package is produced from a printing medium which comprises a sheet medium comprising a predetermined amount or more of titanium oxide, and direct printing is applied with ultraviolet laser. At least the outermost layer of the package may be produced from the printing medium comprising a sheet medium comprising a predetermined amount or more of titanium oxide.

The package is, for example, a cardboard or a box, and it is preferable to perform direct printing onto a side surface or an upper surface of the package with ultraviolet laser.

(2) Printing onto Label

A second embodiment of the method for producing a first print product of the present invention relates to a method for printing information onto a label comprising titanium oxide. A printing medium constituting a printing surface of the label comprises a sheet medium comprising a predetermined amount or more of titanium oxide.

The label onto which printing is applied is preferably attached to the package by use of a label attachment apparatus. The label attachment apparatus is any of various label attachment apparatuses proposed.

In a first label attachment apparatus, an adhesive is provided to label base paper wound in a roll shape, and then attached to an article. More specifically, there is exemplified a roll labeler comprising a cutting tool which cuts label base paper wound in a roll shape, to a predetermined length, every one sheet, a pasting conveyance tool which receives the label base paper cut by the cutting tool, by a label base paper support coated with an adhesive, and allows the adhesive to adhere to a rear surface of the label base paper, and a pasting/attaching tool which receives the label base paper (label) to which the adhesive is provided, from the pasting conveyance tool, and attaches it to an article such as a container, wherein a rotation conveyance tool having a label supporting surface on an outer surface is provided between the cutting tool and the pasting conveyance tool. The roll labeler is exemplified in JP H6-64637 A.

There are also exemplified an aspect of a roll labeler comprising a cutting tool which cuts label base paper wound in a roll shape, to a predetermined length, every one sheet, a delivery roll that delivers the label base paper to an attachment roll, and a pasting roll that imparts a paste to the label base paper retained by the attachment roll, and such an aspect where the delivery roll is not required.

It is preferable to perform irradiation with ultraviolet laser before or after cutting of label base paper wound in a roll shape, to a predetermined length, and before delivery to the next roll or the like. A front surface or a rear surface of the label base paper wound in a roll shape corresponds to a front surface or a rear surface in attachment to the package, depending on the aspect of the roll labeler, and thus irradiation with ultraviolet laser is performed depending on the aspect.

In a second label attachment apparatus, a pressure-sensitive label roll is used as a label.

In the case of use of a release paper-attached pressure-sensitive label roll, there is exemplified, for example, an attachment apparatus comprising a release paper separation tool which separates a pressure-sensitive label and release paper, a delivery roll which receives the pressure-sensitive label from which the release paper is separated, and an attachment roll which draws the pressure-sensitive label from the delivery roll and attaches the label to an article (package). It is preferable to perform irradiation with ultraviolet laser before separation of the release paper or after separation of the release paper and before supporting by the attachment roll.

There is also exemplified an apparatus comprising a mechanism which mounts a release paper-attached pressure-sensitive label roll and separates a pressure-sensitive label and release paper, and a mechanism which attaches the label immediately after separation, wherein printing is applied by ultraviolet laser in the lead up to separation of the release paper from the pressure-sensitive label roll mounted. The above method for attaching the pressure-sensitive label is also referred to as "unidirectional installation."

There is further exemplified a label attachment apparatus comprising a mechanism which mounts a release paper-attached pressure-sensitive label roll and separates release paper from a pressure-sensitive label, and a mechanism which attaches the pressure-sensitive label to an article (package), wherein the mechanism for attachment is a syringe system, an air-jet system, or a robot arm system. It is preferable to perform irradiation with ultraviolet laser in the lead up to separation of the release paper from the release paper-attached pressure-sensitive label roll mounted.

The label here used may be a liner-less pressure-sensitive label. The liner-less pressure-sensitive label is a label with no release paper, and is characterized by being inexpensive because the number of labels per roll is large and no release paper is present as compared with the case of use of the release paper-attached pressure-sensitive label roll.

Such a label attachment apparatus using the liner-less pressure-sensitive label is, for example, an apparatus comprising a mechanism which mounts a liner-less label roll, a cutting mechanism which cuts a liner-less label every one label, and an attachment mechanism which attaches the liner-less label cut, to an article (package), wherein the attachment mechanism is a cylinder system or a robot arm system. It is preferable to perform printing by irradiation with ultraviolet laser between the mechanism which mounts a liner-less label roll and the cutting mechanism, or in the lead up to sending of the liner-less label cut, to the attachment mechanism.

In a third label attachment apparatus, a printing medium comprising a sheet medium comprising a predetermined amount or more of titanium oxide is attached to an article (package) and then printing with ultraviolet laser is performed.

The label attachment method is performed with reference to the above first apparatus and second apparatus.

(3) Printing onto Pressure-Sensitive Adhesive Tape

A third embodiment of the method for producing a first print product of the present invention is an aspect where the printing medium comprising a sheet medium comprising a predetermined amount or more of titanium oxide is a pressure-sensitive adhesive tape.

In other words, the method for producing a print product of the third embodiment comprises a step of attaching a pressure-sensitive adhesive tape produced from the printing medium comprising the sheet medium, to an article (package), and a step of performing printing with ultraviolet laser before the attachment step or after the attachment step.

A printing apparatus may also be used in which a printing-out apparatus with ultraviolet laser is incorporated into a cardboard sealing machine. Specifically, the apparatus comprises a mechanism which provides winding of a pressure-sensitive adhesive tape, a mechanism comprising a conveyor for conveying a cardboard, which folds a flap of a cardboard, and a mechanism which attaches the pressure-sensitive adhesive tape and seals the cardboard, and also comprises a mechanism which performs printing onto the pressure-sensitive adhesive tape with ultraviolet laser during or after attachment of the pressure-sensitive adhesive tape.

The first print product and the method for producing a first print product of the present invention are not limited to the above aspects, and can be applied to various applications where printing is demanded.

[First Printing Medium for Laser Printing]

A first printing medium for laser printing of the present invention comprises a sheet medium selected from the group consisting of a paper or a film having a printable region onto which printing with ultraviolet laser is applicable; a titanium oxide content in the printable region in the sheet medium is 1.0% by mass or more, pulp constituting the paper has a length-weighted average fiber length of 0.5 mm or more and 3.0 mm or less, the pulp constituting the paper has an average fiber width of 14.0 μm or more and 35.0 μm or less, and the paper has a basis weight of 20 g/m² or more, when the sheet medium is the paper; and a titanium oxide content in the printable region in the sheet medium is 0.3% by mass or more, the film has a thickness of 15 μm or more, and a resin constituting the film comprises at least one selected from the group consisting of polyethylene, polypropylene, an ethylene-propylene copolymer, polyethylene terephthalate, polylactic acid, and polybutylene succinate, when the sheet medium is the film. The first printing medium for laser printing of the present invention can be irradiated with ultraviolet laser and thus printing can be performed.

A preferable aspect of the first printing medium for laser printing is the same as a preferable aspect of the sheet medium of the first print product, and a preferable aspect of the method for performing printing onto the first printing medium for laser printing is the same as a preferable aspect of the method for producing a first print product.

[Second Print Product]

The second print product of the present invention (hereinafter, also simply referred to as "second print product") has a printed region comprising discolored titanium oxide in at least one portion of a recording medium having a printable region comprising titanium oxide (hereinafter, also referred to as "printing medium"), the printable region of the recording medium has a coating layer comprising titanium oxide on a paper substrate, pulp constituting the paper substrate has a length-weighted average fiber length of 0.6 mm or more and 3.5 mm or less, a titanium oxide content in the coating layer is 0.6 g/m² or more and 30 g/m² or less, A/B is 0.01 or more and 2.00 or less under the assumption that the titanium oxide content in the coating layer is A g/m² and a thickness of the coating layer is B μm, and a ratio between a Raman intensity assigned to titanium oxide in the printed region and a Raman intensity assigned to titanium oxide in a non-printed region is 0.70 or less.

The present invention can provide a print product having a printed region comprising discolored titanium oxide. The print product of the present invention is excellent in clearness of print (print-out) and also excellent in solvent resistance. The phrase "excellent in print-out clearness (clearness of print-out)" also refers to the phrase "excellent in viewability."

The detailed reason why the above effects are obtained, although is not clear, is partially considered as follows. In the present invention, a recording medium is used which comprises, on a substrate, a coating layer where the titanium oxide content is 0.6 g/m² or more and 30 g/m² or less, as a printable region. It is considered that a print product excellent in viewability is obtained by allowing the printed region to comprise discolored titanium oxide and setting the ratio between the Raman intensity assigned to titanium oxide in the printed region and the Raman intensity assigned to titanium oxide in the non-printed region to 0.70 or less. It is considered that such discoloration of titanium oxide is the change from white to black due to the change in ionic valence of titanium oxide comprised in the coating layer, from tetravalent to trivalent, and thus the occurrence of any oxygen defect, and therefore viewing can be made. The change in the ionic valence can be detected as the change in Raman intensity, and the ratio between the Raman intensity assigned to titanium oxide in the printed region and the Raman intensity assigned to titanium oxide in the non-printed region is set to a specified value or less to thereby provide a print product high in viewability. It is considered that the ionic valence of titanium oxide is changed during irradiation with light energy corresponding to the band gap of titanium oxide. The band gap of titanium oxide, while is varied depending on the crystal system, is generally about 3.0 to 3.2 eV, and the wavelength of the corresponding light is 420 nm or less. Therefore, it is difficult to apply printing due to the change in ionic valence of titanium oxide as in the present invention, even by use of laser light at a wavelength of more than 420 nm (for example, 532 nm, 1064 nm, or 10600 nm).

It is considered that solvent resistance is also excellent because of color development by titanium oxide comprised in the coating layer.

Such discoloration of titanium oxide is preferably here performed by irradiation with ultraviolet laser.

It is considered that the length-weighted average fiber length of the pulp constituting the paper substrate falls within a specified range to thereby allow a print product suppressed in variation in coating and excellent in print-out clearness to be obtained.

The A/B is 0.01 or more and 2.00 or less under the assumption that the titanium oxide content in the coating layer is defined as A g/m² and the thickness of the coating layer is defined as B μm, and it is considered that the titanium oxide concentration in the coating layer is thus controlled in a proper range and, as a result, titanium oxide scattering in an irradiated portion by irradiation with ultraviolet laser is suppressed and a print product more excellent in viewability is obtained.

In the present embodiment, the printable region means a region (portion) onto which printing can be applied by discoloration of titanium oxide comprised in the coating layer, preferably discoloration of titanium oxide in a portion irradiated with ultraviolet laser, from white to black, by irradiation with ultraviolet laser, and the printed region means a section of the printable region, in which titanium oxide is actually discolored, preferably such a section in which titanium oxide is discolored by irradiation with ultraviolet laser and which is viewable, namely, a portion irradiated with ultraviolet laser. The non-printed region means a region (portion) of the printable region, in which no titanium oxide is discolored, for example, a region (portion) not irradiated with ultraviolet laser.

Hereinafter, the present invention will be described in more detail.

[Recording Medium]

The recording medium serving as a printing subject has a printable region comprising titanium oxide, and has a printed region comprising discolored titanium oxide in at least one portion of the printable region.

The recording medium comprises a coating layer comprising titanium oxide, on the paper substrate. The coating layer may be formed on at least one surface or both surfaces of the paper substrate, and the recording medium preferably comprises the coating layer on only one surface thereof. The recording medium may comprise the coating layer on the entire surface thereof, or may comprise the coating layer on only a partial region (portion) onto which printing is desirably applied.

<Coating Layer>

The titanium oxide content in the coating layer constituting the printable region is 0.6 g/m² or more and 30 g/m² or less.

The titanium oxide content in the coating layer is 0.6 g/m² or more, preferably 0.8 g/m² or more, more preferably 1.0 g/m² or more, further preferably 1.2 g/m² or more from the viewpoint of providing a sufficient print density, and the content is 30 g/m² or less, preferably 25 g/m² or less, more preferably 20 g/m² or less, further preferably 15 g/m² or less, still more preferably 10 g/m² or less from the viewpoint of leveling-off of the print density and suppression of an increase in cost due to an excessive amount of titanium oxide comprised and from the viewpoint of suppression of the variation in print-out and the amount of smoking.

The recording medium may comprise the above content of titanium oxide in at least the printable region, a portion where no coating layer is provided may be present in a region where no printing is applied, and a region may be present where a coating layer having a titanium oxide content of less than 0.6 g/m² or more than 30 g/m² is provided. It is preferable from the viewpoint of simplicity of production that the coating layer having a titanium oxide content of 0.6 g/m² or more and 30 g/m² or less be provided on the sheet substrate in the entire region of the sheet medium.

The titanium oxide content in the coating layer (solid content) is preferably 1% by mass or more, more preferably 3% by mass or more, further preferably 5% by mass or more, still more preferably 7% by mass or more from the viewpoint of providing a sufficient print-out density, and is preferably 95% by mass or less, more preferably 85% by mass or less, further preferably 75% by mass or less, still more preferably 60% by mass or less, still more preferably 50% by mass or less, still more preferably 40% by mass or less, still more preferably 30% by mass or less from the viewpoint of leveling-off of the print density and suppression of an increase in cost due to an excessive amount of titanium oxide comprised, and from the viewpoint of ease of formation of the coating layer.

The thickness of the coating layer is preferably 0.4 μm or more, more preferably 0.6 μm or more, further preferably 0.8 μm or more from the viewpoint of providing a sufficient print-out density and from the viewpoint of ease of coating, and is preferably 40.0 μm or less, more preferably 30.0 μm or less, further preferably 20.0 μm or less, still more preferably 15.0 μm or less, still more preferably 10.0 μm or less from the viewpoint of leveling-off of the print density and from the viewpoint of ease of coating layer formation.

The thickness of the coating layer is measured from an observation image of a cross section of the recording medium with an electron microscope (SEM).

When the titanium oxide content in the coating layer is defined as A g/m² and the thickness of the coating layer is defined as B μm, the A/B is 0.01 or more, preferably 0.03 or more, more preferably 0.05 or more, and 2.00 or less, preferably 1.95 or less, more preferably 1.80 or less, further preferably 1.50 or less, still more preferably 1.20 or less, still more preferably 1.00 or less.

The A/B in the coating layer preferably falls within the range because the titanium oxide content in the coating layer is in a proper range and titanium oxide scattering from the coating layer is prevented in irradiation with ultraviolet light to thereby suppress smoking and furthermore allow a print product excellent in print-out clearness to be obtained.

The substrate of the recording medium is the paper substrate, as described below, and the paper substrate itself may comprise titanium oxide. The paper substrate comprises titanium oxide to result in a tendency to provide a clearer image.

The entire titanium oxide content is 0.6 g/m² or more, preferably 0.8 g/m² or more, more preferably 1.0 g/m² or more, and is preferably 35 g/m² or less, more preferably 30 g/m² or less, further preferably 25 g/m² or less from the viewpoint of leveling-off of the print density. When the substrate comprises titanium oxide, the titanium oxide content in the entire recording medium is the total amount of the titanium oxide content in the substrate and the titanium oxide content in the coating layer.

When the substrate comprises titanium oxide, the titanium oxide content in the substrate is preferably 1 g/m² or more, more preferably 2.5 g/m² or more, further preferably 5 g/m² or more, still more preferably 10 g/m² or more.

The coating layer preferably comprises a thermoplastic resin in addition to titanium oxide.

(Titanium Oxide)

The titanium oxide is preferably comprised in a coating liquid for the coating layer and coated with the liquid, and the coating liquid is more preferably an aqueous coating liquid.

The titanium oxide comprised in the coating layer is, for example, the same as the titanium oxide for use in the first print product, and preferable crystal structure and shape thereof are also the same as in the first print product.

When the titanium oxide is irregular or spherical, the particle size of the titanium oxide is preferably in the same range as that of the titanium oxide for use in the first print product from the viewpoint of providing a sheet medium excellent in surface smoothness.

The particle size of the titanium oxide in the coating layer is calculated from a SEM image of ash obtained by burning of the recording medium or print product in a condition of 525° C. in a muffle furnace, the image being obtained with a scanning-type electron microscope (SEM, S5200 or the like manufactured by Hitachi High-Tech Corporation).

An ash sample to be tested with a scanning-type electron microscope is produced by obtaining a 0.01% by mass slurry due to dispersion in ethanol by an ultrasonic homogenizer (LUH150 or the like manufactured by Yamato Scientific Co., Ltd.) having an output of 50 W over 5 minutes, then casting 0.1 mL of the slurry on an aluminum dish and drying it at 60° C., and then cutting out the aluminum dish to a size suited for testing with SEM. Adjacent particles clearly distinguishable from each other are visually selected, and the longer size of one particle is defined as the particle size. When a primary particle and a secondary particle in an aggregated state are here clearly distinguishable from each other even if present in a mixed manner, such each particle is counted as one particle and the average size in 100 of such particles randomly selected is defined as the particle size. The magnification in SEM image observation may be appropriately selected depending on the particle size of the titanium oxide, and is preferably about 20000 times. When any particle other than the titanium oxide is comprised, a particle comprising a titanium element is subjected to measurement with an energy dispersive X-ray analyzer (EMAX or the like manufactured by Horiba Ltd.) attached to SEM.

When the substrate is paper comprising titanium oxide, the coating layer is transferred to a transparent pressure-sensitive adhesive tape (309SN manufactured by 3M Company) having no titanium oxide and no inorganic pigment, and thus such an ash sample is produced. Specifically, a tape press-bonding roller (No349 or the like manufactured by Yasuda Seiki Seisakusho, Ltd.) having a roller mass of 2 kg is used to attach the pressure-sensitive adhesive tape to an upper layer of the coating layer. Thereafter, such a pressure-sensitive adhesive tape comprising the coating layer is immersed in a copper ethylenediamine solution (manufactured by Merck Millipore Corporation) for cellulose viscosity measurement, for 24 hours, and then well washed with ion-exchange water. The moisture on the resulting pressure-sensitive adhesive tape comprising the coating layer is wiped off, and the tape is dried with a drying machine at 60° C. for 1 hour. Thereafter, ash for use in particle size measurement is produced by burning with a muffle furnace at 525° C., and the particle size is measured according to the same method as described above.

The average particle size of a titanium oxide particle for use as a raw material is measured by the same method as the measurement method with respect to the first print product.

When the titanium oxide is acicular, respective preferable ranges of the longer size, the shorter size, and the aspect ratio (longer size/shorter size) of the titanium oxide are preferably the same ranges of those of the titanium oxide for use in the first print product.

The longer size and the shorter size of the titanium oxide comprised in the coating layer can be measured from a SEM image of ash obtained by burning of the recording medium or the print product in a muffle furnace and treated in the same manner as described above, the image being obtained with a scanning-type electron microscope (SEM, S5200 or the like manufactured by Hitachi High-Tech Corporation). A powder to be tested with a scanning-type electron microscope is obtained by the same method as described above.

The longer size and the shorter size of the titanium oxide for use as a raw material can also be measured from a SEM image obtained with a scanning-type electron microscope.

When the substrate is paper comprising titanium oxide, the coating layer is transferred to a transparent pressure-sensitive adhesive tape (309SN manufactured by 3M Company) having no titanium oxide and no inorganic pigment, and thus such an ash sample is produced. Specifically, a tape press-bonding roller (No349 or the like manufactured by Yasuda Seiki Seisakusho, Ltd.) having a roller mass of 2 kg is used to attach the pressure-sensitive adhesive tape to an upper layer of the coating layer. Thereafter, such a pressure-sensitive adhesive tape comprising the coating layer is immersed in a copper ethylenediamine solution (manufactured by Merck Millipore Corporation) for cellulose viscosity measurement, for 24 hours, and then well washed with ion-exchange water. The moisture on the resulting pressure-sensitive adhesive tape comprising the coating layer is wiped off, and the tape is dried with a drying machine at 60° C. for 1 hour. Thereafter, ash for use in particle size measurement is produced by burning with a muffle furnace at 525° C., and the longer size and the shorter size are measured according to the same method as described above.

(Thermoplastic Resin)

The thermoplastic resin for use in the coating layer serves as a binder. The thermoplastic resin in the coating layer is not particularly limited, and is preferably a water-dilutable thermoplastic resin from the viewpoint that coating with the resin in the form of an aqueous coating liquid is preferable.

Examples of the water-dilutable resin include water-soluble, emulsion-type, and dispersion-type resins.

The water-dilutable thermoplastic resin may be any of a natural resin and a synthetic resin, and examples include a starch derivative, casein, shellac, polyvinyl alcohol and its derivative, an acrylic resin, a maleic acid-based resin, a urethane-based resin, a polyester-based resin, a styrene-butadiene-based resin, a vinyl chloride-based resin, and a polyolefin-based resin.

More specific examples of the acrylic resin include an acrylic resin obtained by copolymerization of (meth)acrylic acid and an alkyl ester thereof, styrene or the like, as monomer components, a styrene-maleic acid resin, a styrene-acrylic acid-maleic acid resin, a water-soluble polyurethane resin, and a water-soluble polyester resin.

Among them, at least one selected from the group consisting of a starch derivative, casein, shellac, polyvinyl alcohol and its derivative, an acrylic resin, and a maleic acid-based resin is preferable, at least one selected from the group consisting of a starch derivative, polyvinyl alcohol, a polyvinyl alcohol derivative, an acrylic resin, and a maleic acid-based resin is more preferable, at least one selected from the group consisting of a starch derivative, polyvinyl alcohol, a polyvinyl alcohol derivative, and an acrylic resin is further preferable, and at least one selected from the group consisting of polyvinyl alcohol, a polyvinyl alcohol derivative, and an acrylic resin is still further preferable, from the viewpoints of stability of the coating liquid and solvent resistance of the coating layer.

These resins may be used singly or in combinations of two or more kinds thereof.

The content of the thermoplastic resin in the solid content of the coating liquid is preferably 5% by mass or more, more preferably 15% by mass or more, further preferably 25% by mass or more, still more preferably 40% by mass or more, still more preferably 45% by mass or more, and preferably 99% by mass or less, more preferably 97% by mass or less, further preferably 95% by mass or less, still more preferably 93% by mass or less.

The coating layer may comprise any other component, in addition to the above titanium oxide and thermoplastic resin. Examples of such any other component include an extender pigment other than the titanium oxide, a film-forming agent, a pigment dispersant, a pigment-dispersing resin, an anti-blocking agent, a wetting agent, a viscosity modifier, a pH adjuster, a defoamer, and a common surfactant.

Examples of the extender pigment other than the titanium oxide include aluminum hydroxide, barium sulfate, calcium carbonate, and amorphous silica.

The coating liquid is preferably an aqueous coating liquid, and examples of the aqueous medium here used include water or a mixture of water and a water-miscible solvent.

Examples of the water-miscible solvent include lower alcohols, polyhydric alcohols, and alkyl ethers or alkyl esters thereof. Specific examples include lower alcohols such as methyl alcohol, ethyl alcohol, n-propyl alcohol, and isopropyl alcohol, polyhydric alcohols such as ethylene glycol, propylene glycol, diethylene glycol, dipropylene glycol, and glycerin, as well as ethylene glycol monomethyl ether, ethylene glycol monoethyl ether, ethylene glycol monoacetate, propylene glycol monomethyl ether, propylene glycol monoethyl ether, propylene glycol monoacetate, diethylene glycol monomethyl ether, and dipropylene glycol monomethyl ether.

The solid content concentration in the coating liquid is not particularly limited, and is preferably 5% by mass or more, more preferably 6% by mass or more, further preferably 8% by mass or more, and preferably 60% by mass or less, more preferably 40% by mass or less, further preferably 30% by mass or less, still more preferably 20% by mass or less from the viewpoint of providing a desired thickness of the coating layer, from the viewpoint of allowing the coating liquid to have a viscosity facilitating coating, and from the viewpoint of ease of drying.

The viscosity of the coating liquid is preferably 10 seconds or more, more preferably 15 seconds or more, further preferably 17 seconds or more, and preferably 40 seconds or less, more preferably 30 seconds or less, further preferably 25 seconds or less, as measured with Zahn cup No. 3, from the viewpoint of providing suitability for coating and obtaining a desired thickness of the coating layer, and from the viewpoint of ease of drying.

The coating liquid is obtained by mixing the above materials with the aqueous medium. Here, the titanium oxide, the thermoplastic resin, water, and, if necessary, a water-miscible solvent, a pigment dispersant, a pigment-dispersing resin and/or the like may be mixed and kneaded and furthermore water and, if necessary, the water-miscible solvent and the balance of any predetermined material may be added and mixed, prior to mixing with the aqueous medium.

The coating liquid is obtained by mixing and dispersing the respective components by a high-speed stirrer such as a homomixer or a laboratory mixer and/or a disperser such as a triple roll mill or a bead mill.

The method for coating with the coating liquid is not particularly limited, and the substrate may be coated according to, for example, flexographic printing, ink-jet printing, gravure printing, screen printing, pad printing, or spray coating.

<Paper Substrate>

The paper substrate is used as the substrate in the second print product. Examples of raw material pulp constituting the paper substrate include the same as those of the raw material pulp in the paper sheet medium in the first print product.

The raw material pulp is preferably any of wood pulp and deinking pulp from the viewpoint of availability. Among wood pulp, the raw material pulp is preferably chemical pulp, more preferably kraft pulp, further preferably at least one selected from the group consisting of leaf kraft pulp of eucalyptus, acacia, and the like, and needle kraft pulp of pine, cryptomeria, and the like, still more preferably at least one selected from the group consisting of leaf bleached kraft pulp (LBKP) and needle bleached kraft pulp (NBKP), from the viewpoint of formation uniformity.

The length-weighted average fiber length of the pulp constituting the paper substrate in the second print product is 0.6 mm or more, preferably 0.65 mm or more, and 3.5 mm or less, preferably 2.5 mm or less, more preferably 1.3 mm or less from the viewpoints of suppression of the variation in coating and an enhancement in print-out clearness.

The length-weighted average fiber length of the pulp constituting the paper substrate is preferably 3.5 mm or less because the pulp is mutually densely entangled, thus a void of the paper substrate is decreased, the variation in coating is suppressed when the coating layer is provided, and a print product excellent in viewability is obtained.

The length-weighted average fiber length of the pulp constituting the paper substrate is preferably 0.6 mm or more because the paper substrate is enhanced in strength and furthermore a paper powder is reduced and thus loss of a section where printing-out is applied can also be suppressed.

The length-weighted average fiber length of the pulp constituting the paper substrate is measured by a method described in Examples.

The average fiber width of the pulp constituting the paper substrate in the second print product is preferably 14.0 μm or more, more preferably 15.0 μm or more, further preferably 15.5 μm or more, still more preferably 16.0 μm or more, and preferably 35.0 μm or less, more preferably 33.0 μm or less, further preferably 31.0 μm or less.

The average fiber width of the pulp constituting the paper substrate is preferably 35.0 μm or less because the pulp is mutually densely entangled, thus a void of the paper substrate is decreased, the variation in coating is suppressed when the coating layer is provided, and a print product excellent in viewability is obtained. The average fiber width is preferably 14.0 μm or more because the paper substrate is enhanced in strength and furthermore a paper powder is reduced and thus loss of a section where printing-out is applied can also be suppressed.

The average fiber width of the pulp constituting the paper substrate can be measured by a method described in Examples.

The number-based proportion of a fine fiber having a fiber length of 0.2 mm or less in the pulp constituting the paper substrate in the second print product is preferably 4% or more, more preferably 5% or more, further preferably 6% or more, and preferably 40% or less, more preferably 30% or less, further preferably 20% or less, still more preferably 16% or less.

The number-based proportion of such a fine fiber is also preferably 40% or less because the strength of the paper substrate can be ensured. The number-based proportion of such a fine fiber is preferably 4% or more because such a fine fiber is placed so as to infill a gap between fibers, a void of the paper substrate is decreased, and the variation in coating is suppressed when the coating layer is provided.

The number-based proportion of a fine fiber having a fiber length of 0.2 mm or less in the pulp constituting the paper substrate is determined by subjecting the paper substrate to defibration according to a method described in Examples and measuring the fiber length of the resulting pulp slurry with a fiber length measurement apparatus (for example, Model FS-5 provided with UHD base unit, manufactured by Valmet K.K.). A fiber having a fiber length of 0.2 mm or less and a fiber width of 75 μm or less is defined as a fine fiber, and the number-based proportion of such a fine fiber relative to the pulp subjected to measurement is calculated.

Not only the above pulp, but also known filling agent(s) for papermaking, such as a loading material, a sizing agent, a dry paper strengthening agent, a wet paper strengthening agent (for example, polyamide polyamine epichlorohydrin), a yield improver (for example, aluminum sulfate), a freeness improver, a pH adjuster, a softener, an antistatic agent, a defoamer, and/or a dye/pigment can be, if necessary, added to the paper substrate.

Examples of the loading material can include kaolin, talc, titanium oxide, heavy calcium carbonate, light calcium carbonate, calcium sulfite, gypsum, fired kaolin, white carbon, amorphous silica, delaminated kaolin, diatomaceous earth, magnesium carbonate, aluminum hydroxide, calcium hydroxide, magnesium hydroxide, and zinc hydroxide.

Examples of the sizing agent include rosin-based, alkyl ketene dimer-based, alkenyl succinic anhydride-based, styrene-acrylic, higher fatty acid-based, and petroleum resin-based sizing agents.

A known wet paper machine, for example, a paper machine such as a long net paper machine, a gap former-type paper machine, a cylindrical paper machine, or a short net-type paper machine can be appropriately selected and used in papermaking of the paper substrate. Next, a paper layer formed by the paper machine is conveyed on a felt and dried by a dryer. A multi-stage cylinder dryer may also be used as a pre-dryer before drying by a dryer.

The paper substrate obtained as described above may be subjected to a surface treatment with a calender to thereby achieve uniformization of the thickness and profile. Such a calender treatment can be made by use of a known calender treatment machine appropriately selected.

The paper substrate may be appropriately selected from the group consisting of conventionally known paper substrates such as liner base paper, kraft paper, high-quality paper, coat paper, or the like, and then used.

The basis weight of the paper substrate in the second print product is preferably 30 g/m² or more, more preferably 40 g/m² or more, further preferably 50 g/m² or more, still more preferably 60 g/m² or more, and preferably, 300 g/m² or less, more preferably 240 g/m² or less, further preferably 180 g/m² or less from the viewpoints of strength of the print product and suppression of the variation in print-out.

The thickness of the paper substrate in the second print product is not particularly limited, and is preferably 30 μm or more, more preferably 50 μm or more, further preferably 70 μm or more, still more preferably 80 μm or more, and preferably 300 μm or less, more preferably 250 μm or less, further preferably 200 μm or less, still more preferably 150 μm or less from the viewpoints of strength of the print product and suppression of the variation in print-out.

[Raman Intensity]

The printed region in the second print product of the present invention means a region (portion) comprising discolored titanium oxide in a printable region, and is preferably a region (portion) where printing with ultraviolet laser is applied. The non-printed region means a region (portion) where no printing is applied in a printable region.

The ratio between the Raman intensity assigned to titanium oxide in the printed region and the Raman intensity assigned to titanium oxide in the non-printed region (Raman intensity in printed region/Raman intensity in non-printed region) is 0.70 or less. The Raman intensity ratio falls within the range to thereby allow a print product excellent in viewability to be obtained.

The Raman intensity ratio (Raman intensity in printed region/Raman intensity in non-printed region) is as follows. When the titanium oxide used is rutile-type titanium oxide, the Raman intensity assigned to the titanium oxide is contrasted with the Raman intensity at the maximum value in the wavenumber range of $447\pm3$ cm$^{-1}$. When the titanium oxide used is anatase-type titanium oxide, the Raman intensity assigned to the titanium oxide is contrasted with the Raman intensity at the maximum value in the wavenumber range of $516\pm3$ cm$^{-1}$.

When rutile-type titanium oxide and anatase-type titanium oxide co-exist, the Raman intensity assigned to the rutile-type titanium oxide is contrasted.

It is preferable in the print product of the present invention that the non-printed region be white and the printed region be black.

Preferable color value ranges in the Munsell color system, of the non-printed region and the printed region, are the same as in the first print product.

It is preferable for providing the above color in the Munsell color system to appropriately adjust the titanium oxide content in the coating layer, the thickness of the coating layer, and the ratio between the content and the thickness, properties of the paper substrate (the length-weighted average fiber length of the pulp constituting the paper substrate) and conditions of irradiation with ultraviolet laser (for example, average output, repeat frequency, and wavelength).

The second print product of the present invention is suitably used in, for example, a package, a label, or pressure-sensitive adhesive tape.

Examples of the package include liner base paper (in particular, liner base paper on the outermost surface) of a cardboard, a packaging box, a milk pack, a liquid container for beverages (preferably a liquid paper container for beverages), such as a paper cup, a food tray, and a skin pack, examples of the label include label base paper, a pressure-sensitive label, and a pressure-sensitive sheet, and examples of the pressure-sensitive adhesive tape include a pressure-sensitive adhesive tape and a kraft tape.

As illustrated in FIG. 5, a liquid container 10 as one example of the package has, for example, a printed region 20 on a surface. The printed region 20 is irradiated with ultraviolet laser and thus characters such as a date are here printed out.

[Transparent Resin Layer]

The printing medium of the second print product of the present invention also preferably further comprises a transparent resin layer on the coating layer.

In other words, a printing medium is preferably used where a transparent resin layer is further provided in advance on a coating layer which comprises titanium oxide in a predetermined amount or more.

It has been found that the above configuration provides a clearer print image high in print-out density. The detailed reason for this, although is not clear, is partially presumed as follows.

It is considered that a phenomenon occurs where, when titanium oxide is heated by irradiation with ultraviolet laser, the surrounding moisture is instantaneously vaporized to result in desorption of discolored titanium oxide from the coating layer. It is considered that the transparent resin layer is provided in advance on the coating layer to result in suppression of desorption of discolored titanium oxide described above and an increase in print-out density. Furthermore, it is considered that the amount of smoking occurring due to vaporization of the moisture and then desorption of the titanium oxide and a paper powder is also suppressed.

Since the effect due to the transparent resin layer provided is high when the coating layer and the substrate as a lower layer of the coating layer comprise moisture, the transparent resin layer is particularly preferably comprised when the substrate is the paper substrate as in the present embodiment.

A preferable range of the total light transmittance of the transparent resin layer is the same as a preferable range of that of the transparent resin layer in the first print product, and the same also applies to the measurement method.

The resin constituting the transparent resin layer, the stacking method, and the thickness, and also preferable ranges thereof are the same as those as in the transparent resin layer in the first print product.

[Method for Producing Second Print Product]

A method for producing a second print product of the present invention comprises a step of performing printing by irradiation of a recording medium with ultraviolet light and thus discoloration of an irradiated region, a printable region of the recording medium has a coating layer comprising titanium oxide on a paper substrate, pulp constituting the paper substrate has a length-weighted average fiber length of 0.6 mm or more and 3.5 mm or less, a titanium oxide content in the coating layer is 0.6 g/m$^2$ or more and 30 g/m$^2$ or less, and A/B is 0.01 or more and 2.00 or less under the assumption that the titanium oxide content in the coating layer is A g/m$^2$ and a thickness of the coating layer is B μm.

The recording medium for use in the method for producing a second print product of the present invention is, for example, the same recording medium as the recording medium in the second print product, and a preferable range thereof is also the same as in the second print product. In the method for producing a second print product of the present invention, at least the titanium oxide content in the coating layer in the region irradiated with ultraviolet laser may be 0.6 g/m$^2$ or more and 30 g/mm$^2$ or less, the titanium oxide content in the non-irradiated region is not particularly limited, and the titanium oxide is preferably comprised in the entire coating layer.

Such irradiation with ultraviolet laser is preferably made so that the ratio between the Raman intensity assigned to titanium oxide in the printed region and the Raman intensity assigned to titanium oxide in the non-printed region is 0.70 or less.

The Raman intensities in the printed region and the non-printed region are as described above with respect to the second print product.

[Conditions of Irradiation with Ultraviolet Laser]

Conditions of irradiation with ultraviolet laser (wavelength, average output, repeat frequency, spot size, scanning speed, and line pitch of ultraviolet laser) and also preferable ranges are the same as those in the method for producing the first print product.

[Aspects of Method for Producing Second Print Product]

The method for producing a second print product of the present invention can be performed in various aspects.

Hereinafter, various aspects where the method for producing a second print product of the present invention can be applied are exemplified, but the method for producing a second print product of the present invention is not limited to the following aspects. The information to be printed is not particularly limited, and is preferably variable information.

The method for producing a second print product of the present invention is preferably performed in an in-line manner.

(1) Direct Printing onto Package

A first embodiment of the method for producing a second print product of the present invention relates to a method for printing information onto a package comprising a coating layer comprising titanium oxide, and the method comprises a step of performing direct printing onto the package being moved on a packaging line or being intermittently stopped, with ultraviolet laser.

In the first method for producing a print product, the package is produced from a recording medium which comprises a coating layer comprising titanium oxide on a paper substrate and comprising 0.6 g/m$^2$ or more and 30 g/m$^2$ or less of titanium oxide, the ratio between the titanium oxide content and the thickness of the coating layer being 0.01 or more and 2.00 or less and the length-weighted average fiber length of the pulp constituting the paper substrate being 0.6 mm or more and 3.5 mm or less, and direct printing is applied with ultraviolet laser. At least the outermost layer of a region to be subjected to printing, of the package, may be produced from the recording medium.

The package is, for example, a cardboard or a box, and it is preferable to perform direct printing onto a side surface or an upper surface of the package with ultraviolet laser.

A coating mechanism may be comprised in the packaging line. Examples of the coating mechanism include a contact printing-out machine, a pad printing machine, and a spray coater.

In the present aspect, a step of providing the coating layer by the coating mechanism during movement of the package on the packaging line, and a step of performing direct printing onto the package with ultraviolet laser further downstream during movement on the packaging line or during intermittent stopping are comprised.

(2) Printing onto Label

A second embodiment of the method for producing a second print product of the present invention relates to a method for printing information onto a label comprising a coating layer comprising titanium oxide. A coating layer of a recording medium constituting a printing surface of the label comprises 0.6 g/m$^2$ or more and 30 g/m$^2$ or less of titanium oxide. The label comprises the coating layer on a paper substrate, the length-weighted average fiber length of the pulp constituting the paper substrate is 0.6 mm or more and 3.5 mm or less, and the A/B is 0.01 or more and 2.00 or less under the assumption that the titanium oxide content in the coating layer is defined as A g/m$^2$ and the thickness of the coating layer is defined as B µm.

The label onto which printing is applied is preferably attached to the package by use of a label attachment apparatus. The label attachment apparatus is any of various label attachment apparatuses proposed. The coating layer is here comprised in a surface to be irradiated with ultraviolet light.

In a first label attachment apparatus, an adhesive is provided to label base paper wound in a roll shape, and then attached to an article. More specifically, there is exemplified a roll labeler comprising a cutting tool which cuts label base paper wound in a roll shape, to a predetermined length, every one sheet, a pasting conveyance tool which receives the label base paper cut by the cutting tool, by a label base paper support coated with an adhesive, and allows the adhesive to adhere to a rear surface of the label base paper, and a pasting/attaching tool which receives the label base paper (label) to which the adhesive is provided, from the pasting conveyance tool, and attaches it to an article such as a container, wherein a rotation conveyance tool having a label supporting surface on an outer surface is provided between the cutting tool and the pasting conveyance tool. The roll labeler is exemplified in JP H6-64637 A.

There are also exemplified an aspect of a roll labeler comprising a cutting tool which cuts label base paper wound in a roll shape, to a predetermined length, every one sheet, a delivery roll that delivers the label base paper to an attachment roll, and a pasting roll that imparts a paste to the label base paper retained by the attachment roll, and such an aspect where the delivery roll is not required.

It is preferable to perform irradiation with ultraviolet laser before or after cutting of label base paper wound in a roll shape, to a predetermined length, and before delivery to the next roll or the like. A front surface or a rear surface of the label base paper wound in a roll shape corresponds to a front surface or a rear surface in attachment to the package, depending on the aspect of the roll labeler, and thus irradiation with ultraviolet laser is performed depending on the aspect.

In a second label attachment apparatus, a pressure-sensitive label roll is used as a label. In this case, at least the coating layer is comprised in a surface to be irradiated with ultraviolet laser, in which the surface is an opposite surface to a surface to which the pressure-sensitive adhesive is provided.

In the case of use of a release paper-attached pressure-sensitive label roll, there is exemplified, for example, an attachment apparatus comprising a release paper separation tool which separates a pressure-sensitive label and release paper, a delivery roll which receives the pressure-sensitive label from which the release paper is separated, and an attachment roll which draws the pressure-sensitive label from the delivery roll and attaches the label to an article (package). It is preferable to perform irradiation with ultraviolet laser before separation of the release paper or after separation of the release paper and before supporting by the attachment roll.

There is also exemplified an apparatus comprising a mechanism which mounts a release paper-attached pressure-sensitive label roll and separates a pressure-sensitive label and release paper, and a mechanism which attaches the label immediately after separation, wherein printing is applied by ultraviolet laser in the lead up to separation of the release paper from the pressure-sensitive label roll mounted. The above method for attaching the pressure-sensitive label is also referred to as "unidirectional installation."

There is further exemplified a label attachment apparatus comprising a mechanism which mounts a release paper-attached pressure-sensitive label roll and separates release paper from a pressure-sensitive label, and a mechanism which attaches the pressure-sensitive label to an article (package), wherein the mechanism for attachment is a syringe system, an air-jet system, or a robot art system. It is preferable to perform irradiation with ultraviolet laser in the lead up to separation of the release paper from the release paper-attached pressure-sensitive label roll mounted.

The label here used may be a liner-less pressure-sensitive label. The liner-less pressure-sensitive label is a label with no release paper, and is characterized by being inexpensive because the number of labels per roll is large and no release paper is present as compared with the case of use of the release paper-attached pressure-sensitive label roll. When the liner-less pressure-sensitive label is used, the coating layer is formed in a surface to be irradiated with ultraviolet laser, in which the surface is an opposite surface to a surface to which the pressure-sensitive adhesive is provided.

Such a label attachment apparatus using the liner-less pressure-sensitive label is, for example, an apparatus comprising a mechanism which mounts a liner-less label roll, a cutting mechanism which cuts a liner-less label every one label, and an attachment mechanism which attaches the liner-less label cut, to an article (package), wherein the attachment mechanism is a cylinder system or a robot arm system. It is preferable to perform printing by irradiation with ultraviolet laser between the mechanism which mounts a liner-less label roll and the cutting mechanism, or in the lead up to sending of the liner-less label cut, to the attachment mechanism.

In a third label attachment apparatus, a printing medium comprising a coating layer comprising 0.6 g/m$^2$ or more and 30 g/m$^2$ or less of titanium oxide is attached to an article (package) and then printing with ultraviolet laser is performed.

The label attachment method is performed with reference to the above first apparatus and second apparatus.

(3) Printing onto Pressure-Sensitive Adhesive Tape

A third embodiment of the method for producing a second print product of the present invention is an aspect where the recording medium is a pressure-sensitive adhesive tape. In this case, the coating layer is comprised in an opposite surface to a surface to which the pressure-sensitive adhesive is provided.

In other words, the method for producing a print product of the third embodiment comprises a step of attaching a pressure-sensitive adhesive tape produced from the recording medium, to an article (package), and a step of performing printing with ultraviolet laser before the attachment step or after the attachment step.

A printing apparatus may also be used in which a printing-out apparatus with ultraviolet laser is incorporated into a cardboard sealing machine. Specifically, the apparatus comprises a mechanism which provides winding of a pressure-sensitive adhesive tape, a mechanism comprising a conveyor for conveying a cardboard, which folds a flap of a cardboard, and a mechanism which attaches the pressure-sensitive adhesive tape and seals the cardboard, and also comprises a mechanism which performs printing onto the pressure-sensitive adhesive tape with ultraviolet laser during or after attachment of the pressure-sensitive adhesive tape.

The second print product and the method for producing a second print product of the present invention are not limited to the above aspects, and can be applied to various applications where printing is demanded.

[Second Printing Medium for Laser Printing]

A second printing medium for laser printing of the present invention has a printable region onto which printing with ultraviolet laser is applicable, the printable region of the printing medium has a coating layer comprising titanium oxide on a substrate, pulp constituting the paper substrate has a length-weighted average fiber length of 0.6 mm or more and 3.5 mm or less, a titanium oxide content in the coating layer is 0.6 g/m$^2$ or more and 30 g/m$^2$ or less, and A/B is 0.01 or more and 2.00 or less under the assumption that the titanium oxide content in the coating layer is A g/m$^2$ and a thickness of the coating layer is B µm. The second printing medium for laser printing of the present invention can be irradiated with ultraviolet laser and thus printing can be performed.

A preferable aspect of the second printing medium for laser printing is the same as a preferable aspect of the recording medium of the second print product, and a preferable aspect of the method for performing printing onto the second printing medium for laser printing is the same as a preferable aspect of the method for producing a second print product.

[Third Print Product]

The third print product of the present invention (hereinafter, also simply referred to as "third print product") has a printed region comprising discolored titanium oxide in at least one portion of a sheet medium having a printable region comprising titanium oxide, the printable region of the sheet medium has a laminate layer comprising titanium oxide on a paper substrate, a titanium oxide content in the laminate layer is 0.1 g/m$^2$ or more, the titanium oxide content in the laminate layer is 1% by mass or more and 45% by mass or less, the laminate layer has a thickness of 10 µm or more and 200 µm or less, and a ratio between a Raman intensity assigned to titanium oxide in the printed region and a Raman intensity assigned to titanium oxide in a non-printed region is 0.70 or less.

The present invention can provide a print product having a printed region comprising discolored titanium oxide. The print product of the present invention is excellent in clearness of print (print-out) and also excellent in solvent resistance.

The detailed reason why the above effects are obtained, although is not clear, is partially considered as follows. In the present invention, a sheet medium is used which comprises, on a paper substrate, a laminate layer where the titanium oxide content is 0.1 g/m$^2$ or more, as a printable region. It is considered that a print product excellent in viewability is obtained by allowing the printed region to comprise discolored titanium oxide and setting the ratio between the Raman intensity assigned to titanium oxide in the printed region and the Raman intensity assigned to titanium oxide in the non-printed region to 0.70 or less. It is considered that such discoloration of titanium oxide is the change from white to black due to the change in ionic valence of titanium oxide comprised in the laminate layer, from tetravalent to trivalent, and thus the occurrence of any oxygen defect, and therefore viewing can be made. The change in the ionic valence can be detected as the change in Raman intensity, and the ratio between the Raman intensity assigned to titanium oxide in the printed region and the Raman intensity assigned to titanium oxide in the non-printed region is set to a specified value or less to thereby provide a printed region high in viewability. It is considered that the ionic valence of titanium oxide is changed during irradiation with light energy corresponding to the band gap of titanium oxide. The band gap of titanium oxide, while is varied depending on the crystal system, is generally about 3.0 to 3.2 eV, and the wavelength of the corresponding light is 420 nm or less. Therefore, it is difficult to apply printing due to the change in ionic valence of titanium oxide as in the present invention, even by use of laser light at a wavelength of more than 420 nm (for example, 532 nm, 1064 nm, or 10600 nm).

It is considered that solvent resistance is also excellent because of color development by titanium oxide comprised in the laminate layer.

Such discoloration of titanium oxide is preferably here performed by irradiation with ultraviolet laser. Here, smoking may occur due to irradiation with ultraviolet laser. It is considered that a phenomenon occurs where, when titanium oxide is heated by irradiation with ultraviolet laser, the surrounding moisture is instantaneously vaporized to result in desorption of discolored titanium oxide and the resin comprised in the laminate layer, from the sheet medium, and it is considered that smoke is generated according to such desorption. It is considered that the titanium oxide content in the laminate layer falls within a specified range to thereby allow for suppression of the smoking in the present embodiment.

Furthermore, a problem has been that, when a print product is produced by providing a laminate layer on a paper substrate and irradiating the resultant with ultraviolet laser, the resulting print product is reduced in tensile strength and breaking elongation. The reason for this is considered because irradiation with ultraviolet laser causes a resin of such a laminate layer and such a paper substrate to be degraded. It is considered that the thickness of such a laminate layer falls within a specified range to thereby enable the resulting print product to be inhibited from being reduced in tensile strength and breaking elongation.

In the present embodiment, the printable region means a region (portion) onto which printing can be applied by discoloration of titanium oxide comprised in the laminate layer, preferably discoloration of titanium oxide in a portion irradiated with ultraviolet laser, from white to black, by irradiation with ultraviolet laser, and the printed region means a section of the printable region, in which titanium oxide is actually discolored, preferably such a section with discoloration by irradiation with ultraviolet laser, namely, a portion irradiated with ultraviolet laser. The non-printed region means a region (portion) of the printable region, in which no titanium oxide is discolored, for example, a region (portion) not irradiated with ultraviolet laser.

Hereinafter, the present invention will be described in more detail.

[Sheet Medium]

A sheet medium serving as a printing subject in the third print product has a printable region comprising titanium oxide, and has a printed region comprising discolored titanium oxide in at least one portion of the printable region.

The sheet medium comprises a laminate layer comprising titanium oxide, on the paper substrate. The laminate layer may be formed on at least one surface or both surfaces of the paper substrate, and the sheet medium preferably comprises the laminate layer on only one surface thereof.

<Laminate Layer>

The titanium oxide content in the laminate layer as the printable region is 0.1 g/m$^2$ or more, the titanium oxide content in the laminate layer is 1% by mass or more and 45% by mass or less, and the laminate layer has a thickness of 10 μm or more and 200 μm or less.

The titanium oxide content in the laminate layer is 0.1 g/m$^2$ or more, preferably 0.2 g/m$^2$ or more, more preferably 0.3 g/m$^2$ or more, further preferably 0.5 g/m$^2$ or more, further preferably 1.0 g/m$^2$ or more, still more preferably 1.2 g/m$^2$ or more from the viewpoint of providing a sufficient print density, and the content is preferably 200 g/m$^2$ or less, more preferably 120 g/m$^2$ or less, further preferably 50 g/m$^2$ or less, still more preferably 30 g/m$^2$ or less, still more preferably 20 g/m$^2$ or less from the viewpoint of leveling-off of the print density and suppression of an increase in cost due to an excessive amount of titanium oxide comprised.

The sheet medium may comprise the above content of titanium oxide in at least the printable region, a portion where no laminate layer is provided may be present in a region where no printing is applied, and a region may be present where a laminate layer having a titanium oxide content of less than 0.1 g/m$^2$ is provided. It is preferable from the viewpoint of simplicity of production that the laminate layer having a titanium oxide content of 0.1 g/m$^2$ or more be provided on the paper substrate in the entire region of the sheet medium.

The titanium oxide content in the laminate layer is 1.0% by mass or more, preferably 1.5% by mass or more, more preferably 2.0% by mass or more, further preferably 4.0% by mass or more, 45% by mass or less, preferably 35% by mass or less, further preferably 30% by mass or less from the viewpoint of providing a sufficient print-out density, from the viewpoint of leveling-off of the print density and suppression of an increase in cost due to an excessive amount of titanium oxide comprised, and from the viewpoint of allowing the titanium oxide concentration in the laminate layer to fall within a proper range to result in suppression of titanium oxide scattering in irradiation with ultraviolet laser and also suppression of the amount of smoking.

The thickness of the laminate layer is 10 μm or more, preferably 12 μm or more, more preferably 20 μm or more from the viewpoint of providing a sufficient print-out density, from the viewpoint of ease of lamination, and from the viewpoint of suppression of reductions in tensile strength and breaking elongation due to irradiation with ultraviolet laser, and is 200 μm or less, preferably 150 μm or less, more preferably 100 μm or less, further preferably 50 μm or less from the viewpoint of leveling-off of the print density and from the viewpoint of suppression of the thickness of the entire sheet medium for providing a print product having flexibility.

The thickness of the laminate layer is measured from an observation image of a cross section of the sheet medium with an electron microscope (SEM).

The laminate layer preferably comprises a thermoplastic resin film comprising titanium oxide.

(Titanium Oxide)

The titanium oxide is preferably included in the thermoplastic resin film, and the laminate layer is more preferably obtained by addition of the titanium oxide to a laminate layer raw material and film formation.

The titanium oxide comprised in the laminate layer is, for example, the same as the titanium oxide for use in the first print product, and preferable crystal structure and shape thereof are also the same as in the first print product.

When the titanium oxide is irregular or spherical, the particle size of the titanium oxide is preferably in the same range as that of the titanium oxide for use in the first print product from the viewpoint of providing a sheet medium excellent in surface smoothness.

The particle size of the titanium oxide comprised in the laminate layer can also be calculated from a SEM image of ash obtained by burning of the laminate layer in a muffle furnace, the image being obtained with a scanning-type electron microscope (SEM, SU3800 or the like manufactured by Hitachi High-Tech Corporation).

The particle size of the titanium oxide in the laminate layer is calculated from a SEM image of ash obtained by burning of the sheet medium or the print product in a muffle furnace, the image being obtained with a scanning-type electron microscope (SEM, S5200 or the like manufactured by Hitachi High-Tech Corporation).

An ash sample to be tested with a scanning-type electron microscope can be produced by obtaining a 0.01% by mass slurry due to dispersion in ethanol by an ultrasonic homogenizer (LUH150 or the like manufactured by Yamato Scientific Co., Ltd.) having an output of 50 W over 5 minutes, and then casting 0.1 mL of the slurry on an aluminum dish and drying it at 60° C. Adjacent particles clearly distinguishable from each other are visually selected, and the longer size of one particle is defined as the particle size. When a primary particle and a secondary particle in an aggregated state are here clearly distinguishable from each other even if present in a mixed manner, such each particle is counted as one particle and the average size in 100 of such particles randomly selected is defined as the particle size. The magnification in SEM image observation may be appropriately selected depending on the particle size of the titanium oxide, and is preferably about 20000 times.

The average particle size of a titanium oxide particle for use as a raw material is measured by the same method as the measurement method with respect to the first print product.

When the titanium oxide is acicular, respective preferable ranges of the longer size, the shorter size, and the aspect ratio (longer size/shorter size) of the titanium oxide are preferably the same ranges of those of the titanium oxide for use in the first print product.

The longer size and the shorter size of the titanium oxide comprised in the laminate layer can be measured from a SEM image of ash obtained by burning of the laminate layer in a muffle furnace and treated in the same manner as described above, the image being obtained with a scanning-type electron microscope (SEM, S5200 or the like manufactured by Hitachi High-Tech Corporation). A powder to be tested with a scanning-type electron microscope is obtained by the same method as described above.

The longer size and the shorter size of the titanium oxide for use as a raw material can also be measured from a SEM image obtained with a scanning-type electron microscope.

(Thermoplastic Resin)

The thermoplastic resin for use in the laminate layer is not particularly limited, and may be appropriately selected from the group consisting of known thermoplastic resins without any particular limitation as long as the resin can include the titanium oxide and can be laminated on the paper substrate.

Specific examples include polyester-based resins such as polyethylene terephthalate, polybutylene terephthalate, polyethylene naphthalate, polylactic acid, and polybutylene succinate, polyvinyl chloride, polyvinylidene chloride, polyolefin-based resins such as polybutene, polybutadiene, an ethylene-vinyl acetate copolymer, polyethylene, polypropylene, an ethylene-propylene copolymer, and polymethylpentene; polycarbonate; polyurethane; polyamide; polyacrylonitrile; and poly(meth)acrylate, and in particular, polyolefins such as polyethylene, polypropylene, and an ethylene-propylene copolymer, and polyesters such as polyethylene terephthalate, polybutylene terephthalate, polyethylene naphthalate, polylactic acid, and polybutylene succinate are preferable, polyethylene, polypropylene, polyethylene terephthalate, polylactic acid, and polybutylene succinate are more preferable, polyethylene and polypropylene are further preferable, and polyethylene is still further preferable.

These resins may be used singly or in combinations of two or more kinds thereof.

The laminate layer may be produced by a conventionally known production method appropriately selected, and such a method may be appropriately selected from the group consisting of a melt extrusion method, a melt casting method, a calender method, and the like.

The film may be produced by mixing the titanium oxide with the resin so that the titanium oxide content in the printable region of the laminate layer falls within the above range.

<Paper Substrate>

The sheet medium in the third print product comprises the laminate layer on the paper substrate.

Examples of raw material pulp constituting the paper substrate include the same as those of the raw material pulp in the paper sheet medium in the first print product.

The raw material pulp is preferably any of wood pulp and deinking pulp from the viewpoint of availability. Among wood pulp, the raw material pulp is preferably chemical pulp, more preferably kraft pulp, further preferably at least one selected from the group consisting of leaf kraft pulp of eucalyptus, acacia, and the like, and needle kraft pulp of pine, cryptomeria, and the like, still more preferably at least one selected from the group consisting of leaf bleached kraft pulp (LBKP) and needle bleached kraft pulp (NBKP), from the viewpoint of texture uniformity.

In the third print product, not only the pulp, but also known filling agent(s) for papermaking, such as a loading material, a sizing agent, a dry paper strengthening agent, a wet paper strengthening agent (for example, polyamide polyamine epichlorohydrin), a yield improver (for example, aluminum sulfate), a freeness improver, a pH adjuster, a softener, an antistatic agent, a defoamer, and/or a dye/pigment can be, if necessary, added to the paper substrate.

Examples of the loading material can include kaolin, talc, titanium oxide, heavy calcium carbonate, light calcium carbonate, calcium sulfite, gypsum, fired kaolin, white carbon, amorphous silica, delaminated kaolin, diatomaceous earth, magnesium carbonate, aluminum hydroxide, calcium hydroxide, magnesium hydroxide, and zinc hydroxide.

Examples of the sizing agent include rosin-based, alkyl ketene dimer-based, alkenyl succinic anhydride-based, styrene-acrylic, higher fatty acid-based, and petroleum resin-based sizing agents.

A known wet paper machine, for example, a paper machine such as a long net paper machine, a gap former-type paper machine, a cylindrical paper machine, or a short net-type paper machine can be appropriately selected and used in papermaking of the paper substrate in the third print product. Next, a paper layer formed by the paper machine is conveyed on a felt and dried by a dryer. A multi-stage cylinder dryer may also be used as a pre-dryer before drying by a dryer.

The paper substrate obtained as described above may be subjected to a surface treatment with a calender to thereby achieve uniformization of the thickness and profile. Such a calender treatment can be made by use of a known calender treatment machine appropriately selected.

The paper substrate may be appropriately selected from the group consisting of conventionally known paper substrates such as liner base paper, kraft paper, high-quality paper, and coat paper, and then used.

<Lamination>

The method for laminating the laminate layer on the paper substrate is not particularly limited, and may be appropriately selected from the group consisting of known methods. Specifically, for example, the paper substrate and the laminate layer are stacked by a thermal lamination method, a dry lamination method, a wet lamination method, an extrusion lamination method, or the like. The laminate layer and the paper substrate may be attached with an adhesive layer being interposed. In particular, an extrusion lamination method is preferable in terms of a production step because of no step of attaching the laminate layer and the paper substrate is required.

[Raman Intensity]

In the third print product of the present invention, the printed region means a region (portion) comprising discolored titanium oxide in a printable region, and is preferably a region (portion) where printing with ultraviolet laser is applied. The non-print region means a region (portion) where no printing is applied in a printable region.

The ratio between the Raman intensity assigned to titanium oxide in the printed region and the Raman intensity assigned to titanium oxide in the non-printed region (Raman intensity in printed region/Raman intensity in non-printed region) is 0.70 or less. The Raman intensity ratio falls within the range to thereby allow a print product excellent in viewability to be obtained.

The Raman intensity ratio (Raman intensity in printed region/Raman intensity in non-printed region) is as follows. When the titanium oxide used is rutile-type titanium oxide, the Raman intensity assigned to the titanium oxide is contrasted with the Raman intensity at the maximum value in the wavenumber range of $447\pm3$ cm$^{-1}$. When the titanium oxide used is anatase-type titanium oxide, the Raman intensity assigned to the titanium oxide is contrasted with the Raman intensity at the maximum value in the wavenumber range of $516\pm3$ cm$^{-1}$.

When rutile-type titanium oxide and anatase-type titanium oxide co-exist, the Raman intensity assigned to the rutile-type titanium oxide is contrasted.

It is preferable in the print product of the present invention that the non-printed region be white and the printed region be black.

Preferable color value ranges in the Munsell color system, of the non-printed region and the printed region, are the same as in the first print product.

It is preferable for providing the above color in the Munsell color system to appropriately adjust the titanium oxide content in the laminate layer, the thickness of the laminate layer, and conditions of irradiation with ultraviolet laser (for example, average output, repeat frequency, and wavelength).

The third print product of the present invention is suitably used in, for example, a package, a label, or pressure-sensitive adhesive tape.

Examples of the package include liner base paper (in particular, liner base paper on the outermost surface) of a cardboard, a packaging box, a milk pack, a liquid container for beverages (preferably a liquid paper container for beverages), such as a paper cup, a food tray, and a skin pack, examples of the label include label base paper, a pressure-sensitive label, and a pressure-sensitive sheet, and examples of the pressure-sensitive adhesive tape include a pressure-sensitive adhesive tape and a kraft tape.

As illustrated in FIG. 5, a liquid container 10 as one example of the package has, for example, a printed region 20 on a surface. The printed region 20 is irradiated with ultraviolet laser and thus characters such as a date are here printed out.

[Method for Producing Third Print Product]

A method for producing a third print product of the present invention comprises a step of performing printing by irradiation of a printable region of a sheet medium with ultraviolet laser and thus discoloration of an irradiated region, wherein the printable region of the sheet medium has a laminate layer comprising titanium oxide on a paper substrate, a titanium oxide content in the laminate layer is 0.1 g/m$^2$ or more, the titanium oxide content in the laminate layer is 1% by mass or more and 45% by mass or less, and the laminate layer has a thickness of 10 μm or more and 200 μm or less.

The sheet medium for use in the method for producing a third print product of the present invention is, for example, the same sheet medium as the sheet medium in the third print product, and a preferable range thereof is also the same as in the third print product. In the method for producing a third print product of the present invention, at least the titanium oxide content in the laminate layer in the region irradiated with ultraviolet laser may be 0.1 g/m$^2$ or more, the titanium oxide content in the non-irradiated region is not particularly limited, and the titanium oxide content in the laminate layer in the non-irradiated region is also 0.1 g/m$^2$ or more because the titanium oxide is preferably included in the entire laminate layer and also the laminate layer is preferably formed entirely on at least one surface of the sheet substrate.

Such irradiation with ultraviolet laser is preferably made so that the ratio between the Raman intensity assigned to titanium oxide in the printed region and the Raman intensity assigned to titanium oxide in the non-printed region is 0.70 or less.

The Raman intensities in the printed region and the non-printed region are as described above with respect to the third print product.

[Conditions of Irradiation with Ultraviolet Laser]

Conditions of irradiation with ultraviolet laser (wavelength, average output, repeat frequency, spot size, scanning speed, and line pitch of ultraviolet laser) and also preferable ranges are the same as those in the first method for producing a print product.

[Aspects of Method for Producing Third Print Product]

The method for producing a third print product of the present invention can be performed in various aspects.

Hereinafter, various aspects where the method for producing a third print product of the present invention can be applied are exemplified, but the method for producing a print product of the present invention is not limited to the following aspects. The information to be printed is not particularly limited, and is preferably variable information.

The method for producing a print product of the present invention is preferably performed in an in-line manner.

(1) Direct Printing onto Package

A first embodiment of the method for producing a third print product of the present invention relates to a method for printing information onto a package comprising a laminate layer comprising titanium oxide, and the method comprises a step of performing direct printing onto the package being moved on a packaging line or being intermittently stopped, with ultraviolet laser.

In the method for producing a print product of the first embodiment, the package is produced from a sheet medium where a laminate layer comprises 0.1 g/m$^2$ or more of titanium oxide and has a titanium oxide content of 1% by mass or more and 45% by mass or less and has a thickness of 10 μm or more and 200 μm or less, and direct printing is applied with ultraviolet laser. At least the outermost layer of the package may be produced from the sheet medium.

The package is, for example, a cardboard or a box, and it is preferable to perform direct printing onto a side surface or an upper surface of the package with ultraviolet laser.

(2) Printing onto Label

A second embodiment of the method for producing a third print product of the present invention relates to a method for printing information onto a label comprising a laminate layer comprising titanium oxide. A laminate layer of a sheet medium constituting a printing surface of the label comprises 0.1 g/m$^2$ or more of titanium oxide, the titanium oxide content in the laminate layer is 1% by mass or more and 45% by mass or less, and the thickness of the laminate layer is 10 μm or more and 200 μm or less.

The label onto which printing is applied is preferably attached to the package by use of a label attachment apparatus. The label attachment apparatus is any of various label attachment apparatuses proposed. The laminate layer is here comprised in a surface to be irradiated with ultraviolet light.

In a first label attachment apparatus, an adhesive is provided to label base paper wound in a roll shape, and then attached to an article. More specifically, there is exemplified a roll labeler comprising a cutting tool which cuts label base paper wound in a roll shape, to a predetermined length, every one sheet, a pasting conveyance tool which receives the label base paper cut by the cutting tool, by a label base paper support coated with an adhesive, and allows the adhesive to adhere to a rear surface of the label base paper, and a pasting/attaching tool which receives the label base paper (label) to which the adhesive is provided, from the pasting conveyance tool, and attaches it to an article such as a container, wherein a rotation conveyance tool having a label supporting surface on an outer surface is provided between the cutting tool and the pasting conveyance tool. The roll labeler is exemplified in JP H6-64637 A.

There are also exemplified an aspect of a roll labeler comprising a cutting tool which cuts label base paper wound in a roll shape, to a predetermined length, every one sheet, a delivery roll that delivers the label base paper to an attachment roll, and a pasting roll that imparts a paste to the label base paper retained by the attachment roll, and such an aspect where the delivery roll is not required.

It is preferable to perform irradiation with ultraviolet laser before or after cutting of label base paper wound in a roll shape, to a predetermined length, and before delivery to the next roll or the like. A front surface or a rear surface of the label base paper wound in a roll shape corresponds to a front surface or a rear surface in attachment to the package, depending on the aspect of the roll labeler, and thus irradiation with ultraviolet laser is performed depending on the aspect.

In a second label attachment apparatus, a pressure-sensitive label roll is used as a label. In this case, at least the laminate layer is comprised in a surface to be irradiated with ultraviolet laser, in which the surface is an opposite surface to a surface to which the pressure-sensitive adhesive is provided.

In the case of use of a release paper-attached pressure-sensitive label roll, there is exemplified, for example, an attachment apparatus comprising a release paper separation tool which separates a pressure-sensitive label and release paper, a delivery roll which receives the pressure-sensitive label from which the release paper is separated, and an attachment roll which draws the pressure-sensitive label from the delivery roll and attaches the label to an article (package). It is preferable to perform irradiation with ultraviolet laser before separation of the release paper or after separation of the release paper and before supporting by the attachment roll.

There is also exemplified an apparatus comprising a mechanism which mounts a release paper-attached pressure-sensitive label and separates a pressure-sensitive label and release paper, and a mechanism which attaches the label immediately after separation, wherein printing is applied by ultraviolet laser in the lead up to separation of the release paper from the pressure-sensitive label roll mounted. The above method for attaching the pressure-sensitive label is also referred to as "unidirectional installation."

There is further exemplified a label attachment apparatus comprising a mechanism which mounts a release paper-attached pressure-sensitive label and separates release paper from a pressure-sensitive label, and a mechanism which attaches the pressure-sensitive label to an article (package), wherein the mechanism for attachment is a syringe system, an air-jet system, or a robot art system. It is preferable to perform irradiation with ultraviolet laser in the lead up to separation of the release paper from the release paper-attached pressure-sensitive label roll mounted.

The label here used may be a liner-less pressure-sensitive label. The liner-less pressure-sensitive label is a label with no release paper, and is characterized by being inexpensive because the number of labels per roll is large and no release paper is present as compared with the case of use of the release paper-attached pressure-sensitive label roll. When the liner-less pressure-sensitive label is used, the laminate layer is formed in a surface to be irradiated with ultraviolet laser, in which the surface is an opposite surface to a surface to which the pressure-sensitive adhesive is provided.

Such a label attachment apparatus using the liner-less pressure-sensitive label is, for example, an apparatus comprising a mechanism which mounts a liner-less label roll, a cutting mechanism which cuts a liner-less label every one label, and an attachment mechanism which attaches the liner-less label cut, to an article (package), wherein the attachment mechanism is a cylinder system or a robot arm system. It is preferable to perform printing by irradiation with ultraviolet laser between the mechanism which mounts a liner-less label roll and the cutting mechanism, or in the lead up to sending of the liner-less label cut, to the attachment mechanism.

In a third label attachment apparatus, a sheet medium comprising a laminate layer comprising 0.1 g/m$^2$ or more of titanium oxide is attached to an article (package) and then printing with ultraviolet laser is performed.

The label attachment method is performed with reference to the above first apparatus and second apparatus.

(3) Printing onto Pressure-Sensitive Adhesive Tape

A third embodiment of the method for producing a third print product of the present invention is an aspect where the sheet medium is a pressure-sensitive adhesive tape. In this case, the laminate layer is comprised in an opposite surface to a surface to which the pressure-sensitive adhesive is provided.

In other words, the method for producing a print product of the third embodiment comprises a step of attaching a pressure-sensitive adhesive tape produced from the sheet medium, to an article (package), and a step of performing printing with ultraviolet laser before the attachment step or after the attachment step.

A printing apparatus may also be used in which a printing-out apparatus with ultraviolet laser is incorporated into a cardboard sealing machine. Specifically, the apparatus comprises a mechanism which provides winding of a pressure-sensitive adhesive tape, a mechanism comprising a conveyor for conveying a cardboard, which folds a flap of a cardboard, and a mechanism which attaches the pressure-sensitive adhesive tape and seals the cardboard, and also comprises a mechanism which performs printing onto the pressure-sensitive adhesive tape with ultraviolet laser during or after attachment of the pressure-sensitive adhesive tape.

The print product and the method for producing a print product of the present invention are not limited to the above aspects, and can be applied to various applications where printing is demanded.

[Third Printing Medium for Laser Printing]

A third printing medium for laser printing of the present invention comprises a printing medium for laser printing, comprising a sheet medium having a printable region onto which printing with ultraviolet laser is applicable, wherein the printable region of the sheet medium has a laminate layer comprising titanium oxide on a paper substrate, a titanium oxide content in the laminate layer is 0.1 $g/m^2$ or more, the titanium oxide content in the laminate layer is 1% by mass or more and 45% by mass or less, and the laminate layer has a thickness of 10 μm or more and 200 μm or less. The third printing medium for laser printing of the present invention can be irradiated with ultraviolet laser and thus printing can be performed.

A preferable aspect of the third printing medium for laser printing is the same as a preferable aspect of the sheet medium of the third print product, and a preferable aspect of the method for performing printing onto the printing medium for laser printing is the same as a preferable aspect of the method for producing a third print product.

EXAMPLES

Hereinafter, characteristics of the present invention are further specifically described with reference to Examples and Comparative Examples. Materials, amounts of use, proportions, treatment details, treatment procedures, and the like shown in the following Examples can be appropriately modified without departing from the gist of the present invention. Accordingly, the scope of the present invention should not be construed to be limited to specific examples shown below.

Example 1 to Example 3

[Production of Paper Sheet Medium]

Example 1-1 to Example 1-13 and Comparative Examples 1-1 to 1-2

A 3% by mass suspension was prepared by beating leaf bleached kraft pulp (LBKP, brightness 86%) so that the CSF was 400 mL. After 0.5 parts by mass of aluminum sulfate was added based on 100 parts by mass of the pulp and dilution was thus made, titanium oxide was added so that the content in a paper sheet medium was the content (% by mass) described in Table 1-1. Furthermore, 0.8 parts by mass of a polyepichlorohydrin-based wet paper strengthening agent WS4024 (manufactured by Seiko PMC Corporation) was added based on 100 parts by mass of the pulp, and molding into a sheet by a wet paper machine was performed to thereby produce a paper sheet medium having a basis weight and a thickness as shown in Table 1-1.

The paper sheet medium produced was again defibrated, and the fiber length, the fiber width, and the fine fiber measured were 0.67 mm, 16.5 μm, and 6.9%, respectively.

The titanium oxide used was any of rutile-type titanium oxide and anatase-type titanium oxide, and the type of the titanium oxide used was shown in Table 1-1.

Example 1-14

A paper sheet medium was produced in the same manner as in Example 1-2.

A solution of a pressure-sensitive adhesive in toluene was obtained by dissolving 100 parts by mass of a styrene-based block copolymer (styrene-hydrogenated isoprene-styrene triblock copolymer) (Septon 2063 manufactured by Kuraray Co., Ltd.), 70 parts by mass of a styrene-based tackifier (FTR8100 manufactured by Mitsui Chemicals, Inc.), and 50 parts by mass of paraffinic oil (Diana Process Oil PW-90 manufactured by Idemitsu Kosan Co., Ltd.) in toluene, and stirring them until a uniform solution was obtained. Thereafter, a biaxially oriented polypropylene film (FOA manufactured by Futamura Chemical Co., Ltd.) having a thickness of 30 μm was coated with the pressure-sensitive adhesive by a knife coater so that the film thickness after drying was 20 μm, and thereafter a pressure-sensitive film obtained by drying toluene as the solvent in conditions of 100° C. and 3 minutes was pasted onto the above sheet made of paper, thereby providing a printing medium.

The paper sheet medium was removed, and the total light transmittance of the transparent resin layer was measured according to JIS K 7361-1:1997 and thus was 80% or more.

Example 1-15

A paper sheet medium was produced in the same manner as in Example 1-2.

A polyethylene pellet (Novatec® LC522 manufactured by Japan Polyethylene Corporation) was loaded into a single-screw extruder (50C150 manufactured by Toyo Seiki Seisaku-sho, Ltd.), and molten at 320° C. Thereafter, a resin was molten and stacked on the sheet made of paper subjected to corona treatment so that the thickness of the resin was 20 μm, thereafter the resultant was rapidly quenched with being sandwiched by a cooling roll at a temperature regulated at 20° C., and thus a sheet medium-stacked article comprising a laminate layer was obtained.

The paper sheet medium was removed, and the total light transmittance of the transparent resin layer was measured according to JIS K 7361-1:1997 and thus was 80% or more.

Example 1-16

A 3% by mass suspension was prepared by beating needle unbleached kraft pulp (NUKP, brightness 21.4%) so that the CSF was 550 mL. After 0.5 parts by mass of aluminum sulfate and 0.1 parts by mass of a yellow coloring pigment (Yellow RS-5 manufactured by Mikuni Color Ltd.) were added based on 100 parts by mass of the pulp and dilution was thus made, titanium oxide was added so that the content in a paper sheet medium was the content (% by mass) described in Table 1-1. Furthermore, 0.8 parts by mass of a polyepichlorohydrin-based wet paper strengthening agent WS4024 (manufactured by Seiko PMC Corporation) was added based on 100 parts by mass of the pulp, and molding into a sheet by a wet paper machine was performed to thereby produce a paper sheet medium having a basis weight and a thickness as shown in Table 1-1.

The titanium oxide used was rutile-type titanium oxide, and the type of the titanium oxide used was shown in Table 1-1.

Comparative Examples 1-3 and 1-4

In Comparative Example 1-3, a printed region was imparted to paper for printing (KB39-7 manufactured by Kokuyo Co., Ltd.) by use of a handy ink-jet printer (MOBILEJET MINI manufactured by Yamazaki & Co., Ltd.).

The ink-jet ink here used was an ink for a water-absorbing material, manufactured by Yamazaki & Co., Ltd.

In Comparative Example 1-4, a printed region was imparted to a thermal label (L'esprit, Universal thermal label, manufactured by Sato Holdings Corporation) by a thermal printer (L'esprit T8 manufactured by Sato Holdings Corporation).

Examples: 2-1, 2-5, 2-8, and 2-11 to 2-13, and Comparative Examples: 2-3

A 3% by mass suspension was prepared by beating leaf bleached kraft pulp (LBKP, brightness 86.0%, Eucalyptus material 100%) so that the CSF was 400 mL. After 0.5 parts by mass of aluminum sulfate was added based on 100 parts by mass of the pulp and dilution was thus made, titanium oxide was added so that the content in a paper sheet medium was the content (% by mass) described in Table 1-2. Furthermore, 0.8 parts by mass of a polyepichlorohydrin-based wet paper strengthening agent WS4024 (manufactured by Seiko PMC Corporation) was added based on 100 parts by mass of the pulp, and molding into a sheet by a wet paper machine was performed to thereby produce a paper sheet medium having a basis weight and a thickness as shown in Table 1-2.

Example: 2-2

A 3% by mass suspension was prepared by beating leaf bleached kraft pulp (LBKP, brightness 86.0%, Eucalyptus material 100%) so that the CSF was 400 mL.

A 3% by mass suspension was prepared by beating needle kraft pulp (NBKP, brightness 84.4%) so that the CSF was 700 mL.

Thereafter, LBKP and NBKP were mixed at a ratio (LBKP:NBKP) of 65:35 (pulp brightness after mixing: 85.0%). After 0.5 parts by mass of aluminum sulfate was added based on 100 parts by mass of the pulp and dilution was thus made, titanium oxide was added so that the content in a paper sheet medium was the content (% by mass) described in Table 1-2. Furthermore, 0.8 parts by mass of a polyepichlorohydrin-based wet paper strengthening agent WS4024 (manufactured by Seiko PMC Corporation) was added based on 100 parts by mass of the pulp, and molding into a sheet by a wet paper machine was performed to thereby produce a paper sheet medium having a basis weight and a thickness as shown in Table 1-2.

In Example 2-12, a transparent resin layer was provided in the same manner as in Example 1-15.

Examples: 2-3, 2-4, 2-6, 2-7, 2-9, and 2-10

A 3% by mass suspension was prepared by beating needle kraft pulp (NBKP, brightness 84.4%) so that the CSF was 700 mL. After 0.5 parts by mass of aluminum sulfate was added based on 100 parts by mass of the pulp and dilution was thus made, titanium oxide was added so that the content in a paper sheet medium was the content (% by mass) described in Table 1-2. Furthermore, 0.8 parts by mass of a polyepichlorohydrin-based wet paper strengthening agent WS4024 (manufactured by Seiko PMC Corporation) was added based on 100 parts by mass of the pulp, and molding into a sheet by a wet paper machine was performed to thereby produce a paper sheet medium having a basis weight and a thickness as shown in Table 1-2.

In each of Examples 2-4, 2-7, and 2-10, a transparent resin layer was provided in the same manner as in Example 1-15.

Example 2-14

A 3% by mass suspension was prepared by subjecting the leaf bleached kraft pulp (LBKP, brightness 86.0%) used in Example 2-1, to dewatering with a pulp machine once, to thereby make paper having a sheet shape, and then beating the resultant so that the CSF was 400 mL. Such dewatering with a pulp machine is performed with a mesh of the pulp machine, and thus the aperture size of the mesh can be selected to thereby decrease a fine fiber. After 0.5 parts by mass of aluminum sulfate was added based on 100 parts by mass of the pulp and dilution was thus made, titanium oxide was added so that the content in a paper sheet medium was the content (% by mass) described in Table 1-2. Furthermore, 0.8 parts by mass of a polyepichlorohydrin-based wet paper strengthening agent WS4024 (manufactured by Seiko PMC Corporation) was added based on 100 parts by mass of the pulp, and molding into a sheet by a wet paper machine was performed to thereby produce a paper sheet medium having a basis weight and a thickness as shown in Table 1-2.

Example 2-15

A 3% by mass suspension was prepared by beating leaf bleached kraft pulp (LBKP, brightness 86.0%, Eucalyptus material 100%) used in Example 2-1 so that the CSF was 400 mL.

Powder pulp was produced by mechanically pulverizing a dry sheet of LBKP (leaf bleached kraft pulp) with a cutter mill (HA8 2542 30E manufactured by Horai Co., Ltd., screen 0.24 mm).

Thereafter, a 3% by mass suspension was prepared by mixing LBKP and the pulp pulverized at a ratio (LBKP:pulp pulverized) of 70:30. After 0.5 parts by mass of aluminum sulfate was added based on 100 parts by mass of the pulp and dilution was thus made, titanium oxide was added so that the content in a paper sheet medium was the content (% by mass) described in Table 1-2. Furthermore, 0.8 parts by mass of a polyepichlorohydrin-based wet paper strengthening agent WS4024 (manufactured by Seiko PMC Corporation) was added based on 100 parts by mass of the pulp, and molding into a sheet by a wet paper machine was performed to thereby produce a paper sheet medium having a basis weight and a thickness as shown in Table 1-2.

Example 2-16

A 3% by mass suspension was prepared by beating leaf bleached kraft pulp (LBKP, brightness 85.0%, acacia material 100%) different from that used in Example 2-1 so that the CSF was 400 mL. After 0.5 parts by mass of aluminum sulfate was added based on 100 parts by mass of the pulp and dilution was thus made, titanium oxide was added so that the content in a paper sheet medium was the content (% by mass) described in Table 1-2. Furthermore, 0.8 parts by mass of a polyepichlorohydrin-based wet paper strengthening agent WS4024 (manufactured by Seiko PMC Corporation) was added based on 100 parts by mass of the pulp, and molding into a sheet by a wet paper machine was performed to thereby produce a paper sheet medium having a basis weight and a thickness as shown in Table 1-2.

Example 2-17

A 3% by mass suspension was prepared by beating needle bleached kraft pulp (NBKP, brightness 85.0%, pine wood 100%) different from that used in Example 2-2 so that the CSF was 700 mL. After 0.5 parts by mass of aluminum sulfate was added based on 100 parts by mass of the pulp and dilution was thus made, titanium oxide was added so that the content in a paper sheet medium was the content (% by mass) described in Table 1-2. Furthermore, 0.8 parts by mass of a polyepichlorohydrin-based wet paper strengthening agent WS4024 (manufactured by Seiko PMC Corporation) was added based on 100 parts by mass of the pulp, and molding into a sheet by a wet paper machine was performed to thereby produce a paper sheet medium having a basis weight and a thickness as shown in Table 1-2.

Comparative Example: 2-1

A 3% by mass suspension was prepared by using hemp pulp (brightness 85.0%) not beaten (CSF 700 mL). After 0.5 parts by mass of aluminum sulfate was added based on 100 parts by mass of the pulp and dilution was thus made, titanium oxide was added so that the content in a paper sheet medium was the content (% by mass) described in Table 1-2. Furthermore, 0.8 parts by mass of a polyepichlorohydrin-based wet paper strengthening agent WS4024 (manufactured by Seiko PMC Corporation) was added based on 100 parts by mass of the pulp, and molding into a sheet by a wet paper machine was performed to thereby produce a paper sheet medium having a basis weight and a thickness as shown in Table 1-2.

Comparative Example 2-2

A 3% by mass suspension was prepared by beating leaf bleached kraft pulp (LBKP, brightness 86.0%, salt cedar material) different from that used in Example 2-1 so that the CSF was 300 mL. After 0.5 parts by mass of aluminum sulfate was added based on 100 parts by mass of the pulp and dilution was thus made, titanium oxide was added so that the content in a paper sheet medium was the content (% by mass) described in Table 1-2. Furthermore, 0.8 parts by mass of a polyepichlorohydrin-based wet paper strengthening agent WS4024 (manufactured by Seiko PMC Corporation) was added based on 100 parts by mass of the pulp, and molding into a sheet by a wet paper machine was performed to thereby produce a paper sheet medium having a basis weight and a thickness as shown in Table 1-2.

Comparative Example 2-4

The paper sheet medium used in Example 2-1 was used and an infrared laser (MD-F3200 manufactured by Keyence Corporation) was used, to perform 10-mm square marking. Irradiation conditions were as follows.
  Wavelength: 1090 nm
  Repeat frequency: 60 kHz
  Spot size=40 μm
  Scanning speed: 2000 mm/sec
  Focal distance: 300 mm (focusing was performed by use of a height correction tool attached to the apparatus)
  Line pitch: 200 μm
  Output: 3 W
  As a result, printing-out could not be performed.

Comparative Example 2-5

The paper sheet medium used in Example 2-1 was used and a green laser (MD-59910A manufactured by Keyence Corporation) was used, to perform 10-mm square marking. Irradiation conditions were as follows.
  Wavelength: 532 nm
  Repeat frequency: 60 kHz
  Spot size=40 μm
  Scanning speed: 2000 mm/sec
  Focal distance: 300 mm (focusing was performed by use of a height correction tool attached to the apparatus)
  Line pitch: 200 μm
  Output: 3 W
  As a result, printing-out could not be performed.

Comparative Example 2-6

The paper sheet medium used in Example 2-1 was used and a $CO_2$ laser (ML-Z9610 manufactured by Keyence Corporation) was used, to perform 10-mm square marking. Irradiation conditions were as follows.
  Wavelength: 10600 nm
  Spot size=40 μm
  Scanning speed: 2000 mm/sec
  Focal distance: 300 mm (focusing was performed by use of a height correction tool attached to the apparatus)
  Line pitch: 200 μm
  Output: 3 W
  As a result, printing-out could not be performed.

Examples 3-1 to 3-25, and Comparative Examples 3-1, 3-3, and 3-4

<Method for Producing Masterbatch>

After 50 parts of a resin was placed into a kneader and kneaded at 120° C. to 140° C. (PE, PP) or 270° C. (PET) and thus molten, 50 parts of titanium oxide was placed thereinto and the mixture was kneaded for 10 minutes. Thereafter, the mixture was extruded by a single-screw extruder, and a pellet-like masterbatch was produced by a hot cutting apparatus.

<Film Formation Method>

The resulting masterbatch and the resin were charged into an extruder so that the titanium oxide content in Table 2 was achieved, and these are molten and extruded at a resin temperature of 120° C. to 140° C. (PE, PP) or 280° C. (PET) by use of a coat hanger type T-die (200 mmφ) extruder, and closely attached to and quenched with a casting roll at a temperature regulated at 20° C. under application of a voltage of 7 kV to a pinning wire, thereby providing an unstretched sheet. The resulting unstretched sheet was stretched by a roll type longitudinal stretching machine, and a uniaxially stretched film having a thickness of 30 to 70 μm was obtained.

Comparative Example 3-2

A sheet medium was produced with reference to Example 6 of JP H11-020316 A. Specifically, a composition was prepared by adding titanium oxide so that the titanium oxide content based on 100 parts by mass of acrylic rubber (PA312 manufactured by Unimatec Co., Ltd.) was as shown in Table 2, adding 1 part by mass of stearic acid and 0.5 parts by mass of wax (Sunnoc), subjecting the resultant to kneading by a kneader for 10 minutes, thereafter thickening by a 10-inch twin roll, extracting once from the roll and cooling, and then warming again by the roll, and loading 3 parts by mass of zinc dimethyldithiocarbamate thereto. The composition was subjected to pressure vulcanization with 110-ton press at 195° C. for 3 minutes and thereafter oven vulcanization (secondary vulcanization) at 165° C. for 6 hours, and thus a vulcanized sheet having a thickness of 2 mm was obtained.

Comparative Example 3-5 to Comparative Example 3-6

In Comparative Example 3-5, a printed region was imparted to an ink-jet OHP film (IT-120PF 45-035 manufactured by Kokuyo Co., Ltd.) by use of a handy ink-jet printer (MOBILEJET MINI manufactured by Yamazaki & Co., Ltd.). The ink-jet ink here used was an ink for a non-water-absorbing material, manufactured by Yamazaki & Co., Ltd.

In Comparative Example 3-6, a printed region was imparted to a polyester film Thermal (FD-5810-45 manufactured by Lintec Corporation) by a thermal printer (L'esprit T8 manufactured by Sato Holdings Corporation).

[Titanium Oxide]

The details of each titanium oxide used in Examples and Comparative Examples are as follows.

<Rutile-Type Titanium Oxide>

Irregular, average particle size=0.2 μm (value measured with laser diffraction/scattering type particle size distribution meter) (R780 manufactured by Ishihara Sangyo Kaisha, Ltd.)

Irregular, average particle size=4.3 μm (value measured with laser diffraction/scattering type particle size distribution meter) (PER410 manufactured by Ishihara Sangyo Kaisha, Ltd.)

Acicular, longer size=1.7 μm, shorter size=0.1 μm (FTL100 manufactured by Ishihara Sangyo Kaisha, Ltd.)

Acicular, longer size=10 μm, shorter size=0.5 μm (FTL400 manufactured by Ishihara Sangyo Kaisha, Ltd.)

<Anatase-Type Titanium Oxide>

Irregular, average particle size 0.1 μm (A100 manufactured by Ishihara Sangyo Kaisha, Ltd.)

[Resin]

The details of each resin used in Examples and Comparative Examples are as follows.

Polyethylene: Novatec® LC522 (manufactured by Japan Polyethylene Corporation)

Polypropylene: FS2011DG3 manufactured by Sumitomo Chemical Co., Ltd.

Polyethylene terephthalate: SA-8339P manufactured by Unitika Ltd.

Acrylic rubber (PA312 manufactured by Unimatec Co., Ltd.)

[Conditions-1 of Irradiation with Ultraviolet Laser (Examples 1-1 to 1-16 (Examples 1-1 to 1-16 are Also Collectively Referred to as "Example 1," and the Same Applies to the Following), Comparative Examples 1-1 and 1-2, Examples 3-1 to 3-25, and Comparative Examples 3-1 to 3-4)]

An ultraviolet laser (AVIA266-3000 manufactured by Coherent Inc.) was used to apply printing of a bar code illustrated in FIGS. 1 and 10-mm square marking onto the resulting printing medium. Irradiation conditions were as follows.

Wavelength: 355 nm

Repeat frequency: 50 kHz

Pulse width: 25 ns

Spot size: 104 μm

Scanning speed: 4000 mm/sec

Focal distance: 250 mm

Line pitch: 150 μm

The output was a value shown in Table 1 and Table 2.

[Conditions-2 of Irradiation with Ultraviolet Laser (Examples 2-1 to 2-17 and Comparative Examples 2-1 to 2-3)]

An ultraviolet laser (MD-U1020C manufactured by Keyence Corporation) was used to apply printing of a bar code illustrated in FIG. 1 and 10-mm square marking onto the resulting printing medium.

Irradiation conditions were as follows.

Wavelength: 355 nm

Repeat frequency: 40 kHz

Spot size=40 μm

Scanning speed: 3000 mm/sec

Focal distance: 300 mm (focusing was performed by use of a height correction tool attached to the apparatus)

Line pitch: 40 μm

The output was a value shown in Table 1.

[Measurement/Evaluation]

Characteristics of the pulp used were measured as follows.

[CSF]

The Canadian standard freeness (CSF) was measured according to JIS P 8121-2:2012.

[Brightness]

The brightness of the pulp used was measured according to JIS P 8212:1998.

The resulting sheet medium or print product was subjected to the following evaluations.

[Measurement of Length-Weighted Average Fiber Length, Average Fiber Width, and Amount of Fine Fiber]

When the sheet medium was a paper sheet medium, each of the printing media obtained in Examples and Comparative Examples was cut out to a 40-cm square, and the resultant was immersed in ion-exchange water, subjected to adjustment to a concentration of 2%, and then immersed for 24 hours. After immersion for 24 hours, a standard defibrator (manufactured by Kumagai Riki Kogyo Co., Ltd.) was used for treatment until any undefibrated fiber disappeared, and thus the pulp was defibrated to provide a fiber. When a transparent resin layer was comprised, a slurry (pulp fiber dispersion) after removal of the transparent resin layer and defibration was separately taken, and a fiber length measurement machine (Model FS-5 provided with UHD base unit, manufactured by Valmet K.K.) was used to measure "length-weighted average fiber length (ISO)," "amount of fine fiber," and "fiber width."

The "length-weighted average fiber length (ISO)" is the length-weighted average fiber length obtained by selection of a fiber of 0.2 mm or more and 7.6 mm or less and calculation.

The "amount of fine fiber" is the number-based proportion of a fine fiber having a fiber width of 75 μm or less and a length of 0.08 mm or more and 0.20 mm or less in a pulp fiber defibrated.

The "fiber width" is the length-weighted average fiber width obtained by selection of a fiber having a width of 10 μm or more and 75 μm or less and calculation.

When only a small amount of the paper sheet medium can be ensured, a manual defibrator (Dasher, manufactured by Valmet K.K.) for paper sheet medium treatment with piston movement may be used to defibrate the pulp and thus provide a fiber. Such piston movement was continued until any undefibrated fiber disappeared, and if complete defibration was not made, such piston movement was performed for an upper limit of 10,000 times and thereafter the resulting pulp slurry was subjected to measurement.

51

[Basis Weight and Paper Thickness]

The basis weight of each of the paper sheet media used in Examples and Comparative Examples was measured according to JIS P 8124:2011. The thickness of each of the paper sheet media in Examples and Comparative Examples was measured according to JIS P 8118:2014.

[Thickness of Film Medium]

The thickness of each of the film media in Examples and Comparative Examples was measured according to JIS P 8118:2014.

[Raman Spectrum-1]

Each of Raman spectra with respect to Example 1, Comparative Example 1, Example 3, and Comparative Example 3 was measured by the following method.

<Measurement Conditions>

While Raman spectrum measurement conditions are as follows, the following measurement conditions, for example, the laser output and the irradiation time can be appropriately modified, for example, when any damage by the laser used for the measurement is found in the print product and/or when fluorescence is intense. It is noted that the Raman intensities of the printed region and the non-printed region, here adopted, are the numerical values measured under the same conditions.

Apparatus: inVia Raman microscope QUONTOR manufactured by Renishaw plc.

Excitation laser: 532 nm

Laser power: 50 mW (at an output of 100%)

Laser output: 5%

Measurement mode: confocal mode

Irradiation time: 2.0 sec

Cumulated number: 10

Laser spot size: 2.5 μm

Objective lens: 20×

<Measurement Method>

Measurement was performed by the following method.

(1) A reference specimen (monocrystalline silicon, manufactured by Renishaw plc.) was used to perform calibration of the Raman shift position (monocrystalline silicon, 520.5 $cm^{-1}$).

(2) A sheet-like sample was installed on a stage. A holding member was, if necessary, installed so that such a sheet was kept as a flat surface.

Figure 2:
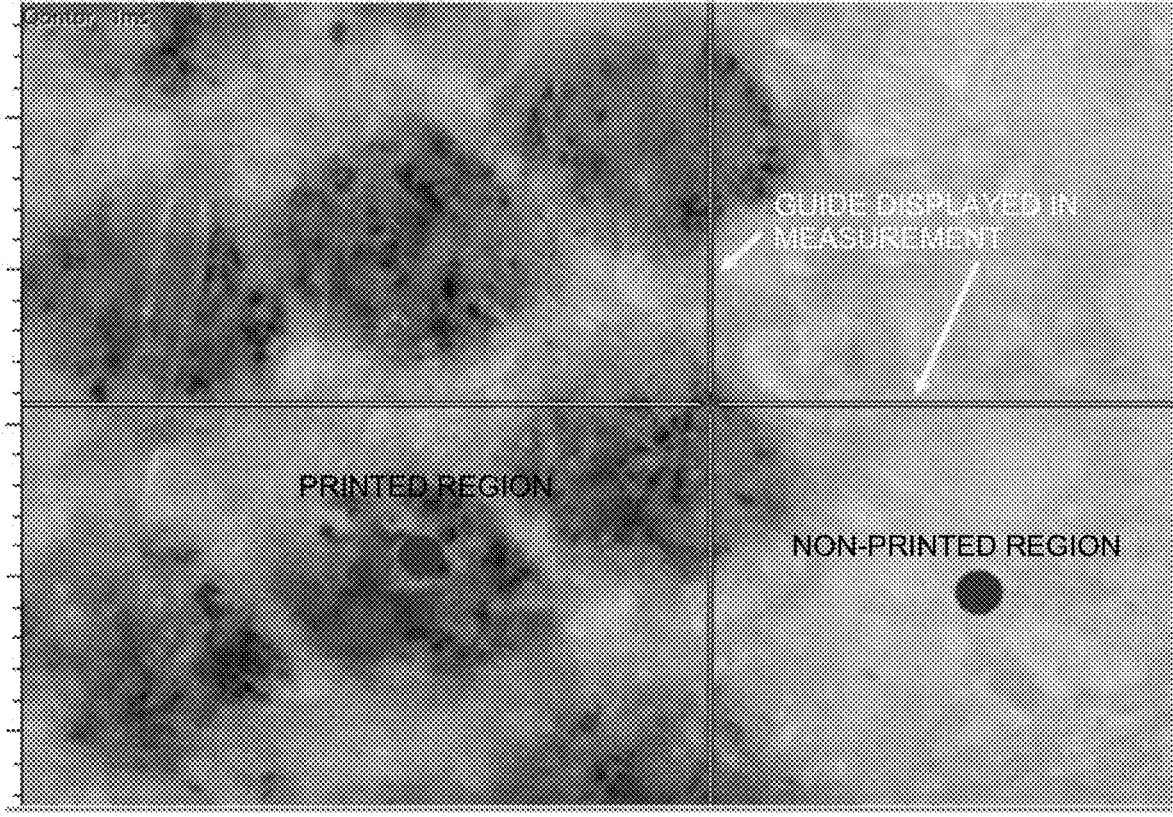
FIG. 2 is an explanatory diagram illustrating one example of Raman intensity measurement of a first print product.

(3) Focusing was performed in the apparatus as illustrated in FIG. 2 and observation (set by a simulated laser so that the smallest focus was achieved) was performed. The printed region was observed so that a visually confirmable blackest position was at the center of a guide displayed in measurement. The non-printed region was observed with being apart by a distance of 300 μm or more from the printed region.

(4) The resulting Raman spectrum was subjected to baseline correction (intelligent correction) with processing software (Wire5.2 manufactured by Renishaw plc.) attached to the apparatus. The baseline was corrected according to polynomial expression 11 of the processing software.

(5) The respective maximum values (maximum intensities) were read in the wavenumber ranges of $447\pm3$ $cm^{-1}$ and $516\pm3$ $cm^{-1}$ in the cases of rutile-type titanium oxide and anatase-type titanium oxide, and the Raman intensity ratio was calculated according to the following expression.

Raman intensity ratio=Maximum intensity in printed region/Maximum intensity in non-printed region (6) Measurement was made at 10 positions in each of the printed region (print-out portion) and the non-printed region (non-print-out portion), and the respective average values were adopted as the measurement results.

52

[Raman Spectrum-2]

Each of Raman spectra with respect to Example 2 and Comparative Example 2 was measured by the following method.

<Measurement Conditions and Measurement Method>

While Raman spectrum measurement conditions and measurement method are as described above, the following measurement conditions, for example, the laser output and the irradiation time can be appropriately modified, for example, when any damage by the laser used for the measurement is found in the print product and/or when fluorescence is intense. It is noted that the Raman intensities of the printed region and the non-printed region, here adopted, are the numerical values measured under the same conditions.

The number of counts of the Raman intensity in the printed region is preferably in the range of 10,000 or less from the viewpoint of suppression of the variation in measurement value. Accordingly, measurement conditions were appropriately modified so that the number of counts of the Raman intensity in the printed region was in the range of 10,000 or less. Measurement was performed in the following measurement conditions ten times, any numerical value falling out of the average value±2 SD (standard deviation) was excluded, and then the average was again determined and defined as the average value of the Raman intensity.

[Print-Out Clearness]

The print-out clearness of the resulting print product (print product by printing of a bar code of FIG. 1) was evaluated according to the following evaluation criteria.

The color close to that of the print-out was visually selected from the Munsell table (Color Scale manufactured by Japan Color Enterprise Co., Ltd.), and the clearness was evaluated according to the following criteria.

A: a color value in the Munsell table (achromatic color), of 4 or less

B: a color value in the Munsell table (achromatic color), of 5 to 6

C: a color value in the Munsell table (achromatic color), of 7 to 8

D: a color value in the Munsell table (achromatic color), of 9 or more

[Solvent Resistance]

The solvent resistance of the resulting print product (print product by printing of a bar code of FIG. 1) was evaluated according to the following evaluation criteria.

The print product was immersed in 100% acetone (manufactured by Kanto Chemical Co., Inc.), and left to still stand for 15 minutes. Thereafter, the print-out product was taken out, the solvent was wiped off by tissue paper, and the solvent resistance was visually evaluated according to the following evaluation criteria.

A: scratch and loss of the print-out not found (no change) after immersion as compared with before immersion.

B: scratch and loss of the print-out found after immersion as compared with before immersion.

[Amount of Smoking]

Whether or not smoking was seen in 10-mm square marking in irradiation with ultraviolet laser was observed, and the amount of smoking was evaluated by the following method.

<Determination Criteria>

0: no visually confirmable smoking

1: slightly visually confirmable smoking, but a very small amount of smoking

2: visually confirmable smoking, but a small amount of smoking

3: easily visually confirmable smoking, and a large amount of smoking

[Evaluation of Reduction in Strength]

The degree of degradation in tensile strength was evaluated by the following method.

The resulting printing medium was subjected to 15-cm square marking with ultraviolet laser (MD-U1020C manufactured by Keyence Corporation).

Irradiation conditions were as follows.

Wavelength: 355 nm

Repeat frequency: 40 kHz

Spot size=40 μm

Scanning speed: 3000 mm/sec

Focal distance: 300 mm (focusing was performed by use of a height correction tool attached to the apparatus)

Line pitch: 40 μm

The output was a value shown in Table 2.

Thereafter, a strip having a width of 15 mm and a length of 150 mm was cut out, and subjected to a tensile test to thereby measure the tensile strength according to JIS P 8113:2006.

If there was any difference in sheet between directions of a stretched film, each test piece was taken out in the same direction.

The same measurement was also made before laser printing-out, and the rate of reduction in strength was calculated as follows.

$$\text{Rate of reduction}=100-(\text{Tensile strength after printing-out/Tensile strength before printing-out}\times100)$$

<Determination Criteria>

0: a rate of reduction of 1% or less

1: a rate of reduction of more than 1% and 5% or less

2: a rate of reduction of more than 5% and 10% or less

3: a rate of reduction of more than 10% and 15% or less

4: a rate of reduction of more than 15% and 20% or less

[Titanium Oxide Content]

<Production of Test Piece>

The printable region of the printing medium was cut out to a proper size to provide a sample (test piece), and the area and the mass cut out were recorded.

<Dissolution of Test Piece>

A mixed solvent of nitric acid and hydrofluoric acid at 50:5 (nitric acid:hydrofluoric acid, % by volume) and the test piece were loaded into a Teflon® container of an autoclave apparatus (MARS5 manufactured by CEM Japan), and treated with the autoclave at 210° C. for 120 minutes, thereby dissolving the test piece. The mass of the test piece may be appropriately modified, and if the test piece remains without being dissolved, the ratio between nitric acid and hydrofluoric acid, the treatment temperature, the treatment time, and the like may be appropriately modified.

After the test piece was dissolved, the volume was precisely made constant with ultrapure water.

<Measurement of Amount of Titanium Oxide in Dissolution Liquid>

(1) The ICP Apparatus and Measurement Conditions were as Follows.

ICP Apparatus: ICP-OEC apparatus (CIROS1-20 manufactured by Rigaku Corporation)

Measurement conditions:

Carrier gas: argon gas

Flow rate of argon gas 0.9 L/min

Flow rate of plasma gas 14 L/min

Plasma output 1400 W

Speed of rotation of pump: 2

Measurement wavelength (Ti): 334.941 nm (2) Preparation of Calibration Curve

A universal mixed standard liquid (XSTC-622B manufactured by SPEX) was precisely weighed so that the following concentrations were each achieved, and subjected to measurement in the measurement conditions to thereby measure the strength at 334.941 nm corresponding to the emission wavelength of a titanium atom.

Concentrations for calibration curve preparation: 0 ppm, 0.01 ppm, 0.05 ppm, 0.1 ppm, 0.5 ppm, 1.0 ppm, 3.0 ppm, 5.0 ppm (3) Measurement of Titanium Oxide Content in Dissolution Liquid The solution in which the test piece was dissolved was diluted with ultrapure water so as to meet the calibration curve, and subjected to ICP measurement.

(4) Method for Calculating Titanium Oxide Content

The titanium oxide content was calculated by the following expressions. Here, the Molecular weight of titanium oxide/Molecular weight of titanium almost equals to 1.669.

$$\text{Titanium oxide content (g/m}^2\text{)}=\text{Concentration (ppm) in ICP measurement}\times\text{Dilution factor}\times\text{Constant volume (L)}\times1.669\times1000/\text{Area (m}^2\text{)}$$

$$\text{Titanium oxide content (\% by mass)}=\text{Concentration (ppm) in ICP measurement}\times\text{Dilution factor}\times\text{Constant volume (L)}\times1.669/\text{Mass (mg) of test piece}\times100$$

[Particle Size of Titanium Oxide]

The particle size of the titanium oxide filled in the paper and film was calculated from a SEM image of ash obtained by burning of the sheet medium or the print product in a muffle furnace, the image being obtained with a scanning-type electron microscope (SEM, S5200 or the like manufactured by Hitachi High-Tech Corporation).

Specifically, ash was obtained in the same conditions as in the measurement in [Titanium oxide content] described above.

An ash sample to be tested with a scanning-type electron microscope was produced by obtaining a 0.01% by mass slurry due to dispersion in ethanol by an ultrasonic homogenizer (LUH150 or the like manufactured by Yamato Scientific Co., Ltd.) having an output of 50 W over 5 minutes, then casting 0.1 mL of the slurry on an aluminum dish and drying it at 60° C., and then cutting out the aluminum dish to a size suited for testing with SEM. Adjacent particles clearly distinguishable from each other were visually selected, and the longer size of one particle was defined as the particle size. When a primary particle and a secondary particle in an aggregated state were here clearly distinguishable from each other even if present in a mixed manner, such each particle was counted as one particle and the average size in 100 of such particles randomly selected was defined as the particle size. The magnification in SEM image observation was appropriately selected depending on the particle size of the titanium oxide, and was set to about 20000 times.

In an acicular case, the average size of the shorter sizes of 100 of such particles subjected to longer size measurement was defined as the shorter size.

When any particle other than the titanium oxide was comprised, a particle comprising a titanium element was subjected to measurement with an energy dispersive X-ray analyzer (EMAX or the like manufactured by Horiba Ltd.) attached to SEM.

[Measurement of Brightness]

The brightness of the resulting printing medium comprising the paper sheet medium was measured.

The brightness of the paper sheet medium was measured with a spectral brightness colorimeter (manufactured by Suga Test Instruments Co., Ltd.) according to the method described in JIS P 8148:2018.

TABLE 1-1

| Paper sheet medium | Example | | | | | | | | | | | | | | | | Comparative Example | | | |
|---|---|---|---|---|---|---|---|---|---|---|---|---|---|---|---|---|---|---|---|---|
| | 1-1 | 1-2 | 1-3 | 1-4 | 1-5 | 1-6 | 1-7 | 1-8 | 1-9 | 1-10 | 1-11 | 1-12 | 1-13 | 1-14* | 1-15* | 1-16 | 1-1 | 1-2 | 1-3 | 1-4 |
| Method for adding titanium oxide | Filling | Filling | Filling | Filling | Filling | Filling | Filling | Filling | Filling | Filling | Filling | Filling | Filling | Filling | Filling | Filling | Filling | Filling | Ink-jet | Thermo-sensitive label |
| Material | Paper | Paper | Paper | Paper | Paper | Paper | Paper | Paper | Paper | Paper | Paper | Paper | Paper | Paper | Paper | Paper | Paper | Paper | | |
| Length-weighted average fiber length mm | 0.67 | 0.67 | 0.67 | 0.67 | 0.67 | 0.67 | 0.67 | 0.67 | 0.67 | 0.67 | 0.67 | 0.67 | 0.67 | 0.67 | 0.67 | 2.42 | 0.67 | 0.67 | | |
| Average fiber width μm | 16.5 | 16.5 | 16.5 | 16.5 | 16.5 | 16.5 | 16.5 | 16.5 | 16.5 | 16.5 | 16.5 | 16.5 | 16.5 | 16.5 | 16.5 | 33.2 | 16.5 | 16.5 | | |
| Number-based proportion of fine fiber % | 6.9 | 6.9 | 6.9 | 6.9 | 6.9 | 6.9 | 6.9 | 6.9 | 6.9 | 6.9 | 6.9 | 6.9 | 6.9 | 6.9 | 6.9 | 7.2 | 6.9 | 6.9 | | |
| Basis weight g/m² | 70.2 | 70.3 | 70.0 | 69.8 | 70.6 | 70.0 | 70.0 | 70.0 | 40.0 | 140.0 | 70.0 | 70.0 | 70.0 | 70.3 | 70.3 | 70.3 | 70.4 | 70.0 | | |
| Paper thickness μm | 80 | 80 | 80 | 80 | 80 | 80 | 80 | 80 | 39 | 160 | 80 | 80 | 80 | 80 | 80 | 80 | 80 | 80 | | |
| Brightness % | 87.2 | 88.5 | 89.1 | 89.3 | 88.2 | 90.1 | 90.2 | 90.2 | 89.9 | 90.1 | 89.1 | 89.2 | 89.2 | 88.5 | 88.4 | 9.5 | 86.5 | 89.1 | | |
| Titanium oxide content wt % | 1.4 | 9.2 | 29.0 | 40.0 | 38.8 | 40.1 | 40.4 | 40.4 | 40.1 | 40.2 | 29.1 | 29.0 | 29.3 | 9.2 | 9.2 | 9.2 | 0.5 | 40.0 | | |
| Crystal system of titanium oxide | Rutile | Rutile | Rutile | Rutile | Anatase | Anatase Rutile | Rutile | Rutile | Rutile | Rutile | Rutile | Rutile | Rutile | Rutile | Rutile | Rutile | Rutile | Rutile | | |
| Particle size of titanium oxide μm | 0.27 | 0.27 | 0.27 | 0.27 | 0.22 | 0.27 | 0.27 | 0.27 | 0.27 | 0.27 | 4.41 | | | 0.27 | 0.27 | 0.27 | 0.27 | 4.41 | | |
| Longer size of titanium oxide μm | | | | | | | | | | | | 1.72 | 10.3 | | | | | | | |
| Shorter size of titanium oxide μm | | | | | | | | | | | | 0.12 | 0.51 | | | | | | | |

TABLE 1-1-continued

| | | Example | | | | | | | | | | | | | | | | Comparative Example | | | |
|---|---|---|---|---|---|---|---|---|---|---|---|---|---|---|---|---|---|---|---|---|---|---|
| | | 1-1 | 1-2 | 1-3 | 1-4 | 1-5 | 1-6 | 1-7 | 1-8 | 1-9 | 1-10 | 1-11 | 1-12 | 1-13 | 1-14* | 1-15* | 1-16 | 1-1 | 1-2 | 1-3 | 1-4 |
| | Aspect ratio of titanium oxide | | | | | | | | | | | | 14.3 | 20.196 | | | | | | | |
| | Particle shape of titanium oxide | Irreg-ular | Irreg-ular | Irreg-ular | Irreg-ular | Irreg-ular | Irreg-ular | Irreg-ular | Irreg-ular | Irreg-ular | Irreg-ular | Irreg-ular | Acic-ular | Acic-ular | Irreg-ular | Irreg-ular | Irreg-ular | Irreg-ular | Irreg-ular | | |
| Printing condition | Output W | 5 | 5 | 5 | 5 | 5 | 3 | 1 | 20 | 5 | 5 | 5 | 5 | 5 | 5 | 5 | 5 | 5 | 0.5 | | |
| Raman spectrum | Non-printed region Count | 1,201 | 8,102 | 27,350 | 35,555 | 48,805 | 34,991 | 33,992 | 35,542 | 34,993 | 35,654 | 27,223 | 28,834 | 27,733 | 8,002 | 8,112 | 8,110 | 291 | 35,523 | 0 | 0 |
| | Printed region Count | 30 | 41 | 1,301 | 1,685 | 6,620 | 6,298 | 21,415 | 1,066 | 1,715 | 1,818 | 499 | 488 | 532 | 33 | 41 | 41 | 20 | 31,615 | 0 | 0 |
| | Printed region/ Non-printed region | 0.02 | 0.01 | 0.05 | 0.05 | 0.14 | 0.18 | 0.63 | 0.03 | 0.05 | 0.05 | 0.02 | 0.02 | 0.02 | 0.00 | 0.01 | 0.01 | 0.07 | 0.89 | — | — |
| Evaluation | Print-out clearness | C | B | B | A | A | B | C | A | A | A | A | A | A | A | A | C | D | D | A | A |
| | Solvent resistance | A | A | A | A | A | A | A | A | A | A | A | A | A | A | A | A | Un-measur-able | A | B | B |
| | Amount of smoking | 0 | 2 | 2 | 2 | 2 | 2 | 0 | 2 | 2 | 2 | 2 | 2 | 2 | 0 | 0 | 2 | 0 | 0 | — | — |

*Use of printing medium with transparent resin layer provided on paper sheet medium, in Examples 1-14 and 1-15

TABLE 1-2

| | | | Example | | | | | | | | | | | | | | | | | | Comparative Example | | |
|---|---|---|---|---|---|---|---|---|---|---|---|---|---|---|---|---|---|---|---|---|---|---|---|---|
| Paper sheet medium | | | 2-1 | 2-2 | 2-3 | 2-4* | 2-5 | 2-6 | 2-7* | 2-8 | 2-9 | 2-10* | 2-11 | 2-12* | 2-13 | 2-14 | 2-15 | 2-16 | 2-17 | 2-1 | 2-2 | 2-3 |
| Method for adding titanium oxide | | | Filling | Filling | Filling | Filling | Filling | Filling | Filling | Filling | Filling | Filling | Filling | Filling | Filling | Filling | Filling | Filling | Filling | Filling | Filling | Filling |
| Material | Length-weighted average fiber length | mm | Paper 0.67 | Paper 1.30 | Paper 2.50 | Paper 2.50 | Paper 0.67 | Paper 2.50 | Paper 2.50 | Paper 0.67 | Paper 2.50 | Paper 2.50 | Paper 0.67 | Paper 0.67 | Paper 0.67 | Paper 0.67 | Paper 0.67 | Paper 0.69 | Paper 2.50 | Paper 3.79 | Paper 0.53 | Paper 0.67 |
| | Fiber width | μm | 16.5 | 20.4 | 30.8 | 30.8 | 16.5 | 30.8 | 30.8 | 16.5 | 30.8 | 30.8 | 16.5 | 16.5 | 16.5 | 16.5 | 16.5 | 14.8 | 32.0 | 24.3 | 16.5 | 16.5 |
| | Fine structure | % | 6.9 | 8.5 | 15.2 | 15.2 | 6.9 | 15.2 | 15.2 | 6.9 | 15.2 | 15.2 | 6.9 | 6.9 | 6.9 | 6.0 | 35.0 | 7.2 | 7.2 | 5.2 | 18.0 | 6.9 |
| Basis weight | | g/m² | 70 | 70 | 70 | 70 | 70 | 70 | 70 | 70 | 70 | 70 | 25 | 20 | 350 | 70 | 70 | 70 | 70 | 70 | 70 | 10 |
| Paper thickness | | μm | 83 | 83 | 83 | 83 | 86 | 86 | 86 | 86 | 86 | 86 | 30 | 24 | 438 | 86 | 86 | 86 | 86 | 83 | 86 | 12.3 |
| Brightness | | % | 88.5 | 87.7 | 86.9 | 86.9 | 86.3 | 85.3 | 84.9 | 85.3 | 84.9 | 84.9 | 88.5 | 86.3 | 86.3 | 86.3 | 86.3 | 86.3 | 86.3 | 86.5 | 86.3 | 86.3 |
| Titanium oxide content | | wt % | 40.0 | 40.0 | 40.0 | 40.0 | 5.0 | 5.0 | 5.0 | 1.0 | 1.0 | 1.0 | 40.0 | 5.0 | 5.0 | 5.0 | 5.0 | 5.0 | 5.0 | 5.0 | 5.0 | 5.0 |
| Particle shape of titanium oxide | | | Rutile | Rutile | Rutile | Rutile | Rutile | Rutile | Rutile | Rutile | Rutile | Rutile | Rutile | Rutile | Rutile | Rutile | Rutile | Rutile | Rutile | Rutile | Rutile | Rutile |
| Particle size of titanium oxide | | μm | 0.27 | 0.27 | 0.27 | 0.27 | 0.27 | 0.27 | 0.27 | 0.27 | 0.27 | 0.27 | 0.27 | 0.27 | 0.27 | 0.27 | 0.27 | 0.27 | 0.27 | 0.27 | 0.27 | 0.27 |
| Particle shape of titanium oxide | | | Irregular | Irregular | Irregular | Irregular | Irregular | Irregular | Irregular | Irregular | Irregular | Irregular | Irregular | Irregular | Irregular | Irregular | Irregular | Irregular | Irregular | Irregular | Irregular | Irregular |

TABLE 1-2-continued

| | | | Example | | | | | | | | | | | | | | | | | Comparative Example | | |
|---|---|---|---|---|---|---|---|---|---|---|---|---|---|---|---|---|---|---|---|---|---|---|---|
| | | | 2-1 | 2-2 | 2-3 | 2-4* | 2-5 | 2-6 | 2-7* | 2-8 | 2-9 | 2-10* | 2-11 | 2-12* | 2-13 | 2-14 | 2-15 | 2-16 | 2-17 | 2-1 | 2-2 | 2-3 |
| Printing condition | Output | W | 2 | 2 | 2 | 2 | 2 | 2 | 2 | 2 | 2 | 2 | 2 | 2 | 2 | 2 | 2 | 2 | 2 | 2 | 2 | 2 |
| Raman spectrum | Non-printed region | Count | 30,023 | 31,123 | 30,034 | 30,023 | 6,067 | 6,034 | 6,064 | 3,042 | 3,055 | 3,112 | 30,023 | 6,067 | 6,067 | 6,432 | 6,223 | 6,334 | 6,221 | 30,102 | 3,203 | 6,034 |
| | Printed region | Count | 9,021 | 10,023 | 12,003 | 4,932 | 352 | 502 | 201 | 193 | 342 | 105 | 8,922 | 483 | 483 | 577 | 655 | 533 | 676 | 14,324 | 457 | 449 |
| | Printed region/Non-printed region | | 0.30 | 0.32 | 0.40 | 0.16 | 0.06 | 0.08 | 0.03 | 0.06 | 0.11 | 0.03 | 0.30 | 0.08 | 0.08 | 0.09 | 0.11 | 0.08 | 0.11 | 0.48 | 0.14 | 0.07 |
| Evaluation | Print-out clearness | | A | A | B | A | B | C | A | B | C | A | B | C | B | B | B | B | B | C | C | D |
| | Solvent resistance | | A | A | A | A | A | A | A | A | A | A | A | A | A | A | A | A | A | A | B | A |
| | Amount of smoking | | 1 | 1 | 2 | 0 | 1 | 1 | 0 | 0 | 0 | 0 | 1 | 0 | 1 | 2 | 2 | 2 | 2 | 3 | 3 | 1 |

*Use of printing medium with transparent resin layer provided on paper sheet medium, in Examples 2-4, 2-7, 2-10 and 2-12

TABLE 2-1

| | | | Example | | | | | | | | | | | | | | | | | | |
|---|---|---|---|---|---|---|---|---|---|---|---|---|---|---|---|---|---|---|---|---|---|
| | | | 3-1 | 3-2 | 3-3 | 3-4 | 3-5 | 3-6 | 3-7 | 3-8 | 3-9 | 3-10 | 3-11 | 3-12 | 3-13 | 3-14 | 3-15 | 3-16 | 3-17 | 3-18 | 3-19 |
| Film medium | Method for adding titanium oxide | | Filling | Filling | Filling | Filling | Filling | Filling | Filling | Filling | Filling | Filling | Filling | Filling | Filling | Filling | Filling | Filling | Filling | Filling | Filling |
| | Material | | PE | PE | PE | PE | PE | PE | PP | PET | PET | PP | PP | PP | PP | PP | PP | PE | PE | PE | PE |
| | Thickness | μm | 60.2 | 60.6 | 61.0 | 63.0 | 61.2 | 62.4 | 60.1 | 60.3 | 60.3 | 60.1 | 60.1 | 60.1 | 20.0 | 200.0 | 200.0 | 60.0 | 60.0 | 20.0 | 200.0 |
| | Titanium oxide content | wt % | 0.3 | 2.5 | 5.0 | 22.1 | 40.5 | 22.1 | 20.2 | 15.2 | 5.0 | 0.5 | 5.0 | 7.5 | 7.5 | 7.5 | 7.5 | 0.5 | 7.5 | 7.5 | 7.5 |
| | Crystal system of titanium oxide | | Rutile | Rutile | Rutile | Rutile | Rutile | Anatase | Rutile | Anatase | Rutile | Rutile | Rutile | Rutile | Rutile | Rutile | Anatase | Rutile | Rutile | Rutile | Rutile |
| | Particle size of titanium oxide | μm | 0.27 | 0.27 | 0.27 | 0.27 | 0.27 | 0.27 | 0.27 | 0.22 | 0.22 | 0.27 | 0.27 | 0.27 | 0.27 | 0.27 | 0.27 | 0.27 | 0.27 | 0.27 | 0.27 |
| | Longer size of titanium oxide | μm | | | | | | | | | | | | | | | | | | | |
| | Shorter size of titanium oxide | μm | | | | | | | | | | | | | | | | | | | |
| | Aspect ratio of titanium oxide | | | | | | | | | | | | | | | | | | | | |
| | Particle shape of titanium oxide | | Irregular | Irregular | Irregular | Irregular | Irregular | Irregular | Irregular | Irregular | Irregular | Irregular | Irregular | Irregular | Irregular | Irregular | Irregular | Irregular | Irregular | Irregular | Irregular |
| Printing condition | Output | W | 5 | 5 | 5 | 5 | 5 | 5 | 5 | 5 | 5 | 5 | 5 | 5 | 5 | 5 | 5 | 5 | 5 | 5 | 5 |
| Raman spectrum | Non-printed region | Count | 102 | 673 | 1,221 | 6,055 | 12,112 | 10,221 | 6,326 | 9,648 | 1,343 | 210 | 6,326 | 1,879 | 1,879 | 1,879 | 1,993 | 223 | 1,991 | 1,788 | 1,899 |
| | Printed region | Count | 40 | 40 | 50 | 51 | 53 | 6,512 | 1,578 | 6,512 | 60 | 40 | 1,578 | 50 | 50 | 50 | 451 | 43 | 51 | 50 | 50 |
| | Printed region/Non-printed region | | 0.39 | 0.06 | 0.04 | 0.01 | 0.00 | 0.64 | 0.25 | 0.67 | 0.04 | 0.19 | 0.25 | 0.03 | 0.03 | 0.03 | 0.23 | 0.19 | 0.03 | 0.03 | 0.03 |
| Evaluation | Print-out clearness | | C | B | A | A | A | A | A | A | A | B | A | A | A | A | A | B | A | A | A |
| | Solvent resistance | | A | A | A | A | A | A | A | A | A | A | A | A | A | A | A | A | A | A | A |
| | Evaluation of reduction in strength | | 0 | 1 | 1 | 2 | 3 | 2 | 2 | 2 | 1 | 0 | 1 | 1 | 1 | 0 | 0 | 0 | 1 | 1 | 0 |

TABLE 2-2

| | | | Example | | | | | | Comparative Example | | | | | |
|---|---|---|---|---|---|---|---|---|---|---|---|---|---|---|
| | | | 3-20 | 3-21 | 3-22 | 3-23 | 3-24 | 3-25 | 3-1 | 3-2 | 3-3 | 3-4 | 3-5 | 3-6 |
| Film medium | Method for adding titanium oxide | | Filling | Filling | Filling | Filling | Filling | Filling | Filling | Filling | Filling | Filling | Ink-jet | Thermo-sensitive label |
| | Material | | PE | PE | PE | PE | PE | PE | PE | Acrylic rubber | PE | PE | | |
| | Thickness | μm | 63.0 | 63.0 | 63.0 | 63.0 | 63.0 | 63.0 | 60.1 | 2000 | 60.1 | 15 | | |
| | Titanium oxide content | wt % | 22.1 | 22.1 | 22.1 | 22.1 | 22.1 | 22.1 | 0.1 | 7.5 | 7.5 | 7.5 | | |
| | Crystal system of titanium oxide | | Rutile | Rutile | Rutile | Rutile | Rutile | Rutile | Rutile | Rutile | Rutile | Rutile | | |
| | Particle size of titanium oxide | um | 0.27 | 0.27 | 0.27 | 4.41 | | | | 0.27 | 0.27 | 0.27 | 0.27 | |
| | Longer size of titanium oxide | um | | | | | 1.72 | 10.3 | | | | | | |
| | Shorter size of titanium oxide | um | | | | | 0.12 | 0.51 | | | | | | |
| | Aspect ratio of titanium oxide | | | | | | 14.3 | 20.2 | | | | | | |
| | Particle shape of titanium oxide | | Irregular | Irregular | Irregular | Irregular | Acicular | Acicular | Irregular | Irregular | Irregular | Irregular | | |
| Printing condition | Output | W | 3 | 1 | 20 | 5 | 5 | 5 | 5 | 5 | 0.5 | 5 | | |
| Raman spectrum | Non-printed region | Count | 6,022 | 6,045 | 6,111 | 6,326 | 6,389 | 6,263 | 30 | 1,994 | 1,885 | 1,885 | 0 | 0 |
| | Printed region | Count | 1,633 | 1,352 | 1,517 | 1,334 | 1,374 | 1,347 | 0 | 40 | 1,622 | 56 | 0 | 0 |
| | Printed region/ Non-printed region | | 0.27 | 0.22 | 0.25 | 0.21 | 0.22 | 0.22 | 0.00 | 0.02 | 0.86 | 0.03 | — | — |
| Evaluation | Print-out clearness | | A | B | A | A | A | A | D | A | D | D | B | B |
| | Solvent resistance | | A | A | A | A | A | A | Un-measurable | B | A | A | B | B |
| | Evaluation of reduction in strength | | 2 | 2 | 2 | 2 | 2 | 2 | 0 | 0 | 0 | 3 | 0 | 0 |

As shown in Table 1 and Table 2, a print product excellent in print-out clearness and excellent in solvent resistance was obtained by direct printing with ultraviolet laser, onto a printing medium which comprised a sheet medium comprising a specified amount or more of titanium oxide. An image excellent in print-out clearness was obtained in Examples 1-14 and 1-15 where a transparent resin layer was provided, as compared with Example 1-2 where no transparent resin layer was provided.

When the sheet medium was paper, the length-weighted average fiber length and the average fiber width of pulp constituting the paper, and the basis weight of the paper were in respective specified ranges to thereby provide an image more excellent in print-out clearness and suppress smoking in irradiation with ultraviolet laser.

When the sheet medium was a film, the thickness of the film was in a specified range and the film was a specified resin film to thereby provide an image more excellent in print-out clearness and suppress a reduction in strength due to irradiation with ultraviolet laser.

On the other hand, when a printing medium comprising a sheet medium having a titanium oxide content of less than a specified amount was used, sufficient print-out clearness could not be obtained.

As shown in Comparative Examples 1-3, 1-4, 3-5, and 3-6, sufficient solvent resistance was not obtained in conventional ink-jet method and thermosensitive label. As further shown in Comparative Examples 2-4 to 2-6, no printing could be made by irradiation with infrared laser, green laser, and $CO_2$ laser.

Example 4 and Example 5

Materials and the like used in the following Examples were as follows.

[Substrate]

<Paper>

Paper A: Liner base paper (OFK-EM170 manufactured by Ojimateria Co., Ltd., basis weight 170 g/m², paper thickness 205 μm, brightness 15%) for cardboard Paper B: The titanium oxide content was modified so that the titanium oxide content was 3 g/m², according to the method of Example 1 of JP 2019-099923 A. The titanium oxide used was irregular rutile-type titanium oxide (particle size=0.2 μm, R780 manufactured by Ishihara Sangyo Kaisha, Ltd.). Characteristics of the resulting paper were as follows: basis weight: 80 g/m²; thickness: 120 μm; and brightness: 84.9%.

Paper C: The type and the content of titanium oxide were modified so that the titanium oxide content was 30 g/m², according to the method of Example 1 of JP 2019-099923 A. The titanium oxide used was irregular rutile-type titanium oxide (particle size=0.2 μm, R780 manufactured by Ishihara Sangyo Kaisha, Ltd.). Characteristics of the resulting paper were as follows: basis weight: 100 g/m²; thickness: 120 pin; and brightness: 84.9%.

Paper D: Liner base paper (paper A) for cardboard and core base paper (OND-EM160 manufactured by Oji-materia Co., Ltd., basis weight 160 g/m², paper thickness 210 μm) for cardboard were used to produce an A flute double-sided cardboard sheet by a corrugator comprising a corrugated roll having a height of 4.5 mm and a number of ridges of 34/30 cm. An adhesive for cardboard, used for attachment of the liner base paper and the core base paper, was starch glue of one-tank system usually used.

Paper 1: A 3% by mass suspension was produced by beating leaf bleached kraft pulp (LBKP, brightness 86.0%) so that the CSF was 400 mL. After 0.5 parts by mass of aluminum sulfate was added based on 100 parts by mass of the pulp and dilution was thus made, 0.8 parts by mass of a polyepichlorohydrin-based wet paper strengthening agent WS4024 (manufactured by Seiko PMC Corporation) was added based on 100 parts by mass of the pulp, and the resultant was formed into a sheet by a wet paper machine, thereby producing a paper substrate. Characteristics of paper 1 obtained were as follows: basis weight: 70 g/m²; thickness: 90 μm; and brightness: 86%.

Paper 2: A 3% by mass suspension was prepared by beating leaf bleached kraft pulp (LBKP, brightness 86.0%) so that CSF was 400 mL. A 3% by mass suspension was produced by beating needle bleached kraft pulp (NBKP, brightness 84.0%) so that the CSF was 700 mL.

Thereafter, LBKP and NBKP were mixed at a ratio (LBKP:NBKP) of 65:35, and a paper substrate was produced in the same manner as in paper 1. Characteristics of paper 2 obtained were as follows: basis weight: 70 g/m²; thickness: 93 μm; and brightness: 85.6%.

Paper 3: A 3% by mass suspension was prepared by beating needle kraft pulp (NBKP, brightness 84.4%) so that the CSF was 700 mL. After 0.5 parts by mass of aluminum sulfate was added based on 100 parts by mass of the pulp and dilution was thus made, 0.8 parts by mass of a polyepichlorohydrin-based wet paper strengthening agent WS4024 (manufactured by Seiko PMC Corporation) was added based on 100 parts by mass of the pulp, and the resultant was formed into a sheet by a wet paper machine, thereby producing a paper substrate. Characteristics of paper 3 obtained were as follows: basis weight: 70 g/m²; thickness: 95 μm; and brightness: 84.3%.

Paper 4: A 3% by mass suspension was prepared by beating leaf bleached kraft pulp (LBKP, brightness 86.0%) used for Paper 1 so that the CSF was 400 mL. Powder pulp was produced by mechanically pulverizing a dry sheet of LBKP (leaf bleached kraft pulp) with a cutter mill (HA8 2542 30E manufactured by Horai Co., Ltd., screen 0.24 mm). Thereafter, LBKP and the powder pulp were mixed at a ratio (LBKP:powder pulp) of 70:30 (mass ratio), and a paper substrate was produced in the same manner as in paper 1. Characteristics of paper 4 obtained were as follows: basis weight: 70 g/m²; thickness: 86 μm; and brightness: 86.1%.

Paper 5: LBKP and the powder pulp, prepared in the same manner as in paper 4, were mixed at a ratio of LBKP:powder pulp of 70:10 (mass ratio), and a paper substrate was produced in the same manner as in paper 1. Characteristics of paper 5 obtained were as follows: basis weight: 70 g/m²; thickness: 89 μm; and brightness: 85.3%.

Paper 6: A 3% by mass suspension was prepared by subjecting the leaf bleached kraft pulp (LBKP) used in paper 1, to dewatering with a pulp machine once, to thereby make paper having a sheet shape, and then beating the resultant so that the CSF was 400 mL. A paper substrate was produced in the same manner as in paper 1. Such dewatering with a pulp machine is performed with a mesh of the pulp machine, and thus the aperture size of the mesh can be selected to thereby decrease a fine fiber. Characteristics of paper 6 obtained were as follows: basis weight: 70 g/m²; thickness: 90 μm; and brightness: 85.5%.

Paper 7: A 3% by mass suspension was prepared by beating leaf unbleached kraft pulp (LUKP) so that the CSF was 400 mL. A paper substrate was produced in the same manner as in paper 1. Characteristics of paper 7 obtained were as follows: basis weight: 70 g/m²; thickness: 90 μm; and brightness: 35%.

Paper 8: A 3% by mass suspension was prepared by using hemp pulp not beaten (CSF 700 mL). A paper substrate was produced in the same manner as in paper 1. Characteristics of paper 8 obtained were as follows: basis weight: 70 g/m²; thickness: 95 μm; and brightness: 85.1%.

Paper 9: A 3% by mass suspension was prepared by using the leaf bleached kraft pulp (LBKP, brightness 86.0%) used in paper 1, and beating the pulp so that the CSF was 200 mL. A paper substrate was produced in the same manner as in paper 1. Characteristics of paper 9 obtained were as follows: basis weight: 70 g/m²; thickness: 85 μm; and brightness: 85.5%.

Examples 4-1 to 4-5 and Comparative Example 4-4

KW050 AQP67 White DM manufactured by Toyo Ink Co., Ltd. was used as a coating liquid.

The coating liquid comprised irregular titanium oxide (rutile-type, average particle size=0.2 μm (value measured with laser diffraction/scattering type particle size distribution meter)) as titanium oxide, and comprised an acrylic resin as a thermoplastic resin. The titanium oxide content and the acrylic resin content in the coating liquid were 45% by mass and 15% by mass, respectively.

A substrate shown in Table 3 was coated with the coating liquid by use of a printing tester (K-rocks proofer manufactured by RK Print Coat Instruments Ltd.) so that the titanium oxide content was a value shown in Table 3.

Example 4-6 and Comparative Example 4-1

[Preparation of Coating Liquid]
<Binder Solution>

An aqueous 10% by mass polyvinyl alcohol solution produced by loading 10 parts by mass of polyvinyl alcohol (Exceval® RS-2817SB manufactured by Kuraray Co., Ltd.) to 90 parts by mass of ion-exchange water and heating the resultant to 90° C. for dissolution was adopted as binder solution 1.

<Titanium Oxide>

The titanium oxide used was irregular rutile-type titanium oxide (particle size=0.2 μm (value measured with laser diffraction/scattering type particle size distribution meter), R780 manufactured by Ishihara Sangyo Kaisha, Ltd.).

<Preparation of Coating Liquid>

A coating liquid was produced by loading 10 parts of the titanium oxide to 90 parts of binder solution 1 described above and stirring the resultant in conditions of 1000 rpm and 5 minutes by use of a homomixer.

<Formation of Coating Layer>

A printing medium was produced in the same manner as in Example 4-1 except that paper A was used as the substrate and the amount of coating with the titanium oxide was a value described in Table 3.

Examples 4-7, and 4-12 to 4-16

<Titanium Oxide>

The titanium oxide used was irregular rutile-type titanium oxide (particle size=0.2 μm (value measured with laser diffraction/scattering type particle size distribution meter), R780 manufactured by Ishihara Sangyo Kaisha, Ltd.).

<Preparation of Coating Liquid>

A coating liquid was produced by loading 20 parts of the titanium oxide to 80 parts of binder solution 1 described above and stirring the resultant in conditions of 1000 rpm and 5 minutes by use of a homomixer.

<Formation of Coating Layer>

A printing medium was produced in the same manner as in Example 4-1 except that a paper substrate described in Table 3 was used as the substrate and the amount of coating with the titanium oxide was a value described in Table 3.

Example 4-8

<Titanium Oxide>

The titanium oxide here used was irregular anatase-type titanium oxide (average particle size=0.2 μm (value measured with laser diffraction/scattering type particle size distribution meter), A100 manufactured by Ishihara Sangyo Kaisha, Ltd.).

<Preparation of Coating Liquid>

A coating liquid was produced by loading 20 parts of the titanium oxide to 80 parts of binder solution 1 described above and stirring the resultant in conditions of 1000 rpm and 5 minutes by use of a homomixer.

<Formation of Coating Layer>

A printing medium was produced in the same manner as in Example 4-1 except that a paper substrate described in Table 3 was used as the substrate and the amount of coating with the titanium oxide was a value described in Table 3.

Examples 4-9 to 4-11

<Titanium Oxide>

The titanium oxide here used was any of the followings.

PER410 manufactured by Ishihara Sangyo Kaisha, Ltd.: average particle size 4.3 μm (value measured with laser diffraction/scattering type particle size distribution meter), irregular (Example 4-9)

FTL100 manufactured by Ishihara Sangyo Kaisha, Ltd.: average longer size=1.7 μm, average shorter size=0.1 μm, acicular (Example 4-10)

FTL400 manufactured by Ishihara Sangyo Kaisha, Ltd.: average longer size=10.0 μm, average shorter size=0.5 μm, acicular (Example 4-11)

<Preparation of Coating Liquid>

A coating liquid was produced by loading 20 parts of the titanium oxide to 80 parts of binder solution 1 described above and stirring the resultant in conditions of 1000 rpm and 5 minutes by use of a homomixer.

<Formation of Coating Layer>

A printing medium was produced in the same manner as in Example 4-1 except that a paper substrate described in Table 3 was used as the substrate and the amount of coating with the titanium oxide was a value described in Table 3.

Example 4-17

<Titanium Oxide>

The titanium oxide used was irregular rutile-type titanium oxide (particle size=0.2 μm (value measured with laser diffraction/scattering type particle size distribution meter), R780 manufactured by Ishihara Sangyo Kaisha, Ltd.).

<Preparation of Coating Liquid>

A coating liquid was produced by loading 20 parts of the titanium oxide to 80 parts of binder solution 1 described above and stirring the resultant in conditions of 1000 rpm and 5 minutes by use of a homomixer.

<Formation of Coating Layer>

A printing medium was produced in the same manner as in Example 4-1 except that a paper substrate described in Table 3 was used as the substrate and the amount of coating with the titanium oxide was a value described in Table 3.

<Production of Transparent Resin Layer>

A solution of a pressure-sensitive adhesive in toluene was obtained by dissolving 100 parts by mass of a styrene-based block copolymer (styrene-hydrogenated isoprene-styrene triblock copolymer) (Septon 2063 manufactured by Kuraray Co., Ltd.), 70 parts by mass of a styrene-based tackifier (FTR8100 manufactured by Mitsui Chemicals, Inc.), and 50 parts by mass of paraffinic oil (Diana Process Oil PW-90 manufactured by Idemitsu Kosan Co., Ltd.) in toluene, and stirring them until a uniform solution was obtained. Thereafter, a biaxially oriented polypropylene film (FOA manufactured by Futamura Chemical Co., Ltd.) having a thickness of 30 μm was coated by a knife coater so that the film thickness after drying was 30 μm, and thereafter a pressure-sensitive film obtained by drying toluene as the solvent in conditions of 100° C. and 3 minutes was pasted onto a sheet made of paper, thereby providing a paper sheet medium.

The sheet made of paper was removed, and the total light transmittance of the transparent resin layer was measured according to JIS K 7361-1:1997 and thus was 80% or more.

Example 4-181

<Titanium Oxide>

The titanium oxide used was irregular rutile-type titanium oxide (particle size=0.2 μm (value measured with laser diffraction/scattering type particle size distribution meter), R780 manufactured by Ishihara Sangyo Kaisha, Ltd.).

<Preparation of Coating Liquid>

A coating liquid was produced by loading 20 parts of the titanium oxide to 80 parts of binder solution 1 described above and stirring the resultant in conditions of 1000 rpm and 5 minutes by use of a homomixer.

<Formation of Coating Layer>

A printing medium was produced in the same manner as in Example 4-1 except that a film described in Table 3 was used as the substrate and the amount of coating with the titanium oxide was a value described in Table 3.

<Formation of Coating Layer>

A polyethylene pellet (Novatec® LC522 manufactured by Japan Polyethylene Corporation) was loaded into a twin-screw extruder (HMT100 manufactured by Hitachi Zosen Corporation), and molten at 320° C. Thereafter, a resin was molten and stacked on the sheet made of paper subjected to corona treatment so that the thickness of the resin was 20 μm, thereafter the resultant was rapidly quenched with being sandwiched by a cooling roll at a temperature regulated at 20° C., and thus a sheet medium-stacked article comprising a laminate layer was obtained.

The sheet made of paper was removed, and the total light transmittance of the transparent resin layer was measured according to JIS K 7361-1:1997 and thus was 80% or more.

Comparative Example 4-2

A printed region was imparted to paper for printing (KB39-7 manufactured by Kokuyo Co., Ltd.) by use of a handy ink-jet printer (MOBILEJET MINI manufactured by Yamazaki & Co., Ltd.). The ink-jet ink here used was an ink for a water-absorbing material, manufactured by Yamazaki & Co., Ltd.

Comparative Example 4-3

A printed region was imparted to a thermal label (L'esprit, Universal thermal label, manufactured by Sato Holdings Corporation) by a thermal printer (L'esprit T8 manufactured by Sato Holdings Corporation).

Examples 5-1 to 5-15 and Comparative Examples 5-1 to 5-5

(Production of Coating Liquid)

The titanium oxide here used was R780 manufactured by Ishihara Sangyo Kaisha, Ltd. (particle size 0.2 μm).

The thermoplastic resin here used was an ethylene-acrylic binder (MP498345N manufactured by Michelman Japan LLC, solid content concentration 50%).

<Production of Coating Liquid 1>

Coating liquid 1 was prepared by mixing 100 parts by mass of the titanium oxide and 200 parts by mass of the ethylene-acrylic binder (solid content concentration 50%) and diluting the mixture with water so that the viscosity of the coating liquid was 20 seconds as measured with Zahn cup No. 3.

<Production of Coating Liquid 2>

Coating liquid 2 was prepared by mixing 100 parts by mass of the titanium oxide and 2300 parts by mass of the ethylene-acrylic binder (solid content concentration 50%) and diluting the mixture with water so that the viscosity of the coating liquid was 20 seconds as measured with Zahn cup No. 3.

<Production of Coating Liquid 3>

Coating liquid 3 was prepared by mixing 100 parts by mass of the titanium oxide and 467 parts by mass of the ethylene-acrylic binder (solid content concentration 50%) and diluting the mixture with water so that the viscosity of the coating liquid was 20 seconds as measured with Zahn cup No. 3.

<Production of Coating Liquid 4>

Coating liquid 4 was prepared by mixing 100 parts by mass of the titanium oxide and 300 parts by mass of the ethylene-acrylic binder (solid content concentration 50%) and diluting the mixture with water so that the viscosity of the coating liquid was 20 seconds as measured with Zahn cup No. 3.

<Production of Coating Liquid 5>

Coating liquid 5 was prepared by mixing 100 parts by mass of the titanium oxide and 133 parts by mass of the ethylene-acrylic binder (solid content concentration 50%) and diluting the mixture with water so that the viscosity of the coating liquid was 20 seconds as measured with Zahn cup No. 3.

<Production of Coating Liquid 6>

Coating liquid 6 was prepared by mixing 100 parts by mass of the titanium oxide and 50 parts by mass of the ethylene-acrylic binder (solid content concentration 50%) and diluting the mixture with water so that the viscosity of the coating liquid was 20 seconds as measured with Zahn cup No. 3.

(Production of Recording Medium)

A coating layer was produced by using a paper substrate described in Table 3, as the paper substrate, and using a coating liquid described in Table 3 so that the amount of coating was as described in Table 3.

In Example 5-10, a transparent resin layer was provided as follows, after formation of the coating layer.

A polyethylene pellet (Novatec® LC522 manufactured by Japan Polyethylene Corporation) was loaded into a single-screw extruder (50C150 manufactured by Toyo Seiki Sei-saku-sho, Ltd.), and molten at 320° C. Thereafter, a resin was molten and stacked on the coating layer subjected to corona treatment so that the thickness of resin was 20 μm, thereafter the resultant was rapidly quenched with being sandwiched by a cooling roll at a temperature regulated at 20° C., and thus a recording medium comprising a laminate layer was obtained.

The paper substrate was removed, and the total light transmittance of the transparent resin layer was measured according to JIS K 7361-1:1997 and thus was 80% or more.

In Example 5-11, a transparent resin layer was provided as follows, after formation of the coating layer.

The coating layer of the sheet made of paper was coated with an ethylene-acrylic binder (ethylene-acrylic acid copolymer ionomer, MP498345N.S manufactured by Michelman, Inc., solid content 50% by mass) by use of a gravure coater so that the thickness of the resin was 10 μm.

Comparative Example 5-6

In Comparative Example 5-6, a recording medium was produced by forming a laminate layer comprising titanium oxide, on the paper substrate.

The following materials were used.

Polyethylene (PE): Novatec® LC522 (manufactured by Japan Polyethylene Corporation)

Titanium oxide: particle size=0.2 μm, R780 manufactured by Ishihara Sangyo Kaisha, Ltd.

The method for stacking the paper substrate and the laminate layer was as follows.

<Method for Producing Masterbatch>

A masterbatch was produced by the following procedure according to JP 2015-96568 A.

A masterbatch was obtained by mixing 60 parts of the resin and 40 parts of the titanium oxide by a tumbler mixer (TM-65S manufactured by Eishin Co., Ltd.) in conditions of 45 rpm and 1 hour, melting and kneading the mixture by a twin-screw extruder (TEX30XCT manufactured by Japan Steel Works, Ltd., L/D=42) in conditions of a speed of screw rotation of 250 rpm and a cylinder temperature of 280° C., extruding the mixture to thereby provide a strand, and cooling the strand in a water tank and then forming the strand into a pellet having a column shape having an average axis size of 2.0 mm and an average axis length of 3.0 mm by use of a pelletizer.

<Stacking Method>

The masterbatch and the resin were loaded into a single-screw extruder (50C150 manufactured by Toyo Seiki Sei-saku-sho, Ltd.) so that 0.3% by mass of the titanium oxide was achieved, and molten at 320° C. and stacked on paper 1 subjected to corona treatment so that the thickness of the resin was as described in Tables, thereafter the resultant was rapidly quenched with being sandwiched by a cooling roll at a temperature regulated at 20° C., and thus a recording medium comprising a laminate layer was obtained.

Comparative Example 5-71

The recording medium used in Example 5-2 was used and an infrared laser (MD-F3200 manufactured by Keyence Corporation) was used, to perform 10-mm square marking. Irradiation conditions were as follows.

Wavelength: 1090 nm
Repeat frequency: 60 kHz
Spot size=40 μm
Scanning speed: 2000 mm/sec
Focal distance: 300 mm (focusing was performed by use of a height correction tool attached to the apparatus)
Line pitch: 200 μm
Output: 3 W
As a result, printing-out could not be performed.

Comparative Example 5-8

The paper sheet medium used in Example 5-2 was used and a green laser (MD-59910A manufactured by Keyence Corporation) was used, to perform 10-mm square marking. Irradiation conditions were as follows.

Wavelength: 532 nm
Repeat frequency: 60 kHz
Spot size=40 μm
Scanning speed: 2000 mm/sec
Focal distance: 300 mm (focusing was performed by use of a height correction tool attached to the apparatus)
Line pitch: 200 μm
Output: 3 W
As a result, printing-out could not be performed.

Comparative Example 5-9

The paper sheet medium used in Example 5-2 was used and a $CO_2$ laser (ML-Z9610 manufactured by Keyence Corporation) was used, to perform 10-mm square marking. Irradiation conditions were as follows.

Wavelength: 10600 nm
Spot size=40 μm
Scanning speed: 2000 mm/sec
Focal distance: 300 mm (focusing was performed by use of a height correction tool attached to the apparatus)
Line pitch: 200 μm
Output: 3 W
As a result, printing-out could not be performed.

[Conditions-1 of Irradiation with Ultraviolet Laser]

In each of Example 4, and Comparative Examples 4-1 and 4-2, an ultraviolet laser (AVIA266-3000 manufactured by Coherent Inc.) was used to apply printing of a bar code illustrated in FIGS. 1 and 10-mm square marking onto the resulting sheet medium. Irradiation conditions were as follows.

Wavelength: 355 nm
Repeat frequency: 50 kHz
Pulse width: 25 ns
Spot size: 104 μm
Scanning speed: 4000 mm/sec
Focal distance: 250 mm
Line pitch: 150 μm
The output was a value shown in Table 3.

[Conditions-2 of Irradiation with Ultraviolet Laser]

In Example 5 and Comparative Example 5, an ultraviolet laser (MD-U1020C manufactured by Keyence Corporation) was used to apply printing of a bar code illustrated in FIGS. 1 and 10-mm square marking onto the resulting recording medium. Irradiation conditions were as follows.

Wavelength: 355 nm
Repeat frequency: 40 kHz
Spot size=40 μm

Scanning speed: 3000 mm/sec
Focal distance: 300 mm (focusing was performed by use of a height correction tool attached to the apparatus)
Line pitch: 40 μm
The output was a value shown in Table 3.

[Measurement/Evaluation]

Characteristics of the pulp used were measured as follows.

[CSF]

The Canadian standard freeness (CSF) was measured according to JIS P 8121-2:2012.

[Brightness]

The brightness of the pulp used was measured according to JIS P 8212:1998.

The resulting recording medium (printing medium) or print product was subjected to the following evaluations.

[Measurement of Length-Weighted Average Fiber Length, Average Fiber Width, and Number-Based Proportion of Fine Fiber]

Each of the printing media obtained in Examples and Comparative Examples was cut out to a 40-cm square, and the resultant was immersed in ion-exchange water, subjected to adjustment to a concentration of 2%, and then immersed for 24 hours. After immersion for 24 hours, a standard defibrator (manufactured by Kumagai Riki Kogyo Co., Ltd.) was used for treatment until any undefibrated fiber disappeared, and thus the pulp was defibrated to provide a fiber. When a transparent resin layer was comprised, a slurry (pulp fiber dispersion) after removal of the transparent resin layer and defibration was separately taken, and a fiber length measurement machine (Model FS-5 provided with UHD base unit, manufactured by Valmet K.K.) was used to measure "length-weighted average fiber length (ISO)," "number-based proportion of a fine fiber," and "average fiber width."

The "length-weighted average fiber length (ISO)" is the length-weighted average fiber length obtained by selection of a fiber of 0.2 mm or more and 7.6 mm or less and calculation.

The "number-based proportion of a fine fiber" is the number-based proportion of a fine fiber having a fiber width of 75 μm or less and a length of 0.08 mm or more and 0.20 mm or less in a pulp fiber defibrated.

The "average fiber width" is the length-weighted average fiber width obtained by selection of a fiber having a width of 10 μm or more and 75 μm or less and calculation.

When only a small amount of the paper sheet medium can be ensured, a manual defibrator (Dasher, manufactured by Valmet K.K.) for paper sheet medium treatment with piston movement may be used to defibrate the pulp and thus provide a fiber. Such piston movement was continued until any undefibrated fiber disappeared, and if complete defibration was not made, such piston movement was performed for an upper limit of 10,000 times and thereafter the resulting pulp slurry was subjected to measurement.

[Basis Weight and Paper Thickness]

The basis weight of each of the paper substrates used in Examples and Comparative Examples was measured according to JIS P 8124:2011. The thickness of each of the paper sheet media in Examples and Comparative Examples was measured according to JIS P 8118:2014.

The resulting print product was subjected to the following evaluations. The results are shown in Table 3.

[Raman Spectrum-1]

Each of Raman spectra with respect to Example 4, and Comparative Examples 4-1 and 4-4 was measured by the following method. A Raman spectrum of the print product where bar code printing was applied was measured.

<Measurement Conditions>

While Raman spectrum measurement conditions are as follows, the following measurement conditions, for example, the laser output and the irradiation time can be appropriately modified, for example, when any damage by the laser used for the measurement is found in the print product and/or when fluorescence is intense. It is noted that the Raman intensities of the printed region and the non-printed region, here adopted, are the numerical values measured under the same conditions.

Apparatus: inVia Raman microscope QUONTOR manufactured by Renishaw plc.

Excitation laser: 532 nm

Laser power: 50 mW (at an output of 100%)

Laser output: 5%

Measurement mode: confocal mode

Irradiation time: 2.0 sec

Cumulated number: 10

Laser spot size: 2.5 μm

Objective lens: 20×

<Measurement Method>

Measurement was performed by the following method.

(1) A reference specimen (monocrystalline silicon, manufactured by Renishaw plc.) was used to perform calibration of the Raman shift position (monocrystalline silicon, 520.5 $cm^{-1}$).

(2) A sheet-like sample was installed on a stage. A holding member was, if necessary, installed so that such a sheet was kept as a flat surface.

Figure 3:
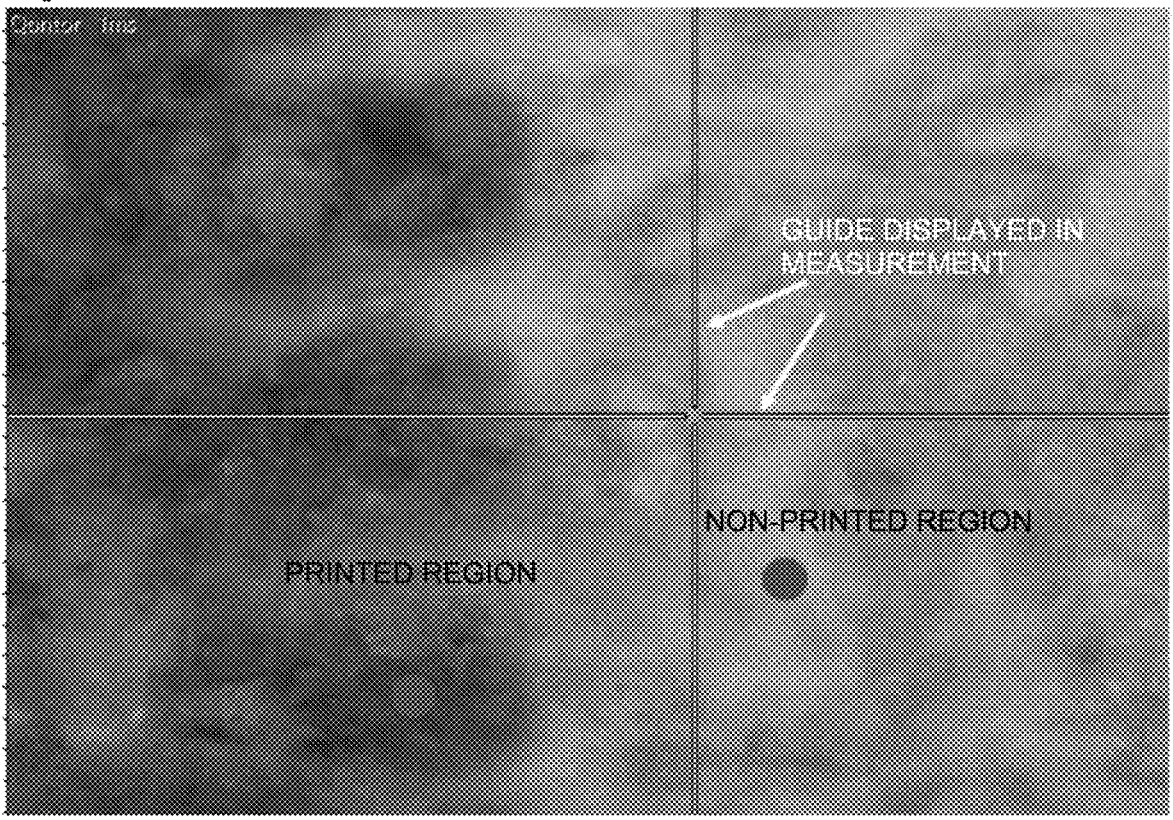
FIG. 3 is an explanatory diagram illustrating one example of Raman intensity measurement of a second print product.

(3) Focusing was performed in the apparatus as illustrated in FIG. 3 and observation (set by a simulated laser so that the smallest focus was achieved) was performed. The printed region was observed so that a visually confirmable blackest position was at the center of a guide displayed in measurement. The non-printed region was observed with being apart by a distance of 300 μm or more from the printed region.

(4) The resulting Raman spectrum was subjected to baseline correction (intelligent correction) with processing software (Wire5.2 manufactured by Renishaw plc.) attached to the apparatus. The baseline was corrected according to polynomial expression 11 of the processing software.

(5) The respective maximum values (maximum intensities) were read in the wavenumber ranges of $447\pm3$ $cm^{-1}$ and $516\pm3$ $cm^{-1}$ in the cases of rutile-type titanium oxide and anatase-type titanium oxide, and the Raman intensity ratio was calculated according to the following expression.

Raman intensity ratio=Maximum intensity in printed region/Maximum intensity in non-printed region (6) Measurement was made at 10 positions in each of the printed region (print-out portion) and the non-printed region (non-print-out portion), and the respective average values were adopted as the measurement results.

[Raman Spectrum-2]

Each of Raman spectra with respect to Example 5 and Comparative Example 5 was measured by the following method.

<Measurement Conditions and Measurement Method>

While Raman spectrum measurement conditions and measurement method are as follows, the following measurement conditions, for example, the laser output and the irradiation time can be appropriately modified, for example, when any damage by the laser used for the measurement is found in the print product and/or when fluorescence is intense. It is noted that the Raman intensities of the printed region and the non-printed region, here adopted, are the numerical values measured under the same conditions.

The number of counts of the Raman intensity in the printed region is preferably in the range of 10,000 or less from the viewpoint of suppression of the variation in measurement value. Accordingly, measurement conditions were appropriately modified so that the number of counts of the Raman intensity in the printed region was in the range of 10,000 or less. Measurement was performed in the following measurement conditions ten times, any numerical value falling out of the average value±2 SD (standard deviation) was excluded, and then the average was again determined and defined as the average value of the Raman intensity.

[Print-Out Clearness]

The print-out clearness of the resulting print product (bar code printing) was evaluated according to the following evaluation criteria.

The color close to that of the print-out was visually selected from the Munsell table (Color Scale manufactured by Japan Color Enterprise Co., Ltd.), and the clearness was evaluated according to the following criteria.

A: a color value in the Munsell table (achromatic color), of 4 or less

B: a color value in the Munsell table (achromatic color), of 5 to 6

C: a color value in the Munsell table (achromatic color), of 7 to 8

D: a color value in the Munsell table (achromatic color), of 9 or more

[Solvent Resistance]

The solvent resistance of the resulting print product was evaluated according to the following evaluation criteria.

The print-out product was immersed in 100% acetone (manufactured by Kanto Chemical Co., Inc.), and left to still stand for 15 minutes. Thereafter, the print-out product was taken out, the solvent was wiped off by tissue paper, and the solvent resistance was visually evaluated according to the following evaluation criteria.

A: scratch and loss of the print-out not found (no change) after immersion as compared with before immersion.

B: scratch and loss of the print-out found after immersion as compared with before immersion.

[Variation in Print-Out]

Each 10-mm square where printing was applied, in Examples and Comparative Examples, was used, and the variation in print-out was visually evaluated according to the following evaluation criteria.

A: the variation in print-out at zero positions

B: the variation in print-out at 1 position or more and 3 positions or less

C: the variation in print-out at 4 positions or more and 5 positions or less

D: the variation in print-out at 6 positions or more and 10 positions or less

E: the variation in print-out at 11 positions or more

[Amount of Smoking]

The amount of smoking in 10-mm square marking by irradiation with ultraviolet laser was evaluated by the following method.

<Determination Criteria>

0: no visually confirmable smoking

1: slightly visually confirmable smoking, but a very small amount of smoking

2: visually confirmable smoking, but a small amount of smoking

3: easily visually confirmable smoking, and a large amount of smoking

[Titanium Oxide Content in Coating Layer]

1. Case of Non-Printable Region Included in Printing Medium

<Production of Test Piece>

The printable region and the non-printable region (region with no coating layer provided) of the printing medium were each cut out to a proper size to provide a sample (test piece), and the area cut out was recorded.

<Dissolution of Test Piece>

A mixed solvent of nitric acid and hydrofluoric acid at 50:5 (% by volume) and the test piece were loaded into a Teflon® container of an autoclave apparatus (MARS5 manufactured by CEM Japan), and treated with the autoclave at 210° C. for 120 minutes, thereby dissolving the test piece. The area of the test piece may be appropriately modified, and if the test piece remains without being dissolved, the ratio between nitric acid and hydrofluoric acid, the treatment temperature, the treatment time, and the like may be appropriately modified.

After the test piece was dissolved, the volume was precisely made constant with ultrapure water.

<Measurement of Amount of Titanium Oxide in Dissolution Liquid>

(1) The ICP Apparatus and Measurement Conditions were as Follows.

ICP Apparatus: ICP-OEC apparatus (CIROS1-20 manufactured by Rigaku Corporation)

Measurement Conditions:

Carrier gas: argon gas

Flow rate of argon gas 0.9 L/min

Flow rate of plasma gas 14 L/min

Plasma output 1400 W

Speed of rotation of pump: 2

Measurement wavelength (Ti): 334.941 nm (2) Preparation of Calibration Curve

A universal mixed standard liquid (XSTC-622B manufactured by SPEX) was precisely weighed so that the following concentrations were each achieved, and subjected to measurement in the measurement conditions to thereby measure the strength at 334.941 nm corresponding to the emission wavelength of a titanium atom.

Concentrations for calibration curve preparation: 0 ppm, 0.01 ppm, 0.05 ppm, 0.1 ppm, 0.5 ppm, 1.0 ppm, 3.0 ppm, 5.0 ppm (3) Measurement of Titanium Oxide Content in Dissolution Liquid The solution in which the test piece was dissolved was diluted with ultrapure water so as to meet the calibration curve, and subjected to ICP measurement.

(4) Method for Calculating Titanium Oxide Content

The titanium oxide content was calculated by the following expression. Here, the Molecular weight of titanium oxide/Molecular weight of titanium almost equals to 1.669.

Titanium oxide content (g/m$^2$)=Concentration (ppm) in ICP measurement×Dilution factor×Constant volume (L)×1.669×1000/Area (m$^2$)

The titanium oxide content in the coating layer was determined by subtracting the titanium oxide content in the non-printable region from the titanium oxide content in the printable region.

2. Case of No Non-Printable Region Included in Printing Medium

<Production of Test Piece>

Two recording media were each cut out to a proper size, and the area cut out was recorded.

Only a coating layer was ground and removed from one of test pieces cut out, by use of a grinding apparatus (manufactured by Sagawa Manufacturing, Inc., grind stone dimension φ50.8×12.7 mm), and was adopted as a reference sample.

A cross section was appropriately observed with an electron microscope so that such grinding and removing were not so excessive.

<Subsequent Treatment>

The treatment was the same as in 1., and the difference in titanium oxide content between two was defined as the titanium oxide content in the coating layer.

[Particle Size of Titanium Oxide]

The particle size of the titanium oxide comprised in the coating layer was calculated from a SEM image of ash obtained by burning of the recording medium or the print product in a muffle furnace, the image being obtained with a scanning-type electron microscope (SEM, S5200 or the like manufactured by Hitachi High-Tech Corporation).

Specifically, ash was obtained in the same conditions as in the measurement in [Titanium oxide content] described above when the substrate comprised no titanium oxide.

An ash sample to be tested with a scanning-type electron microscope was produced by obtaining a 0.01% by mass slurry due to dispersion in ion-exchange water by an ultrasonic homogenizer (LUH150 or the like manufactured by Yamato Scientific Co., Ltd.) having an output of 50 W over 5 minutes, and then casting 0.1 mL of the slurry on an aluminum dish and drying it at 60° C. Adjacent particles clearly distinguishable from each other were visually selected, and the longer size of one particle was defined as the particle size. When a primary particle and a secondary particle in an aggregated state were here clearly distinguishable from each other even if present in a mixed manner, such each particle was counted as one particle and the average size in 100 of such particles randomly selected was defined as the particle size. The magnification in SEM image observation was appropriately selected depending on the particle size of the titanium oxide, and was set to about 20000 times. When any particle other than the titanium oxide was comprised, a particle comprising a titanium element was subjected to measurement with an energy dispersive X-ray analyzer (EMAX or the like manufactured by Horiba Ltd.) attached to SEM.

In an acicular case, the average size of the shorter sizes of 100 of such particles subjected to longer size measurement was defined as the shorter size.

When the substrate was paper comprising the titanium oxide, the coating layer was transferred to the titanium oxide and a transparent pressure-sensitive adhesive tape (309SN manufactured by 3M Company) having no inorganic pigment, and thus such an ash sample was produced. Specifically, a tape press-bonding roller (No349 or the like manufactured by Yasuda Seiki Seisakusho, Ltd.) having a roller mass of 2 kg was used to attach the pressure-sensitive adhesive tape to an upper layer of the coating layer. Thereafter, such a pressure-sensitive adhesive tape comprising the coating layer was immersed in a copper ethylenediamine solution (manufactured by Merck Millipore Corporation) for cellulose viscosity measurement, for 24 hours, and then well washed with ion-exchange water. The moisture on the resulting pressure-sensitive adhesive tape comprising the coating layer was wiped off, and the tape was dried with a drying machine at 60° C. for 1 hour. Thereafter, ash for use in particle size measurement was produced by burning with a muffle furnace at 525° C., and the longer size and the shorter size were measured according to the same method as described above.

When the substrate was a film comprising the titanium oxide, the coating layer was transferred to a transparent pressure-sensitive adhesive tape (309SN manufactured by 3M Company) having no titanium oxide, and thus such an ash sample was produced. Specifically, a tape press-bonding roller (No349 or the like manufactured by Yasuda Seiki Seisakusho, Ltd.) having a roller mass of 2 kg was used to attach the pressure-sensitive adhesive tape to an upper layer of the coating layer, and the pressure-sensitive adhesive tape attached was released from the film to thereby transfer the coating layer. Thereafter, ash for use in particle size measurement was produced by burning with a muffle furnace at 525° C., and the longer size and the shorter size were measured according to the same method as described above.

[Thickness of Coating Layer]

The thickness of the coating layer was measured from image data obtained with a scanning-type electron microscope.

(1) Production of Measurement Sample

A sample was embedded in a photo-curable resin (D-800 manufactured by Toagosei Co., Ltd.), and a cross section of the printing medium was exposed by an ultramicrotome. Grinding was performed at ordinary temperature by use of a diamond knife.

The cross section ground was subjected to gold deposition at a thickness of about 20 nm, and subjected to measurement with a scanning-type electron microscope.

(2) Measurement Apparatus/Conditions

Measurement apparatus: S-3600 (manufactured by Hitachi High-Technologies Corporation)

Measurement conditions: magnification of 2000×, The type of the scanning-type electron microscope was not limited to the above, and an apparatus displaying the scale bar was used.

(3) Measurement Method

An energy dispersive X-ray spectroscopy apparatus attached to the scanning-type electron microscope was used to confirm a titanium element comprised, from the coating layer observed, and then acquire image data at a magnification of 2000×. After the resulting image data was printed onto paper for printing, the thickness of the coating layer as an object (the length between boundaries with other layers) was measured by a scale, and the actual thickness of the coating layer as compared with the scale bar was measured. Each image data was acquired at five positions randomly selected in one measurement sample, the thickness at a position where the coating layer was the thickest and that at a position where the coating layer was the thinnest were measured in the image data at one position, and the average of ten positions in total was defined as the thickness of the coating layer.

TABLE 3-1

| | | Example | | | | | | | | | | |
|---|---|---|---|---|---|---|---|---|---|---|---|---|
| | | 4-1 | 4-2 | 4-3 | 4-4 | 4-5 | 4-6 | 4-7 | 4-8 | 4-9 | 4-10 | 4-11 |
| Method for adding titanium oxide | | Coating | Coating | Coating | Coating | Coating | Coating | Coating | Coating | Coating | Coating | Coating |
| Paper substrate | Type | Paper A | Paper A | Paper A | Paper A | Paper A | Paper A | Paper A | Paper A | Paper A | Paper A | Paper A |
| Length-weighted average fiber length | mm | 1.20 | 1.20 | 1.20 | 1.20 | 1.20 | 1.20 | 1.20 | 1.20 | 1.20 | 1.20 | 1.20 |
| Average fiber width | μm | 20.3 | 20.3 | 20.3 | 20.3 | 20.3 | 20.3 | 20.3 | 20.3 | 20.3 | 20.3 | 20.3 |
| Number-based proportion of fine fiber | % | 10.2 | 10.2 | 10.2 | 10.2 | 10.2 | 10.2 | 10.2 | 10.2 | 10.2 | 10.2 | 10.2 |
| Titanium oxide (A) in coating layer | g/m² | 3.2 | 6.3 | 9.5 | 12.6 | 22.5 | 0.7 | 1.4 | 1.4 | 1.4 | 1.4 | 1.4 |
| Thickness (B) of coating layer | μm | 1.7 | 3.4 | 5.0 | 7.0 | 14.0 | 0.5 | 1.0 | 1.0 | 1.0 | 1.0 | 1.0 |
| A/B | | 1.88 | 1.85 | 1.90 | 1.80 | 1.61 | 1.40 | 1.40 | 1.40 | 1.40 | 1.40 | 1.40 |
| Concentration of titanium oxide (in solid content) | % by mass | 75% | 75% | 75% | 75% | 75% | 53% | 71% | 71% | 71% | 71% | 71% |
| Titanium oxide in substrate | g/m² | 0.0 | 0.0 | 0.0 | 0.0 | 0.0 | 0.0 | 0.0 | 0.0 | 0.0 | 0.0 | 0.0 |
| Total titanium oxide | g/m² | 3.2 | 6.3 | 9.5 | 12.6 | 22.5 | 0.7 | 1.4 | 1.4 | 1.4 | 1.4 | 1.4 |
| Crystal system of titanium oxide | | Rutile | Rutile | Rutile | Rutile | Rutile | Rutile | Rutile | Anatase | Rutile | Rutile | Rutile |
| Particle size of titanium oxide | μm | 0.27 | 0.27 | 0.27 | 0.27 | 0.27 | 0.27 | 0.27 | 0.22 | 4.41 | | |
| Longer size of titanium oxide | μm | | | | | | | | | | 1.72 | 10.3 |
| Shorter size of titanium oxide | μm | | | | | | | | | | 0.12 | 0.51 |
| Aspect ratio of titanium oxide | — | | | | | | | | | | 14.3 | 20.2 |
| Particle shape of titanium oxide | — | Irregular | Irregular | Irregular | Irregular | Irregular | Irregular | Irregular | Irregular | Irregular | Acicular | Acicular |
| Thermoplastic resin | — | Acrylic | Acrylic | Acrylic | Acrylic | Acrylic | PVA | PVA | PVA | PVA | PVA | PVA |
| Printing-out condition Output | W | 5 | 5 | 5 | 5 | 5 | 5 | 5 | 5 | 5 | 5 | 5 |
| Raman spectrum Non-printed region | Count | 81,997 | 104,550 | 214,710 | 354,623 | 343,621 | 7,399 | 28,248 | 31,221 | 29,242 | 29,121 | 28,736 |
| Printed region | Count | 9,463 | 20,827 | 55,960 | 137,712 | 271,941 | 332 | 721 | 865 | 643 | 743 | 598 |
| Printed region/Non-printed region | | 0.12 | 0.20 | 0.26 | 0.39 | 0.42 | 0.04 | 0.03 | 0.03 | 0.02 | 0.03 | 0.02 |

TABLE 3-1-continued

| | | Example | | | | | | | | | | |
|---|---|---|---|---|---|---|---|---|---|---|---|---|
| | | 4-1 | 4-2 | 4-3 | 4-4 | 4-5 | 4-6 | 4-7 | 4-8 | 4-9 | 4-10 | 4-11 |
| Evaluation | Print-out clearness | A | A | A | A | A | C | B | B | A | A | A |
| | Solvent resistance | A | A | A | A | A | A | A | A | A | A | A |
| | Variation in print-out (visually observed) | D | D | D | D | D | D | D | D | D | D | D |
| | Amount of smoking | 2 | 2 | 2 | 2 | 2 | 2 | 2 | 2 | 2 | 2 | 2 |

TABLE 3-2

| | | Example | | | | | | | Comparative Example | | | |
|---|---|---|---|---|---|---|---|---|---|---|---|---|
| | | 4-12 | 4-13 | 4-14 | 4-15 | 4-16 | 4-17* | 4-18* | 4-1 | 4-4 | 4-2 | 4-3 |
| Method for adding titanium oxide | | Coating | Coating | Coating | Coating | Coating | Coating | Coating | Coating | Coating | Ink-jet | Thermo-sensitive label |
| Paper substrate | Type | Paper A | Paper A | Paper B | Paper C | Paper D | Paper A | Paper A | Paper A | Paper A | | |
| Length-weighted average fiber length | mm | 1.20 | 1.20 | 0.67 | 0.67 | 1.12 | 1.20 | 1.20 | 1.20 | 1.20 | | |
| Average fiber width | μm | 20.3 | 20.3 | 16.5 | 16.5 | 19.8 | 20.3 | 20.3 | 20.3 | 20.3 | | |
| Number-based proportion of fine fiber | % | 10.2 | 10.2 | 6.1 | 6.1 | 12.0 | 10.2 | 10.2 | 10.2 | 10.2 | | |
| Titanium oxide (A) in coating layer | g/m$^2$ | 12.6 | 12.6 | 1.4 | 1.4 | 1.4 | 0.7 | 0.7 | 0.5 | 12.6 | | |
| Thickness (B) of coating layer | μm | 7.0 | 7.0 | 1.0 | 1.0 | 1.0 | 0.5 | 0.5 | 0.4 | 7.0 | | |
| A/B | | 1.8 | 1.8 | 1.4 | 1.4 | 1.4 | 1.4 | 1.4 | 1.25 | 1.8 | | |
| Concentration of titanium oxide (in solid content) | % by mass | 71% | 71% | 71% | 71% | 71% | 71% | 71% | 53% | 75% | | |
| Titanium oxide in substrate | g/m$^2$ | 0.0 | 0.0 | 3.0 | 30.0 | 0.0 | 0.0 | 0.0 | 0 | 0.0 | | |
| Total titanium oxide | g/m$^2$ | 12.6 | 12.6 | 4.4 | 31.4 | 1.4 | 0.7 | 0.7 | 0.5 | 12.6 | | |
| Crystal system of titanium oxide | | Rutile | Rutile | Rutile | Rutile | Rutile | Rutile | Rutile | Rutile | Rutile | | |
| Particle size of titanium oxide | μm | 0.27 | 0.27 | 0.27 | 0.27 | | 0.27 | 0.27 | 0.27 | 0.27 | | |
| Longer size of titanium oxide | μm | | | | | 10.3 | | | | | | |
| Shorter size of titanium oxide | μm | | | | | 0.51 | | | | | | |
| Aspect ratio of titanium oxide | — | | | | | 20.1961 | | | | | | |
| Particle shape of titanium oxide | — | Irregular | Irregular | Irregular | Irregular | Acicular | Irregular | Irregular | Irregular | Irregular | | |
| Thermoplastic resin | — | PVA | PVA | PVA | PVA | PVA | PVA | PVA | PVA | Acrylic | | |
| Printing-out condition | Output W | 1 | 20 | 5 | 5 | 5 | 5 | 5 | 5 | 0.5 | | |
| Raman spectrum | Non-printed region Count | 374,322 | 382,621 | 33,048 | 76,065 | 27,736 | 7,383 | 7,112 | 5,021 | 81,334 | 0 | 0 |
| | Printed region Count | 251,532 | 95,719 | 1,201 | 7,321 | 688 | 341 | 311 | 42 | 73,201 | 0 | 0 |
| | Printed region/Non-printed region | 0.67 | 0.25 | 0.04 | 0.10 | 0.02 | 0.05 | 0.04 | 86.00 | 0.90 | — | — |
| Evaluation | Print-out clearness | C | A | A | A | A | A | A | D | D | A | A |
| | Solvent resistance | A | A | A | A | A | A | A | Unevaluable | A | B | B |
| | Variation in print-out (visually observed) | A | D | D | D | D | D | D | D | D | D | D |
| | Amount of smoking | 0 | 2 | 2 | 2 | 2 | 2 | 2 | 2 | 0 | 2 | 2 |

*Use of printing medium with transparent resin layer provided, in Examples 4-17 and 4-18

TABLE 3-3

| | | Example | | | | | | | | | | |
|---|---|---|---|---|---|---|---|---|---|---|---|---|
| | | 5-1 | 5-2 | 5-3 | 5-4 | 5-5 | 5-6 | 5-7 | 5-8 | 5-9 | 5-10* | 5-11* |
| Method for adding titanium oxide | | Coating | Coating | Coating | Coating | Coating | Coating | Coating | Coating | Coating | Coating | Coating |
| Paper substrate | Type | Paper 1 | Paper 1 | Paper 2 | Paper 3 | Paper 3 | Paper 3 | Paper 3 | Paper 3 | Paper 1 | Paper 1 | Paper 4 |
| Length-weighted average fiber length | mm | 0.67 | 0.67 | 1.30 | 2.50 | 2.50 | 2.50 | 2.50 | 2.50 | 0.67 | 0.67 | 0.67 |
| Average fiber width | μm | 16.5 | 16.5 | 20.4 | 30.8 | 30.8 | 30.8 | 30.8 | 30.8 | 16.5 | 16.5 | 16.5 |
| Number-based proportion of fine fiber | % | 6.1 | 6.1 | 8.5 | 15.2 | 15.2 | 15.2 | 15.2 | 15.2 | 6.1 | 6.1 | 35.0 |
| Coating liquid | Type | 1 | 2 | 2 | 2 | 3 | 4 | 2 | 1 | 1 | 2 | 2 |
| Amount of coating | g/m² | 8 | 8 | 8 | 8 | 2 | 2 | 30 | 30 | 8 | 8 | 8 |
| Titanium oxide (A) in coating layer | g/m² | 4.0 | 0.6 | 0.6 | 0.6 | 0.6 | 0.8 | 2.4 | 15.0 | 4.0 | 0.6 | 0.6 |
| Thickness (B) of coating layer | μm | 4.5 | 7.4 | 7.4 | 7.4 | 0.9 | 1.0 | 30.1 | 19.2 | 4.5 | 7.4 | 7.4 |
| A/B | | 0.88 | 0.09 | 0.09 | 0.09 | 0.68 | 0.80 | 0.08 | 0.78 | 0.88 | 0.09 | 0.09 |
| Concentration of titanium oxide (in solid content) | % by mass | 50.0 | 8.0 | 8.0 | 8.0 | 30.0 | 40.0 | 8.0 | 50.0 | 50.0 | 8.0 | 8.0 |
| Printing condition   Output | W | 2 | 2 | 2 | 2 | 2 | 2 | 2 | 2 | 2 | 2 | 2 |
| Raman spectrum   Non-printed region | Count | 65,344 | 10,342 | 10,546 | 10,336 | 12,256 | 14,995 | 35,994 | 230,545 | 68,446 | 13,221 | 11,332 |
| Printed region | Count | 1,338 | 204 | 201 | 224 | 402 | 501 | 1.054 | 10,343 | 1,856 | 255 | 221 |
| Printed region/ Non-printed region | | 0.02 | 0.02 | 0.02 | 0.02 | 0.03 | 0.03 | 0.03 | 0.04 | 0.03 | 0.02 | 0.02 |
| Evaluation   Print-out clearness | | A | B | B | C | B | B | C | C | A | A | B |
| Solvent resistance | | A | A | A | A | A | A | A | A | A | A | A |
| Variation in print-out (visually observed) | | C | A | C | D | D | D | C | D | A | A | C |
| Amount of smoking | | 2 | 1 | 1 | 1 | 2 | 2 | 1 | 2 | 0 | 0 | 1 |

*Use of printing medium with transparent resin layer provided on coating layer

TABLE 3-4

| | | Example | | | | Comparative Example | | | | | |
|---|---|---|---|---|---|---|---|---|---|---|---|
| | | 5-12 | 5-13 | 5-14 | 5-15 | 5-1 | 5-2 | 5-3 | 5-4 | 5-5 | 5-6 |
| Method for adding titanium oxide | | Coating | Coating | Coating | Coating | Coating | Coating | Coating | Coating | Coating | Lamination |
| Paper substrate | Type | Paper 5 | Paper 6 | Paper 7 | Paper 1 | Paper 1 | Paper 1 | Paper8 | Paper 9 | Paper 1 | Paper 1 |
| Length-weighted average fiber length | mm | 0.67 | 0.67 | 0.68 | 0.67 | 0.67 | 0.67 | 3.79 | 0.53 | 0.67 | 0.67 |
| Average fiber width | μm | 16.5 | 16.5 | 16.9 | 16.5 | 16.5 | 16.5 | 24.3 | 16.5 | 16.5 | 16.5 |
| Number-based proportion of fine fiber | % | 15.2 | 5.0 | 6.2 | 6.1 | 6.1 | 6.1 | 3.1 | 18.0 | 6.1 | 6.1 |
| Coating liquid | Type | 2 | 2 | 2 | 1 | 5 | 2 | 3 | 3 | 6 | — |
| Amount of coating | g/m² | 8 | 8 | 8 | 30 | 58 | 2 | 8 | 8 | 8 | 120 |
| Titanium oxide (A) in coating layer | g/m² | 0.6 | 0.6 | 0.6 | 15.0 | 35.0 | 0.16 | 0.6 | 0.6 | 9.5 | 0.4 |
| Thickness (B) of coating layer | μm | 7.4 | 7.4 | 7.4 | 19.2 | 33.0 | 7.9 | 7.4 | 7.4 | 4.5 | 120 |
| A/B | | 0.09 | 0.09 | 0.09 | 0.78 | 1.06 | 0.02 | 0.08649 | 0.08649 | 2.11 | 0.003 |
| Concentration of titanium oxide (in solid content) | % by mass | 8.0 | 8.0 | 8.0 | 50.0 | 60.0 | 8.0 | 30.0 | 30.0 | 80.0 | — |
| Printing condition   Output | W | 2 | 2 | 2 | 2 | 2 | 2 | 2 | 2 | 2 | 2 |
| Raman spectrum   Non-printed region | Count | 12,243 | 11,556 | 10,996 | 233,001 | 283,995 | 2,453 | 11,033 | 11,322 | 71,002 | 10,221 |
| Printed region | Count | 232 | 254 | 216 | 11,223 | 14,332 | 54 | 203 | 199 | 2,003 | 204 |
| Printed region/ Non-printed region | | 0.02 | 0.02 | 0.02 | 0.05 | 0.05 | 0.02 | 0.02 | 0.02 | 0.03 | 0.02 |
| Evaluation   Print-out clearness | | B | B | D | A | A | E | B | B | A | E |
| Solvent resistance | | A | A | A | A | A | A | A | A | A | A |
| Variation in print-out (visually observed) | | A | B | A | C | E | Unevaluable | E | E | E | A |
| Amount of smoking | | 1 | 1 | 1 | 2 | 3 | 0 | 1 | 1 | 3 | 0 |

87

As clear from the results in Table 3, a clear print product (excellent in viewability) and excellent in solvent resistance was obtained by printing with ultraviolet laser, onto a specified paper substrate, so that the Raman intensity ratio between the printed region and the non-printed region was 0.7 or less, by use of a recording medium provided with a coating layer where the titanium oxide content was 0.6 g/m² or more and 30 g/m² or less and A/B was in a specified range. The variation in print-out was suppressed and the amount of smoking occurring in irradiation with ultraviolet laser was also suppressed.

On the other hand, no clear image was obtained in Comparative Examples 4-1 and 5-2 where the titanium oxide content was less than 0.6 g/m². The variation in print-out was caused and the amount of smoking was also large in Comparative Example 5-1 where the titanium oxide content was more than 30 g/m². A print product obtained by conventional ink-jet printing and thermosensitive label was inferior in solvent resistance. Furthermore, no sufficient print-out clearness was obtained in Comparative Example 4-4 where the Raman intensity ratio was more than 0.7.

The variation in print-out was caused in Comparative Example 5-3 where the length-weighted average fiber length of the paper substrate was more than 3.5 mm and Comparative Example 5-4 where the length-weighted average fiber length was less than 0.6 mm. The variation in print-out was caused and the amount of smoking was large in Comparative Example 5-5 where A/B was more than 2.00. Furthermore, no sufficient print-out clearness was obtained in Comparative Example 5-6 where lamination was performed.

Furthermore, no printing could be made by irradiation with infrared laser, green laser, and CO₂ laser, as shown in Comparative Examples 5-7 to 5-9.

Example 6 and Example 7

[Material]
Various materials used in Examples were as follows.
[Paper Substrate]
Paper substrate A: bleached kraft, basis weight=70 g/m², paper thickness=110 μm (manufactured by Ojimateria Co., Ltd.)
Paper substrate B: liner for cardboard, basis weight=280 g/m², paper thickness=326 μm, LB grade (manufactured by Ojimateria Co., Ltd.)
Paper substrate C: produced by the following procedure.
<Method for Producing Paper Substrate C>
A 3% by mass suspension was prepared by beating leaf bleached kraft pulp (LBKP, brightness 84%) so that the CSF was 400 mL.
A 3% by mass suspension was prepared by beating needle kraft pulp (NBKP, brightness 84%) so that the CSF was 700 mL.
Thereafter, LBKP and NBKP were mixed at a ratio (LBKP:NBKP) of 65:35. After 0.5 parts by mass of aluminum sulfate was added based on 100 parts by mass of the pulp and dilution was thus made, 0.8 parts by mass of a polyepichlorohydrin-based wet paper strengthening agent WS4024 (manufactured by Seiko PMC Corporation) was added based on 100 parts by mass of the pulp, and the resultant was formed into a sheet by a wet paper machine, thereby producing a paper substrate having a basis weight of 70 g/m² and a thickness of 86 μm.
Paper substrate D: produced by the following procedure.
<Method for Producing Paper Substrate D>
A 3% by mass suspension was prepared by beating leaf bleached kraft pulp (LBKP) so that the CSF was 400 mL. After 0.5 parts by mass of aluminum sulfate was added based on 100 parts by mass of the pulp and dilution was thus made, 0.8 parts by mass of a polyepichlorohydrin-based wet paper strengthening agent WS4024 (manufactured by Seiko PMC Corporation) was added based on 100 parts by mass of the pulp, and the resultant was formed into a sheet by a wet paper machine, thereby producing a paper substrate having a basis weight of 30 g/m² and a thickness of 42 μm.
[Resin]
Polyethylene (PE): Novatec® LC522 (manufactured by Japan Polyethylene Corporation)
Polypropylene (PP): PH943B (manufactured by SunAllomer Ltd.)
Polylactic acid (PLA): REVODE190 (manufactured by Zhejiang Hisun Biomaterials Co., Ltd.)
Polyethylene terephthalate (PET): SA-8339P manufactured by Unitika Ltd.
Polybutylene succinate (PBS): ZM9B02 (manufactured by Mitsubishi Chemical Corporation)
[Titanium oxide]
Irregular, average particle size=0.2 μm (value measured with laser diffraction/scattering type particle size distribution meter), rutile-type: R780 (manufactured by Ishihara Sangyo Kaisha, Ltd.)
Irregular, average particle size=4.3 μm (value measured with laser diffraction/scattering type particle size distribution meter), rutile-type: PER410 (manufactured by Ishihara Sangyo Kaisha, Ltd.)
Acicular, longer size=1.7 μm, shorter size=0.1 μm, rutile-type: FTL100 (manufactured by Ishihara Sangyo Kaisha, Ltd.)
Acicular, longer size=10 μm, shorter size=0.5 μm, rutile-type: FTL400 (manufactured by Ishihara Sangyo Kaisha, Ltd.)
Irregular, average particle size=0.2 μm (value measured with laser diffraction/scattering type particle size distribution meter), anatase-type: A100 (manufactured by Ishihara Sangyo Kaisha, Ltd.)

Examples 6-1 to 6-16, Comparative Examples 6-3 to 6-4, Examples 7-1 to 7-11, and Comparative Examples 7-1, 7-2, 7-4, and 7-5

The method for stacking the substrate and the laminate layer was as follows.
<Method for Producing Masterbatch>
A masterbatch was produced by the following procedure according to JP 2015-96568 A.
A masterbatch was obtained by mixing 60 parts of a resin and 40 parts of titanium oxide by a tumbler mixer (TM-65S manufactured by Eishin Co., Ltd.) in conditions of 45 rpm and 1 hour, melting and kneading the mixture by a twin-screw extruder (TEX30XCT manufactured by Japan Steel Works, Ltd., L/D=42) in conditions of a speed of screw rotation of 250 rpm and a cylinder temperature of 280° C., extruding the mixture to thereby provide a strand, and cooling the strand in a water tank and then forming the strand into a pellet having a column shape having an average axis size of 2.0 mm and an average axis length of 3.0 mm by use of a pelletizer.
<Stacking Method>
The masterbatch and the resin were loaded into a single-screw extruder (50C150 manufactured by Toyo Seiki Seisaku-sho, Ltd.) so that the proportion of the titanium oxide was as described in Table 4, and molten and stacked on the paper substrate described in Table 4, subjected to corona treatment, so that the thickness of the resin was as described in Table 4, thereafter the resultant was rapidly quenched with being sandwiched by a cooling roll at a temperature regulated at 20° C., and thus a sheet medium comprising a laminate layer was obtained.

Each resin was molten at the following temperature.
Polyethylene: 320° C.
Polypropylene: 300° C.
PET: 300° C.
Polylactic acid: 230° C.
PBS: 250° C.

Comparative Example 7-3

A coating liquid having a solid content concentration of 8% by mass was prepared by mixing 4.3 parts of titanium oxide (R780 manufactured by Ishihara Sangyo Kaisha, Ltd., rutile-type titanium oxide, irregular, average particle size=0.27 μm) and 100 parts of an ethylene-acrylic binder (ethylene-acrylic acid copolymer ionomer, MP498345N.S manufactured by Michelman, Inc., solid content 50% by mass), and stirring the mixture by use of a homomixer (Homodisper Model 2.5 manufactured by PRIMIX Corporation) for 5 minutes.

A paper substrate was coated with the coating liquid by use of a gravure coater so that the titanium oxide content was a value shown in Tables, and dried.

Comparative Example 7-6

The paper sheet medium used in Example 7-5 was used and an infrared laser (MD-F3200 manufactured by Keyence Corporation) was used, to perform 10-mm square marking. Irradiation conditions were as follows.
Wavelength: 1090 nm
Repeat frequency: 60 kHz
Scanning speed: 2000 mm/sec
Focal distance: 300 mm (focusing was performed by use of a height correction tool attached to the apparatus)
Line pitch: 200 μm
Output: 3 W
As a result, printing-out could not be performed.

Comparative Example 7-7

The paper sheet medium used in Example 7-5 was used and a green laser (MD-59910A manufactured by Keyence Corporation) was used, to perform 10⁻ mm square marking. Irradiation conditions were as follows.
Wavelength: 532 nm
Repeat frequency: 60 kHz
Spot size=40 μm
Scanning speed: 2000 mm/sec
Focal distance: 300 mm (focusing was performed by use of a height correction tool attached to the apparatus)
Line pitch: 200 μm
Output: 3 W
As a result, printing-out could not be performed.

Comparative Example 7-8

The paper sheet medium used in Example 7-5 was used and a $CO_2$ laser (ML-Z9610 manufactured by Keyence Corporation) was used, to perform 10-mm square marking. Irradiation conditions were as follows.
Wavelength: 10600 nm
Spot size=40 μm
Scanning speed: 2000 mm/sec Focal distance: 300 mm (focusing was performed by use of a height correction tool attached to the apparatus)
Line pitch: 200 μm
Output: 3 W
As a result, printing-out could not be performed.
[Conditions-1 of Irradiation with Ultraviolet Laser]
In Example 6 and Comparative Example 6, an ultraviolet laser (AVIA266-3000 manufactured by Coherent Inc.) was used to apply printing of a bar code illustrated in FIG. 1 or 10-mm square marking onto the resulting sheet medium. Irradiation conditions were as follows.
Wavelength: 355 nm
Repeat frequency: 50 kHz
Pulse width: 25 ns
Spot size: 104 μm
Scanning speed: 4000 mm/sec
Focal distance: 250 mm
Line pitch: 150 μm
The output was a value shown in Table 4.
[Conditions-2 of Irradiation with Ultraviolet Laser]
In each of Example 7 and Comparative Example 7, an ultraviolet laser (MD-U1020C manufactured by Keyence Corporation) was used to apply printing of a bar code illustrated in FIG. 1 or 10-mm square marking onto the resulting recording medium.
Irradiation conditions were as follows.
Wavelength: 355 nm
Repeat frequency: 40 kHz
Spot size=40 μm
Scanning speed: 2000 mm/sec
Focal distance: 300 mm (focusing was performed by use of a height correction tool attached to the apparatus)
Line pitch: 40 μm
The output was a value shown in Table 4.

Comparative Example 6-1

A printed region was imparted to paper for printing (KB39-7 manufactured by Kokuyo Co., Ltd.) by use of a handy ink-jet printer (MOBILEJET MINI manufactured by Yamazaki & Co., Ltd.).

The ink-jet ink here used was an ink for a water-absorbing material (manufactured by Yamazaki & Co., Ltd.).

Comparative Example 6-2

A print-out region was imparted to a thermal label (L'esprit, Universal thermal label, manufactured by Sato Holdings Corporation) by a thermal printer (L'esprit T8 manufactured by Sato Holdings Corporation).
[Measurement/Evaluation]
Characteristics of the pulp used were measured as follows.
[CSF]
The Canadian standard freeness (CSF) was measured according to JIS P 8121-2:2012.
[Brightness]
The brightness of the pulp used was measured according to JIS P 8212:1998.
The resulting print product was subjected to the following evaluations.
[Raman Spectrum-1]
Each of Raman spectra with respect to Example 6 and Comparative Example 6 was measured by the following method.

<Measurement Conditions>

While Raman spectrum measurement conditions are as follows, the following measurement conditions, for example, the laser output and the irradiation time can be appropriately modified, for example, when any damage by the laser used for the measurement is found in the print product and/or when fluorescence is intense. It is noted that the Raman intensities of the printed region and the non-printed region, here adopted, are the numerical values measured under the same conditions.

Apparatus: inVia Raman microscope QUONTOR manu-
　　　factured by Renishaw plc.
　　Excitation laser: 532 nm
　　Laser power: 50 mW (at an output of 100%)
　　Laser output: 5%
　　Measurement mode: confocal mode
　　Irradiation time: 2.0 sec
　　Cumulated number: 10
　　Laser spot size: 2.5 μm
　　Objective lens: 20×

<Measurement Method>

Measurement was performed by the following method.

(1) A reference specimen (monocrystalline silicon, manufactured by Renishaw plc.) was used to perform calibration of the Raman shift position (monocrystalline silicon, 520.5 $cm^{-1}$).

(2) A sheet-like sample was installed on a stage. A holding member was, if necessary, installed so that such a sheet was kept as a flat surface.

Figure 4:
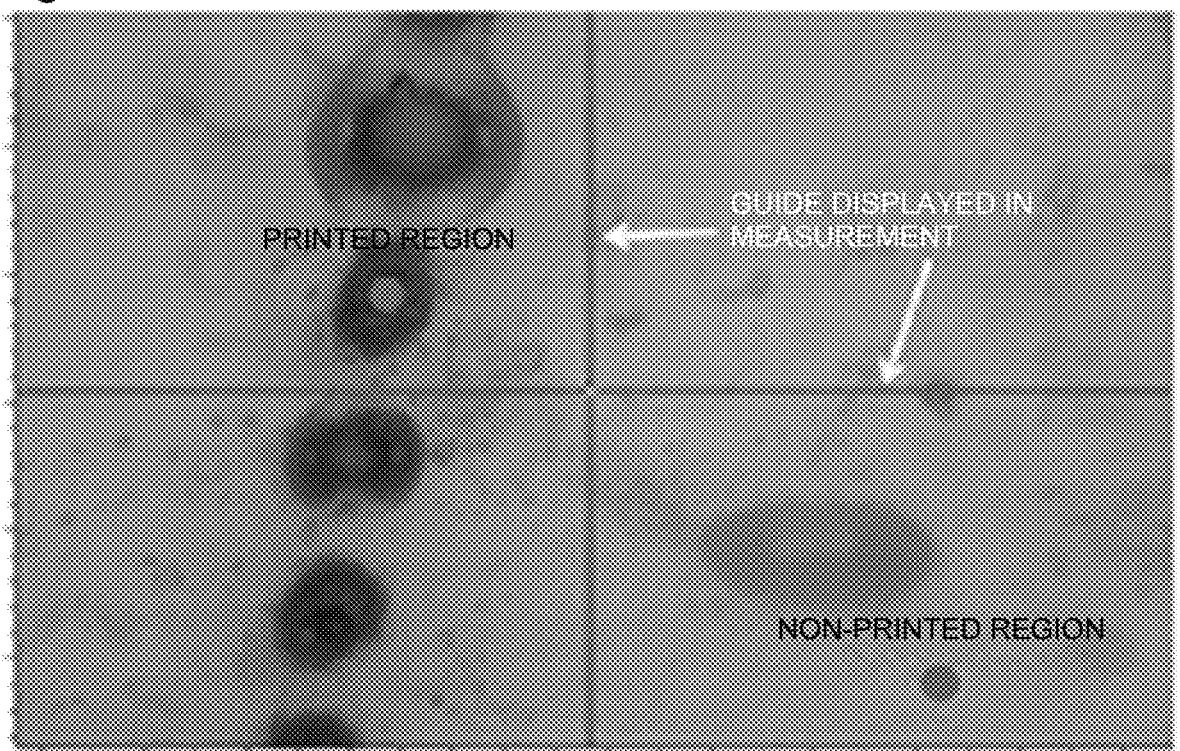
FIG. 4 is an explanatory diagram illustrating one example of Raman intensity measurement of a third print product.

(3) Focusing was performed in the apparatus as illustrated in FIG. 4 and observation (set by a simulated laser so that the smallest focus was achieved) was performed. The printed region was observed so that a visually confirmable blackest position was at the center of a guide displayed in measurement. The non-printed region was observed with being apart by a distance of 300 μm or more from the printed region.

(4) The resulting Raman spectrum was subjected to baseline correction (intelligent correction) with processing software (Wire5.2 manufactured by Renishaw plc.) attached to the apparatus. The baseline was corrected according to polynomial expression 11 of the processing software.

(5) The respective maximum values (maximum intensities) were read in the wavenumber ranges of $447\pm3$ $cm^{-1}$ and $516\pm3$ $cm^{-1}$ in the cases of rutile-type titanium oxide and anatase-type titanium oxide, and the Raman intensity ratio was calculated according to the following expression.

Raman intensity ratio=Maximum intensity in printed region/Maximum intensity in non-printed region (6) Measurement was made at 10 positions in each of the printed region (print-out portion) and the non-printed region (non-print-out portion), and the respective average values were adopted as the measurement results.

[Raman Spectrum-2]

Each of Raman spectra with respect to Example 7 and Comparative Example 7 was measured by the following method.

<Measurement Conditions and Measurement Method>

While Raman spectrum measurement conditions and measurement method are as follows, the following measurement conditions, for example, the laser output and the irradiation time can be appropriately modified, for example, when any damage by the laser used for the measurement is found in the print product and/or when fluorescence is intense. It is noted that the Raman intensities of the printed region and the non-printed region, here adopted, are the numerical values measured under the same conditions.

The number of counts of the Raman intensity in the printed region is preferably in the range of 10,000 or less from the viewpoint of suppression of the variation in measurement value. Accordingly, measurement conditions were appropriately modified so that the number of counts of the Raman intensity in the printed region was in the range of 10,000 or less. Measurement was performed in the following measurement conditions ten times, any numerical value falling out of the average value±2 SD (standard deviation) was excluded, and then the average was again determined and defined as the average value of the Raman intensity.

[Print-Out Clearness]

The print-out clearness of the resulting print product was evaluated according to the following evaluation criteria.

The color close to that of the print-out was visually selected from the Munsell table (Color Scale manufactured by Japan Color Enterprise Co., Ltd.), and the clearness was evaluated according to the following criteria.

A: a color value in the Munsell table (achromatic color), of 4 or less
　　B: a color value in the Munsell table (achromatic color), of 5 to 6
　　C: a color value in the Munsell table (achromatic color), of 7 to 8
　　D: a color value in the Munsell table (achromatic color), of 9 or more

[Solvent Resistance]

The solvent resistance of the resulting print product was evaluated according to the following evaluation criteria.

The print product was immersed in 100% acetone (manufactured by Kanto Chemical Co., Inc.), and left to still stand for 15 minutes. Thereafter, the print-out product was taken out, the solvent was wiped off by tissue paper, and the solvent resistance was visually evaluated according to the following evaluation criteria.

A: scratch and loss of the print-out not found (no change) after immersion as compared with before immersion.
　　B: scratch and loss of the print-out found after immersion as compared with before immersion.

[Rate of Reduction in Tensile Strength and Rate of Reduction in Breaking Elongation]

The degrees of degradation (rates of reductions) in tensile strength and breaking elongation were evaluated by the following method.

The resulting recording medium was marked with a 15-cm square by use of an ultraviolet laser (MD-U1020C manufactured by Keyence Corporation).

Irradiation conditions were as follows.
　　Wavelength: 355 nm
　　Repeat frequency: 40 kHz
　　Spot size=40 μm
　　Scanning speed: 3000 mm/sec
　　Focal distance: 300 mm (focusing was performed by use of a height correction tool attached to the apparatus)
　　Line pitch: 40 μm
　　Output: 80% (2 W) (2.5 W at an output of 100%)

Thereafter, a strip having a width of 15 mm and a length of 150 mm was taken out so that the lengthwise direction of paper was longitudinal, and subjected to a tensile test. The tensile strength and the breaking elongation were measured according to JIS P 8113:2006.

The same measurement was also made before laser printing-out, and the rates of reductions in tensile strength and breaking elongation were calculated as follows.

Rate of reduction in tensile strength=100−(Tensile strength after printing-out/Tensile strength before printing-out×100)

Rate of reduction in breaking elongation=100−
(Breaking elongation after printing-out/Breaking
elongation before printing-out×100)

<Determination Criteria>

0: a rate of reduction of 0% or more and 1% or less
1: a rate of reduction of more than 1% and 5% or less
2: a rate of reduction of more than 5% and 10% or less
3: a rate of reduction of more than 10% and 15% or less
4: a rate of reduction of more than 15% and 20% or less

[Amount of Smoking]

The amount of smoking in 10-mm square marking was evaluated by the following method.

<Determination Criteria>

0: no visually confirmable smoking
1: slightly visually confirmable smoking, but a very small amount of smoking
2: visually confirmable smoking, but a small amount of smoking
3: easily visually confirmable smoking, and a large amount of smoking

[Titanium Oxide Content]

<Pre-Treatment>

The paper substrate was subjected to pre-treatment for separation of the laminate layer and the paper substrate. The printable region cut out to a proper size was immersed in a copper ethylenediamine solution (manufactured by Merck Millipore Corporation) for cellulose viscosity measurement, for 3 hours, and thereafter the laminate layer was released from the paper substrate and well washed with ion-exchange water. Thereafter, the moisture on the laminate layer was wiped off, and drying with a drying machine was made at 60° C. for 1 hour, to thereby obtain a laminate layer to be subjected to measurement.

The test piece cut out was cut out so that the area could be calculated, and the area calculated was applied to an expression described below.

<Production of Test Piece>

The printable regions of the laminate layer subjected to pre-treatment and the printing medium were each cut out to a proper size to provide a sample (test piece), and the area and the mass cut out were recorded.

<Dissolution of Test Piece>

A mixed solvent of nitric acid and hydrofluoric acid (nitric acid:hydrofluoric acid) at 50:5 (% by volume) and the test piece were loaded into a Teflon® container of an autoclave apparatus (MARS5 manufactured by CEM Japan), and treated with the autoclave at 210° C. for 120 minutes, thereby dissolving the test piece. The mass of the test piece may be appropriately modified, and if the test piece remains without being dissolved, the ratio between nitric acid and hydrofluoric acid, the treatment temperature, the treatment time, and the like may be appropriately modified.

After the test piece was dissolved, the volume was precisely made constant with ultrapure water.

<Measurement of Amount of Titanium Oxide in Dissolution Liquid>

(1) The ICP Apparatus and Measurement Conditions were as Follows.

ICP Apparatus: ICP-OEC apparatus (CIROS1-20 manufactured by Rigaku Corporation)
Measurement Conditions:
Carrier gas: argon gas
Flow rate of argon gas 0.9 L/min
Flow rate of plasma gas 14 L/min
Plasma output 1400 W
Speed of rotation of pump: 2
Measurement wavelength (Ti): 334.941 nm (2) Preparation of Calibration Curve A universal mixed standard liquid (XSTC-622B manufactured by SPEX) was precisely weighed so that the following concentrations were each achieved, and subjected to measurement in the measurement conditions to thereby measure the strength at 334.941 nm corresponding to the emission wavelength of a titanium atom.

Concentrations for calibration curve preparation: 0 ppm, 0.01 ppm, 0.05 ppm, 0.1 ppm, 0.5 ppm, 1.0 ppm, 3.0 ppm, 5.0 ppm (3) Measurement of Titanium Oxide Content in Dissolution Liquid The solution in which the test piece was dissolved was diluted with ultrapure water so as to meet the calibration curve, and subjected to ICP measurement.

(4) Method for Calculating Titanium Oxide Content

The titanium oxide content was calculated by the following expressions. Here, the Molecular weight of titanium oxide/Molecular weight of titanium almost equals to 1.669.

$$\text{Titanium oxide content } (g/m^2) = \text{Concentration (ppm)} \\ \text{in ICP measurement} \times \text{Dilution factor} \times \text{Constant} \\ \text{volume (L)} \times 1.669 \times 1000 / \text{Area } (m^2)$$

$$\text{Titanium oxide content (\% by mass)} = \text{Concentration} \\ \text{(ppm) in ICP measurement} \times \text{Dilution factor} \times \\ \text{Constant volume (L)} \times 1.669 / \text{Mass (mg) of test} \\ \text{piece} \times 100$$

[Particle Size of Titanium Oxide]

The particle size of the titanium oxide filled in the paper and film was calculated from a SEM image of ash obtained by burning of the sheet medium or the print product in a muffle furnace, the image being obtained with a scanning-type electron microscope (SEM, S5200 or the like manufactured by Hitachi High-Tech Corporation).

Specifically, ash was obtained in the same conditions as in the measurement in [Titanium oxide content] described above.

An ash sample to be tested with a scanning-type electron microscope was produced by obtaining a 0.01% by mass slurry due to dispersion in ethanol by an ultrasonic homogenizer (LUH150 or the like manufactured by Yamato Scientific Co., Ltd.) having an output of 50 W over 5 minutes, then casting 0.1 mL of the slurry on an aluminum dish and drying it at 60° C., and then cutting out the aluminum dish to a size suited for testing with SEM. Adjacent particles clearly distinguishable from each other were visually selected, and the longer size of one particle was defined as the particle size. When a primary particle and a secondary particle in an aggregated state were here clearly distinguishable from each other even if present in a mixed manner, such each particle was counted as one particle and the average size in 100 of such particles randomly selected was defined as the particle size. The magnification in SEM image observation was appropriately selected depending on the particle size of the titanium oxide, and was set to about 20000 times.

In an acicular case, the average size of the shorter sizes of 100 of such particles subjected to longer size measurement was defined as the shorter size.

When any particle other than the titanium oxide was comprised, a particle comprising a titanium element was subjected to measurement with an energy dispersive X-ray analyzer (EMAX or the like manufactured by Horiba Ltd.) attached to SEM.

[Measurement of Thickness of Laminate Layer]

The thickness of the laminate layer was measured from image data obtained with a scanning-type electron microscope.

(1) Production of Measurement Sample

A sample was embedded in a photo-curable resin (D-800 manufactured by Toagosei Co., Ltd.), and a cross section of the sheet substrate was exposed by an ultramicrotome. Grinding was performed at ordinary temperature by use of a diamond knife.

The cross section ground was subjected to gold deposition at a thickness of about 20 nm, and subjected to measurement with a scanning-type electron microscope.

(2) Measurement Apparatus/Conditions

Measurement apparatus: S-3600 (manufactured by Hitachi High-Technologies Corporation)

Measurement conditions: magnification of 2000×, The type of the scanning-type microscope was not limited to the above, and an apparatus displaying the scale bar was used.

(3) Measurement Method

An energy dispersive X-ray spectroscopy apparatus attached to the scanning-type electron microscope was used to confirm a titanium element comprised, from the laminate layer observed, and then acquire image data at a magnification of 2000×. After the resulting image data was printed onto paper for printing, the thickness of the laminate layer as an object (the length between boundaries with other layers) was measured by a scale, and the actual thickness of the laminate layer as compared with the scale bar was measured. Each image data was acquired at five positions randomly selected in one measurement sample, the thickness was measured at ten positions randomly selected in the image data at one position and then the average of fifty positions in total was defined as the thickness of the laminate layer.

[Measurement of Basis Weight of Sheet Medium]

The basis weight of the sheet medium was measured by the method described in JIS P 8124:2011.

[Measurement of Thickness of Sheet Medium]

The basis weight of the sheet medium was measured by the method described in JIS P 8118:2014.

TABLE 4-1

| | | | Example | | | | | | | |
| | | | 6-1 | 6-2 | 6-3 | 6-4 | 6-5 | 6-6 | 6-7 | 6-8 |
|---|---|---|---|---|---|---|---|---|---|---|
| | Paper substrate | Type | Paper A | Paper A | Paper A | Paper A | Paper A | Paper A | Paper A | Paper A |
| Laminate layer | Thermoplastic resin | | PE | PE | PE | PE | PE | PE | PE | PE |
| | Thickness of laminate layer | μm | 30 | 30 | 30 | 30 | 200 | 30 | 30 | 30 |
| | Titanium oxide content | g/m$^2$ | 0.8 | 1.5 | 6.0 | 12.0 | 50.0 | 1.5 | 1.5 | 1.5 |
| | Titanium oxide content | % by mass | 2.5 | 5.0 | 20.0 | 40.0 | 25.0 | 5.0 | 5.0 | 5.0 |
| | Crystal system of titanium oxide | — | Rutile | Rutile | Rutile | Rutile | Rutile | Anatase | Rutile | Rutile |
| | Particle size of titanium oxide | μm | 0.27 | 0.27 | 0.27 | 0.27 | 0.27 | 0.22 | 0.27 | 0.27 |
| | Longer size of titanium oxide | μm | | | | | | | | |
| | Shorter size of titanium oxide | μm | | | | | | | | |
| | Aspect ratio of titanium oxide | — | | | | | | | | |
| | Particle shape of titanium oxide | — | Irregular | Irregular | Irregular | Irregular | Irregular | Irregular | Irregular | Irregular |
| Physical properties of sheet | Basis weight | g/m$^2$ | 102 | 103 | 106 | 112 | 321 | 103 | 103 | 103 |
| | Thickness | μm | 141 | 141 | 141 | 140 | 312 | 141 | 141 | 141 |
| Printing-out condition | Output | W | 5 | 5 | 5 | 5 | 5 | 5 | 1 | 20 |
| Raman spectrum | Non-printed region | Count | 621 | 1,179 | 4,695 | 9,221 | 5,456 | 3,012 | 1,129 | 1,244 |
| | Printed region | Count | 45 | 61 | 592 | 1,323 | 1,683 | 2,009 | 110 | 50 |
| | Printed region/ Non-printed region | | 0.07 | 0.05 | 0.13 | 0.14 | 0.31 | 0.67 | 0.10 | 0.04 |
| Evaluation | Print-out clearness | | B | A | A | A | A | A | C | A |
| | Solvent resistance | | A | A | A | A | A | A | A | A |
| | Rate of reduction in tensile strength | % | 1 | 1 | 0 | 0 | 0 | 1 | 1 | 1 |
| | Rate of reduction in breaking elongation | % | 1 | 1 | 0 | 0 | 0 | 1 | 1 | 1 |
| | Amount of smoking | | 0 | 1 | 1 | 2 | 2 | 1 | 1 | 1 |

TABLE 4-2

| | | | Example | | | | | | | | Comparative Example | | | |
|---|---|---|---|---|---|---|---|---|---|---|---|---|---|---|
| | | | 6-9 | 6-10 | 6-11 | 6-12 | 6-13 | 6-14 | 6-15 | 6-16 | 6-1 | 6-2 | 6-3 | 6-4 |
| Paper substrate | Type | Type | Paper A | Paper A | Paper A | Paper A | Paper A | Paper A | Paper A | Paper B | Ink-jet | Thermo-sensitive label | Paper A | Paper A |
| Laminate layer | Thermoplastic resin | Type | PP | PET | PLA | PBS | PE | PE | PE | PE | | | PE | PE |
| | Thickness of laminate layer | μm | 30 | 30 | 30 | 30 | 30 | 30 | 30 | 30 | | | 30 | 30 |
| | Titanium oxide content | g/m$^2$ | 1.5 | 1.5 | 1.5 | 1.5 | 1.5 | 1.5 | 1.5 | 1.5 | | | 0.05 | 1.5 |
| | Titanium oxide content | % by mass | 5.0 | 5.0 | 5.0 | 5.0 | 5.0 | 5.0 | 5.0 | 5.0 | | | 0.2 | 5.0 |
| | Crystal system of titanium oxide | — | Rutile | Rutile | Rutile | Rutile | Rutile | Rutile | Rutile | Rutile | | | Rutile | Rutile |
| | Particle size of titanium oxide | μm | 0.27 | 0.27 | 0.27 | 0.27 | 4.41 | | | 0.27 | | | 0.27 | 0.27 |
| | Longer size of titanium oxide | μm | | | | | | 1.72 | 10.3 | | | | | |
| | Shorter size of titanium oxide | μm | | | | | | 0.12 | 0.51 | | | | | |
| | Aspect ratio of titanium oxide | — | | | | | | 14.33 | 20.20 | | | | | |
| | Particle shape of titanium oxide | — | Irregular | Irregular | Irregular | Irregular | Irregular | Acicular | Acicular | Irregular | | | Irregular | Irregular |
| Qualities of sheet | Basis weight | g/m$^2$ | 101 | 110 | 108 | 108 | 101 | 101 | 101 | 309 | | | 101 | 101 |
| | Thickness | μm | 140 | 140 | 140 | 140 | 140 | 140 | 140 | 356 | | | 140 | 140 |
| Printing-out condition | Output | W | 5 | 5 | 5 | 5 | 5 | 5 | 5 | 5 | | | 5 | 0.5 |
| Raman spectrum | Non-printed region | Count | 1,523 | 1,322 | 1,223 | 1,295 | 1,254 | 1,321 | 1,342 | 1.290 | 0 | 0 | 40 | 1,323 |
| | Printed region | Count | 322 | 213 | 154 | 176 | 146 | 165 | 158 | 177 | 0 | 0 | 0 | 1,095 |
| | Printed region/ Non-printed region | | 0.21 | 0.16 | 0.13 | 0.14 | 0.12 | 0.12 | 0.12 | 0.14 | — | — | — | 0.83 |
| Evaluation | Print-out clearness | | A | A | A | A | A | A | A | A | A | A | D | D |
| | Solvent resistance | | A | A | A | A | A | A | A | A | B | B | Un-measurable | A |
| | Rate of reduction in tensile strength | % | 1 | 1 | 1 | 1 | 1 | 1 | 1 | 1 | — | — | 3 | 0 |
| | Rate of reduction in breaking elongation | % | 1 | 1 | 1 | 1 | 1 | 1 | 1 | 1 | — | — | 3 | 0 |
| | Amount of smoking | | 1 | 1 | 1 | 1 | 1 | 1 | 1 | 1 | — | — | 0 | 0 |

TABLE 4-3

| | | | Example | | | | | | | | | | | Comparative Example | | | | |
|---|---|---|---|---|---|---|---|---|---|---|---|---|---|---|---|---|---|---|
| | | | 7-1 | 7-2 | 7-3 | 7-4 | 7-5 | 7-6 | 7-7 | 7-8 | 7-9 | 7-10 | 7-11 | 7-1 | 7-2 | 7-3 | 7-4 | 7-5 |
| Paper substrate | Type | Type | Paper C | Paper C | Paper C | Paper C | Paper C | Paper C | Paper C | Paper C | Paper C | PaperC | Paper C | Paper C | Paper C | Paper C | Paper C | Paper D |
| | Type of resin | Type | PE | PE | PE | PE | PE | PE | PE | PP | PET | PLA | PBS | PE | PE | Ethylene-acrylic | PE | PE |
| Laminate layer | Thickness of laminate layer | μm | 14 | 14 | 15 | 25 | 25 | 15 | 198 | 26 | 23 | 25 | 25 | 13 | 19 | 1.3 | 5 | 5 |
| | Basis weight of laminate layer | g/m² | 13 | 13 | 14 | 24 | 27 | 20 | 263 | 24 | 32 | 32 | 32 | 12 | 28 | 2 | 5 | 4.6 |
| | Titanium oxide content | g/m² | 0.13 | 0.26 | 0.7 | 1.2 | 5.4 | 8 | 105 | 1.2 | 1.6 | 1.6 | 1.6 | 0.06 | 14 | 0.2 | 0.04 | 0.23 |
| | Titanium oxide content | % by mass | 1 | 2 | 5 | 5 | 20 | 45 | 45 | 5 | 5 | 5 | 5 | 0.1 | 50 | 5 | 0.8 | 5 |
| | Particle shape of titanium oxide | — | Rutile | Rutile | Rutile | Rutile | Rutile | Rutile | Rutile | Rutile | Rutile | Rutile | Rutile | Rutile | Rutile | Rutile | Rutile | Rutile |
| | Particle size of titanium oxide | μm | 0.27 | 0.27 | 0.27 | 0.27 | 0.27 | 0.27 | 0.27 | 0.27 | 0.27 | 0.27 | 0.27 | 0.27 | 0.27 | 0.27 | 0.27 | 0.27 |
| | Particle shape of titanium oxide | — | Irregular | Irregular | Irregular | Irregular | Irregular | Irregular | Irregular | Irregular | Irregular | Irregular | Irregular | Irregular | Irregular | Irregular | Irregular | Irregular |
| Qualities of sheet | Basis weight | g/m² | 83 | 83 | 84 | 94 | 97 | 90 | 333 | 94 | 102 | 102 | 102 | 82 | 98 | 72 | 75 | 165 |
| Printing condition | Thickness | μm | 224 | 224 | 225 | 235 | 235 | 225 | 408 | 236 | 233 | 235 | 235 | 223 | 229 | 211 | 215 | 215 |
| | Output | W | 2 | 2 | 2 | 2 | 2 | 2 | 2 | 2 | 2 | 2 | 2 | 2 | 2 | 2 | 2 | 2 |
| Raman spectrum | Non-printed region Count | Count | 302 | 692 | 1,179 | 1,143 | 5,323 | 10,221 | 13,423 | 1,232 | 1,223 | 1,193 | 1,348 | 102 | 138,431 | 509 | 304 | 1,021 |
| | Printed region Count | Count | 50 | 52 | 102 | 99 | 502 | 532 | 699 | 101 | 95 | 86 | 104 | 49 | 20,433 | 55 | 30 | 50 |
| | Printed region/Non-printed region | | 0.17 | 0.08 | 0.09 | 0.09 | 0.09 | 0.05 | 0.05 | 0.08 | 0.08 | 0.07 | 0.08 | 0.48 | 0.15 | 0.11 | 0.10 | 0.05 |
| Evaluation | Print-out clearness | | C | B | A | A | A | B | B | A | A | A | A | D | A | C | D | A |
| | Solvent resistance | | A | A | A | A | A | A | A | A | A | A | A | A | A | A | A | A |
| | Rate of reduction in tensile strength | % | 3 | 1 | 1 | 0 | 0 | 0 | 0 | 0 | 0 | 0 | 0 | 4 | 0 | 4 | 4 | 4 |
| | Rate of reduction in breaking elongation | % | 3 | 1 | 1 | 1 | 1 | 2 | 2 | 1 | 1 | 1 | 1 | 4 | 0 | 4 | 4 | 4 |
| | Amount of smoking | | 0 | 0 | 1 | 1 | 1 | 2 | 2 | 1 | 1 | 1 | 1 | 0 | 3 | 1 | 0 | 0 |

As shown in Table 4, a print product excellent in print-out clearness and excellent in solvent resistance was obtained by direct printing with ultraviolet laser, onto a paper substrate which comprised a laminate layer comprising 0.1 g/m² or more of titanium oxide, having a titanium oxide content of 1% by mass or more and 45% by mass or less, and having a thickness of 10 μm or more and 200 μm or less. The print product was suppressed in degradation in tensile strength and breaking elongation and also suppressed in amount of smoking in irradiation with ultraviolet laser.

On the other hand, no sufficient print-out clearness could be obtained in Comparative Example 6-3 and Comparative Example 7-1 where a sheet medium comprising a laminate layer having a titanium oxide content of less than 0.1 g/m² was used. No sufficient print-out clearness could be obtained in Comparative Example 6-4 where the ratio between the Raman intensity assigned to titanium oxide in the printed region and the Raman intensity assigned to titanium oxide in the non-printed region was more than 0.70.

The amount of smoking was large in Comparative Example 7-2 where the titanium oxide content in the laminate layer was more than 45% by mass. No sufficient print-out clearness was obtained in Comparative Example 7-4 where the titanium oxide content in the laminate layer was less than 1% by mass. The tensile strength and breaking elongation were largely degraded in Comparative Examples 7-4 and 7-5 where the thickness of the laminate layer was less than 10 μm.

No sufficient solvent resistance was obtained by conventional ink-jet method and thermosensitive label, as shown in Comparative Examples 6-1 and 6-2. The tensile strength and breaking elongation were largely degraded in Comparative Example 7-3 where a coating layer comprising titanium oxide, instead of the laminate layer, was provided by coating. As shown in Comparative Examples 7-6 to 7-8, no printing could be made with infrared laser, green laser, and $CO_2$ laser.

INDUSTRIAL APPLICABILITY

The first to third print products of the present invention each have a printed region comprising discolored titanium oxide and are excellent in viewability. The first to third print products of the present invention are each suitably applied to, for example, a package, a label, and a pressure-sensitive adhesive tape where variable information such as a date and a bar code is printed. The methods for producing first to third print products of the present invention are each suitably applied to printing of variable information onto, for example, a package, a label, and a pressure-sensitive adhesive tape. The first to third printing media for laser printing of the present invention are each suitably used in the method for producing a print product with ultraviolet laser.

The invention claimed is:

1. A printing medium for laser printing, comprising:
a printable region onto which printing with ultraviolet laser is applicable, and
a paper substrate,
wherein the printable region of the printing medium has a coating layer comprising titanium oxide on the paper substrate,
pulp constituting the paper substrate has a length-weighted average fiber length of 0.6 mm or more and 3.5 mm or less,
the pulp constituting the paper substrate has an average fiber width of 14.0 μm or more and 35.0 μm or less, a titanium oxide content in the coating layer is 0.6 g/m² or more and 30 g/m² or less,
the titanium oxide has a particle size of 0.15 μm to 10.0 μm,
A/B is 0.01 or more and 2.00 or less under the assumption that the titanium oxide content in the coating layer is A g/m² and a thickness of the coating layer is B μm, and
wherein a number-based proportion of a fine fiber having a fiber length of 0.2 mm or less in the pulp constituting the paper substrate is 6% or more and 16% or less.

2. The printing medium according to claim 1, wherein the coating layer has a thickness of 0.4 μm or more and 30.0 μm or less.

3. The printing medium according to claim 1, wherein the coating layer comprises a thermoplastic resin in addition to titanium oxide.

4. The printing medium according to claim 3, wherein the thermoplastic resin is selected from the group consisting of a starch derivative, casein, shellac, polyvinyl alcohol, a polyvinyl alcohol derivative, an acrylic resin, and a maleic acid-based resin.

5. The printing medium according to claim 1, wherein the titanium oxide is at least one selected from the group consisting of a rutile titanium oxide and an anatase titanium oxide.

6. The printing medium according to claim 1, wherein the printing medium is selected from the group consisting of a package, a label, and a pressure-sensitive adhesive tape.

7. The printing medium according to claim 1, wherein the printing medium further comprises a transparent resin layer on the coating layer.

8. The printing medium according to claim 7, wherein a resin constituting the transparent resin layer is at least one selected from the group consisting of polyethylene, polypropylene, polyethylene terephthalate, polyvinyl alcohol, and starch.

9. The printing medium according to claim 7, wherein the transparent resin layer is obtained by attaching a transparent resin film onto the coating layer with an adhesive layer being interposed, or by laminating a transparent resin film onto the coating layer.

10. The printing medium according to claim 7, wherein the transparent resin layer has a thickness of 5 μm or more and 100 μm or less.

11. The printing medium according to claim 1, wherein the titanium oxide has a particle size of 0.27 μm to 10.0 μm.

12. The printing medium according to claim 1, wherein the titanium oxide content in the coating layer is 0.8 g/m² or more and 30 g/m² or less.

13. The printing medium according to claim 1, wherein the titanium oxide has an irregular or acicular shape.

14. A print product, wherein
the print product has a printed region comprising discolored titanium oxide in at least one portion of the printing medium according to claim 1, and
a ratio between a Raman intensity assigned to titanium oxide in the printed region and a Raman intensity assigned to titanium oxide in a non-printed region is 0.70 or less.

15. A method for producing a print product, comprising a step of performing printing by irradiating of the printing medium according to claim 1 with an ultraviolet laser to change a color of an irradiated region.

16. The method for producing a print product according to claim 15, wherein the ultraviolet laser has an output of 0.8 W or more.

17. The method for producing a print product according to claim 15, wherein the printing step is a step of performing irradiation with the ultraviolet laser so that a ratio between a Raman intensity assigned to titanium oxide in a printed region and a Raman intensity assigned to titanium oxide in a non-printed region is 0.70 or less.

18. The method for producing a print product according to claim 15, wherein the printing medium is selected from the group consisting of a package, a label, and a pressure-sensitive adhesive tape.

19. The method for producing a print product according to claim 15, wherein the printing step is performed in an in-line manner.

\* \* \* \* \*